US012675766B2

(12) United States Patent
Kwok et al.

(10) Patent No.: US 12,675,766 B2
(45) Date of Patent: Jul. 7, 2026

(54) SYSTEMS AND METHODS FOR AUTONOMOUS VEHICLE TRANSACTIONS

(71) Applicant: Capital One Services, LLC, McLean, VA (US)

(72) Inventors: Jennifer Kwok, Brooklyn, NY (US); Salik Shah, Washington, DC (US); Zviad Aznaurashvili, Reston, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/383,383

(22) Filed: Oct. 24, 2023

(65) Prior Publication Data

US 2025/0131370 A1     Apr. 24, 2025

(51) Int. Cl.
| | |
|---|---|
| *G06Q 10/0836* | (2023.01) |
| *B60P 3/00* | (2006.01) |
| *B60W 60/00* | (2020.01) |
| *G06Q 10/083* | (2024.01) |

(52) U.S. Cl.
CPC .......... *G06Q 10/0836* (2013.01); *B60P 3/007* (2013.01); *B60W 60/00256* (2020.02); *G06Q 10/083* (2013.01); *B60W 2556/45* (2020.02)

(58) Field of Classification Search
CPC .......... G06Q 10/083; G06Q 10/08355; G06Q 10/0836; G06Q 10/08365; G06Q 10/0838; G06Q 10/0843; G06Q 50/40; G06V 20/56; B60W 60/00256; B60W 2556/45
USPC ....................................... 705/5, 13
See application file for complete search history.

(56) References Cited

U.S. PATENT DOCUMENTS

| | | | |
|---|---|---|---|
| 4,683,553 | A | 7/1987 | Mollier |
| 4,827,113 | A | 5/1989 | Rikuna |
| 4,910,773 | A | 3/1990 | Hazard et al. |
| 5,036,461 | A | 7/1991 | Elliott et al. |

(Continued)

FOREIGN PATENT DOCUMENTS

| | | |
|---|---|---|
| CA | 3010336 | 7/2017 |
| CN | 101192295 | 6/2008 |

(Continued)

OTHER PUBLICATIONS

Kesh et al, Risk and Weightage Based Route Prediction System Using Machine Learning—A Review, 2022 Int'l Interdisciplinary Conference on Mathematics, Engineering and Science (MESIICON), pp. 1-6 (Year: 2022).*

(Continued)

*Primary Examiner* — Michael P Harrington
*Assistant Examiner* — Mark C Clare
(74) *Attorney, Agent, or Firm* — KDW Firm PLLC; Andrew D. Kasnevich

(57)     ABSTRACT

Systems and methods for autonomous vehicle transactions are disclosed. An exemplary system may include a user interface configured to receive a user authentication request. The system may include a processor in communication with a server and the user interface. The system may be configured to receive one or more delivery instructions from the server, cause an autonomous vehicle to move to a delivery location based on the one or more delivery instructions, authenticate the user authentication request, and grant user access, based on successful authentication of the authentication request, to one or more partitioned areas of the autonomous vehicle.

20 Claims, 15 Drawing Sheets

(56) References Cited

U.S. PATENT DOCUMENTS

| | | | |
|---|---|---|---|
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |
| 5,590,038 A | 12/1996 | Pitroda |
| 5,592,553 A | 1/1997 | Guski et al. |
| 5,616,901 A | 4/1997 | Crandall |
| 5,666,415 A | 9/1997 | Kaufman |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,572,015 B1 | 6/2003 | Norton |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,252,242 B2 | 8/2007 | Ho |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,527,208 B2 | 5/2009 | Hammad |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Mamdani et al. |
| 8,005,426 B2 | 8/2011 | Huomo et al. |
| 8,010,405 B1 | 8/2011 | Bortolin et al. |
| RE42,762 E | 9/2011 | Shin |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,276,814 B1 | 10/2012 | Davis |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,346,670 B2 | 1/2013 | Hasson |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |

(56)                    References Cited

U.S. PATENT DOCUMENTS

| | | | |
|---|---|---|---|
| 8,417,231 | B2 | 4/2013 | Sanding et al. |
| 8,439,271 | B2 | 5/2013 | Smets et al. |
| 8,475,367 | B1 | 7/2013 | Yuen et al. |
| 8,489,112 | B2 | 7/2013 | Roeding et al. |
| 8,511,542 | B2 | 8/2013 | Pan |
| 8,511,547 | B2 | 8/2013 | Rans |
| 8,519,822 | B2 | 8/2013 | Riegebauer |
| 8,559,872 | B2 | 10/2013 | Butler |
| 8,566,916 | B1 | 10/2013 | Vernon et al. |
| 8,567,670 | B2 | 10/2013 | Stanfield et al. |
| 8,572,386 | B2 | 10/2013 | Takekawa et al. |
| 8,577,810 | B1 | 11/2013 | Dalit et al. |
| 8,583,454 | B2 | 11/2013 | Beraja et al. |
| 8,589,335 | B2 | 11/2013 | Smith et al. |
| 8,594,730 | B2 | 11/2013 | Bona et al. |
| 8,615,468 | B2 | 12/2013 | Varadarajan |
| 8,620,218 | B2 | 12/2013 | Awad |
| 8,667,285 | B2 | 3/2014 | Coulier et al. |
| 8,723,941 | B1 | 5/2014 | Shirbabadi et al. |
| 8,726,405 | B1 | 5/2014 | Bailey et al. |
| 8,740,073 | B2 | 6/2014 | Vijayshankar et al. |
| 8,750,514 | B2 | 6/2014 | Gallo et al. |
| 8,752,189 | B2 | 6/2014 | De Jong |
| 8,794,509 | B2 | 8/2014 | Bishop et al. |
| 8,799,668 | B2 | 8/2014 | Cheng |
| 8,806,592 | B2 | 8/2014 | Ganesan |
| 8,807,440 | B1 | 8/2014 | Von Behren et al. |
| 8,811,892 | B2 | 8/2014 | Khan et al. |
| 8,814,039 | B2 | 8/2014 | Bishop et al. |
| 8,814,052 | B2 | 8/2014 | Bona et al. |
| 8,818,867 | B2 | 8/2014 | Baldwin et al. |
| 8,850,538 | B1 | 9/2014 | Vernon et al. |
| 8,861,733 | B2 | 10/2014 | Benteo et al. |
| 8,870,081 | B2 | 10/2014 | Olson |
| 8,880,027 | B1 | 11/2014 | Darringer |
| 8,888,002 | B2 | 11/2014 | Chesney et al. |
| 8,898,088 | B2 | 11/2014 | Springer et al. |
| 8,934,837 | B2 | 1/2015 | Zhu et al. |
| 8,977,569 | B2 | 3/2015 | Rao |
| 8,994,498 | B2 | 3/2015 | Agrafioti et al. |
| 9,004,365 | B2 | 4/2015 | Bona et al. |
| 9,038,893 | B2 | 5/2015 | Kirkham |
| 9,038,894 | B2 | 5/2015 | Khalid |
| 9,042,814 | B2 | 5/2015 | Royston et al. |
| 9,047,531 | B2 | 6/2015 | Showering et al. |
| 9,069,976 | B2 | 6/2015 | Toole et al. |
| 9,081,948 | B2 | 7/2015 | Magne |
| 9,104,853 | B2 | 8/2015 | Venkataramani et al. |
| 9,118,663 | B1 | 8/2015 | Bailey et al. |
| 9,122,964 | B2 | 9/2015 | Krawczewicz |
| 9,129,199 | B2 | 9/2015 | Spodak |
| 9,129,280 | B2 | 9/2015 | Bona et al. |
| 9,152,832 | B2 | 10/2015 | Royston et al. |
| 9,183,490 | B2 | 11/2015 | Moreton |
| 9,203,800 | B2 | 12/2015 | Izu et al. |
| 9,209,867 | B2 | 12/2015 | Royston |
| 9,251,330 | B2 | 2/2016 | Boivie et al. |
| 9,251,518 | B2 | 2/2016 | Levin et al. |
| 9,258,715 | B2 | 2/2016 | Borghei |
| 9,270,337 | B2 | 2/2016 | Zhu et al. |
| 9,275,325 | B2 | 3/2016 | Newcombe |
| 9,286,606 | B2 | 3/2016 | Diamond |
| 9,306,626 | B2 | 4/2016 | Hall et al. |
| 9,306,753 | B1 | 4/2016 | Vandervort |
| 9,306,942 | B1 | 4/2016 | Bailey et al. |
| 9,324,066 | B2 | 4/2016 | Archer et al. |
| 9,324,067 | B2 | 4/2016 | Van Os et al. |
| 9,332,587 | B2 | 5/2016 | Salahshoor |
| 9,338,622 | B2 | 5/2016 | Bjontegard |
| 9,373,141 | B1 | 6/2016 | Shakkarwar |
| 9,379,841 | B2 | 6/2016 | Fine et al. |
| 9,413,430 | B2 | 8/2016 | Royston et al. |
| 9,413,768 | B1 | 8/2016 | Gregg et al. |
| 9,420,496 | B1 | 8/2016 | Indurkar |
| 9,426,132 | B1 | 8/2016 | Alikhani |
| 9,432,339 | B1 | 8/2016 | Bowness |
| 9,455,968 | B1 | 9/2016 | Machani et al. |
| 9,473,509 | B2 | 10/2016 | Arsanjani et al. |
| 9,491,626 | B2 | 11/2016 | Sharma et al. |
| 9,501,776 | B2 | 11/2016 | Martin |
| 9,553,637 | B2 | 1/2017 | Yang et al. |
| 9,619,952 | B1 | 4/2017 | Zhao et al. |
| 9,635,000 | B1 | 4/2017 | Muftic |
| 9,665,858 | B1 | 5/2017 | Kumar |
| 9,674,705 | B2 | 6/2017 | Rose et al. |
| 9,679,286 | B2 | 6/2017 | Colnot et al. |
| 9,680,942 | B2 | 6/2017 | Dimmick |
| 9,710,744 | B2 | 7/2017 | Wurmfeld |
| 9,710,804 | B2 | 7/2017 | Zhou et al. |
| 9,740,342 | B2 | 8/2017 | Paulsen et al. |
| 9,740,988 | B1 | 8/2017 | Levin et al. |
| 9,763,097 | B2 | 9/2017 | Robinson et al. |
| 9,767,329 | B2 | 9/2017 | Forster |
| 9,769,662 | B1 | 9/2017 | Queru |
| 9,773,151 | B2 | 9/2017 | Mil'shtein et al. |
| 9,780,953 | B2 | 10/2017 | Gaddam et al. |
| 9,891,823 | B2 | 2/2018 | Feng et al. |
| 9,940,571 | B1 | 4/2018 | Herrington |
| 9,949,065 | B1 | 4/2018 | Zarakas |
| 9,953,323 | B2 | 4/2018 | Candelore et al. |
| 9,961,194 | B1 | 5/2018 | Wiechman et al. |
| 9,965,632 | B2 | 5/2018 | Zarakas |
| 9,965,756 | B2 | 5/2018 | Davis et al. |
| 9,965,911 | B2 | 5/2018 | Wishne |
| 9,977,890 | B2 | 5/2018 | Alberti |
| 9,978,056 | B2 | 5/2018 | Seo |
| 9,978,058 | B2 | 5/2018 | Wurmfeld et al. |
| 9,990,795 | B2 | 6/2018 | Wurmfeld |
| 10,007,873 | B2 | 6/2018 | Heo |
| 10,013,693 | B2 | 7/2018 | Wyatt |
| 10,043,164 | B2 | 8/2018 | Dogin et al. |
| 10,075,437 | B1 | 9/2018 | Costigan et al. |
| 10,121,130 | B2 | 11/2018 | Pinski |
| 10,129,648 | B1 | 11/2018 | Hernandez et al. |
| 10,133,979 | B1 | 11/2018 | Eidam et al. |
| 10,210,505 | B2 | 2/2019 | Zarakas |
| 10,217,105 | B1 | 2/2019 | Sangi et al. |
| 10,242,368 | B1 | 3/2019 | Poole |
| 10,296,910 | B1 | 5/2019 | Templeton |
| 10,332,102 | B2 | 6/2019 | Zarakas |
| 10,360,557 | B2 | 7/2019 | Locke |
| 10,380,471 | B2 | 8/2019 | Locke |
| 10,395,244 | B1 | 8/2019 | Mossler |
| 10,453,054 | B2 | 10/2019 | Zarakas |
| 10,474,941 | B2 | 11/2019 | Wurmfeld |
| 10,475,027 | B2 | 11/2019 | Guise |
| 10,482,453 | B2 | 11/2019 | Zarakas |
| 10,482,457 | B2 | 11/2019 | Poole |
| 10,489,774 | B2 | 11/2019 | Zarakas |
| 10,489,781 | B1 | 11/2019 | Osborn |
| 10,510,070 | B2 | 12/2019 | Wurmfeld |
| 10,515,361 | B2 | 12/2019 | Zarakas |
| 10,535,068 | B2 | 1/2020 | Locke |
| 10,546,444 | B2 | 1/2020 | Osborn |
| 10,581,611 | B1 | 3/2020 | Osborn |
| 10,664,830 | B1 | 5/2020 | Rule |
| 10,685,349 | B2 | 6/2020 | Brickell |
| 10,797,882 | B2 | 10/2020 | Rule |
| 10,880,741 | B2 | 12/2020 | Zarakas |
| 10,909,525 | B1 | 2/2021 | Dhodapkar |
| 10,970,691 | B2 | 4/2021 | Koeppel |
| 10,984,416 | B2 | 4/2021 | Ilincic |
| 11,037,136 | B2 | 6/2021 | Rule |
| 11,062,098 | B1 | 7/2021 | Bergeron |
| 11,120,453 | B2 | 9/2021 | Rule |
| 11,138,593 | B1 | 10/2021 | Ho |
| 11,138,605 | B2 | 10/2021 | Aabye |
| 11,176,540 | B2 | 11/2021 | Gupta |
| 11,188,908 | B2 | 11/2021 | Locke |
| 11,216,806 | B2 | 1/2022 | Mossler |
| 11,297,958 | B2 | 4/2022 | Vukich |
| 11,334,872 | B2 | 5/2022 | Phillips |
| 11,361,173 | B2 | 6/2022 | Edwards |
| 11,392,933 | B2 | 7/2022 | Mossler |

(56) References Cited

U.S. PATENT DOCUMENTS

| | | | |
|---|---|---|---|
| 11,392,935 B2 | 7/2022 | Suresh |
| 11,416,844 B1 | 8/2022 | Osterkamp |
| 11,423,392 B1 | 8/2022 | Ho |
| 11,443,292 B2 | 9/2022 | Sherif |
| 11,444,770 B2 | 9/2022 | Wieker |
| 11,461,764 B2 | 10/2022 | Rule |
| 11,481,764 B2 | 10/2022 | Shakkarwar |
| 11,521,213 B2 | 12/2022 | Rule |
| 11,551,200 B1 | 1/2023 | Cook |
| 11,556,918 B2 | 1/2023 | Mestre |
| 11,615,395 B2 | 3/2023 | McHugh |
| 11,777,933 B2 | 10/2023 | Moreton |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2003/0220876 A1 | 11/2003 | Burger |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0228997 A1 | 10/2005 | Bicker |
| 2005/0247797 A1 | 11/2005 | Ramachandran |
| 2005/0269402 A1 | 12/2005 | Spitzer |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0276765 A1 | 11/2007 | Hazel |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0082452 A1 | 4/2008 | Wankmueller |
| 2008/0086767 A1 | 4/2008 | Kulkarni et al. |
| 2008/0099552 A1 | 5/2008 | Grillion |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Amiel et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadrajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0155801 A1 | 6/2011 | Rowberry |
| 2011/0208658 A1 | 8/2011 | Makhotin |
| 2011/0208965 A1 | 8/2011 | Machani |
| 2011/0211219 A1 | 9/2011 | Bradley |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143703 A1 | 6/2012 | Wall |
| 2012/0143754 A1 | 6/2012 | Patel |
| 2012/0150737 A1 | 6/2012 | Rottink |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |

(56) References Cited

U.S. PATENT DOCUMENTS

| | | |
|---|---|---|
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0030997 A1 | 1/2013 | Spodak |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0146657 A1 | 6/2013 | Graef |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0211937 A1 | 8/2013 | Elbirt |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0311363 A1 | 11/2013 | Ramaci |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0081785 A1 | 3/2014 | Valadas Preto |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365377 A1 | 12/2014 | Salama |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0073983 A1 | 3/2015 | Bartenstein |
| 2015/0088757 A1 | 3/2015 | Zhou et al. |
| 2015/0089586 A1 | 3/2015 | Ballesteros |
| 2015/0113271 A1 | 4/2015 | Jooste |
| 2015/0134452 A1 | 5/2015 | Williams |
| 2015/0134513 A1 | 5/2015 | Olson |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0199673 A1 | 7/2015 | Savolainen |
| 2015/0199863 A1 | 7/2015 | Scoggins |
| 2015/0205379 A1 | 7/2015 | Mag et al. |
| 2015/0254637 A1 | 9/2015 | Yang |
| 2015/0302409 A1 | 10/2015 | Malek |
| 2015/0317295 A1 | 11/2015 | Sherry |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0078430 A1 | 3/2016 | Douglas |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0189143 A1 | 6/2016 | Koeppel |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |

(56) References Cited

U.S. PATENT DOCUMENTS

| | | | |
|---|---|---|---|
| 2018/0034507 A1 | 2/2018 | Wobak et al. | |
| 2018/0039986 A1 | 2/2018 | Essebag et al. | |
| 2018/0039987 A1 | 2/2018 | Molino | |
| 2018/0068316 A1 | 3/2018 | Essebag et al. | |
| 2018/0129945 A1 | 5/2018 | Saxena et al. | |
| 2018/0160255 A1 | 6/2018 | Park | |
| 2018/0191501 A1 | 7/2018 | Lindemann | |
| 2018/0205712 A1 | 7/2018 | Versteeg et al. | |
| 2018/0240106 A1 | 8/2018 | Garrett et al. | |
| 2018/0254909 A1 | 9/2018 | Hancock | |
| 2018/0268132 A1 | 9/2018 | Buer et al. | |
| 2018/0270214 A1 | 9/2018 | Caterino et al. | |
| 2018/0294959 A1 | 10/2018 | Traynor et al. | |
| 2018/0300716 A1 | 10/2018 | Carlson | |
| 2018/0302396 A1 | 10/2018 | Camenisch et al. | |
| 2018/0315050 A1 | 11/2018 | Hammad | |
| 2018/0316666 A1 | 11/2018 | Koved et al. | |
| 2018/0322486 A1 | 11/2018 | Deliwala et al. | |
| 2018/0322775 A1* | 11/2018 | Chase | G01C 21/3438 |
| 2018/0359100 A1 | 12/2018 | Gaddam et al. | |
| 2019/0014107 A1 | 1/2019 | George | |
| 2019/0019375 A1 | 1/2019 | Foley | |
| 2019/0036678 A1 | 1/2019 | Ahmed | |
| 2019/0172055 A1 | 6/2019 | Hale | |
| 2019/0238517 A1 | 8/2019 | D'Agostino et al. | |
| 2019/0303945 A1 | 10/2019 | Mitra | |
| 2020/0031303 A1* | 1/2020 | Reynolds | B60R 21/12 |
| 2020/0104891 A1* | 4/2020 | Rule | G06Q 20/352 |
| 2020/0394746 A1* | 12/2020 | Krishnamurthy | G06V 20/56 |
| 2021/0004806 A1 | 1/2021 | Noe | |
| 2021/0256472 A1* | 8/2021 | Javidan | H04W 4/025 |
| 2021/0272098 A1 | 9/2021 | Delsuc | |
| 2021/0300297 A1 | 9/2021 | Kursar | |
| 2021/0304189 A1 | 9/2021 | Gupta | |
| 2021/0383360 A1 | 12/2021 | Sinha | |
| 2021/0406869 A1 | 12/2021 | Pathrabe | |
| 2022/0114581 A1 | 4/2022 | Upadhye | |
| 2022/0214701 A1* | 7/2022 | Park | G06V 20/59 |
| 2022/0284416 A1 | 9/2022 | Rule | |
| 2022/0309509 A1 | 9/2022 | Akgun | |
| 2022/0335412 A1 | 10/2022 | Rule | |
| 2022/0364866 A1* | 11/2022 | Williams | G01C 21/20 |
| 2022/0366410 A1 | 11/2022 | Rule | |
| 2022/0398566 A1 | 12/2022 | Rule | |
| 2022/0414648 A1 | 12/2022 | Rule | |
| 2023/0054157 A1 | 2/2023 | Mao | |
| 2023/0065163 A1 | 3/2023 | Vargas | |
| 2023/0083785 A1 | 3/2023 | Maiman | |
| 2023/0144456 A1* | 5/2023 | Ferguson | G06Q 20/401 |
| | | | 705/26.81 |
| 2023/0169505 A1 | 6/2023 | Rule | |
| 2023/0354020 A1 | 11/2023 | Rule | |
| 2023/0359839 A1 | 11/2023 | Lovgren | |

FOREIGN PATENT DOCUMENTS

| | | | | |
|---|---|---|---|---|
| CN | 103417202 | | 12/2013 | |
| CN | 103417202 B | | 11/2015 | |
| EP | 1 085 424 | | 3/2001 | |
| EP | 1 223 565 | | 7/2002 | |
| EP | 1265186 B1 | | 4/2005 | |
| EP | 1 783 919 | | 5/2007 | |
| EP | 2 852 070 | | 1/2009 | |
| EP | 2 139 196 | | 12/2009 | |
| EP | 1 469 419 | | 2/2012 | |
| FR | 3035627 | * | 11/2016 | B60N 2/06 |
| GB | 2 457 221 | | 8/2009 | |
| GB | 2 516 861 | | 2/2015 | |
| GB | 2 551 907 | | 1/2018 | |
| KR | 101508320 | | 4/2015 | |
| KR | 20150140132 A | | 12/2015 | |
| WO | 9910824 A1 | | 3/1999 | |
| WO | WO 00/49586 | | 8/2000 | |
| WO | WO 2006070189 | | 7/2006 | |
| WO | WO 2008055170 | | 5/2008 | |
| WO | WO 2009025605 | | 2/2009 | |
| WO | WO 2010049252 | | 5/2010 | |
| WO | WO 2011112158 | | 9/2011 | |
| WO | WO 2012001624 | | 1/2012 | |
| WO | WO 2013039395 | | 3/2013 | |
| WO | WO 2013155562 | | 10/2013 | |
| WO | WO 2013192358 | | 12/2013 | |
| WO | WO 2014043278 | | 3/2014 | |
| WO | WO 2014170741 | | 10/2014 | |
| WO | WO 2015179649 | | 11/2015 | |
| WO | WO 2015183818 | | 12/2015 | |
| WO | WO 2016097718 | | 6/2016 | |
| WO | WO 2016160816 | | 10/2016 | |
| WO | WO 2016168394 | | 10/2016 | |
| WO | 2017047855 A1 | | 3/2017 | |
| WO | WO 2017042375 | | 3/2017 | |
| WO | WO 2017042400 | | 3/2017 | |
| WO | WO 2017157859 | | 9/2017 | |
| WO | WO 2017208063 | | 12/2017 | |
| WO | WO 2018063809 | | 4/2018 | |
| WO | WO 2018137888 | | 8/2018 | |
| WO | 2019022585 A1 | | 1/2019 | |
| WO | 2021051884 A1 | | 3/2021 | |
| WO | 2021133492 A1 | | 7/2021 | |
| WO | 2022108959 A1 | | 5/2022 | |
| WO | 2022187350 A1 | | 9/2022 | |
| WO | 2023017943 A1 | | 2/2023 | |
| WO | 2023064063 A1 | | 4/2023 | |

OTHER PUBLICATIONS

Batina, Lejla and Poll, Erik, "SmartCards and RFID," PowerPoint Presentation for IPA Security Course, Digital Security at University of Nijmegen, Netherlands (date unknown), 75 pages.

Haykin M. and Warnar, R., "Smart Card Technology: New Methods for Computer Access Control," Computer Science and Technology NIST Special Publication 500-157:1-60 (1988).

Lehpamer, Harvey, "Component of the RFID System," RFID Design Principles, 2nd edition pp. 133-201 (2012).

Pourghomi, Pardis et al., "A Proposed NFC Payment Application," International Journal of Advanced Computer Science and Applications, vol. 4, No. 8 (2013).

Author Unknown, "CardrefresherSM from American Express®," [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool," [online] 2018-19 [retrieved on Mar. 25, 2019]. Retrieved from Internet URL: https://www.authorize.net/our-features/account-updater/, 5 pages.

Author Unknown, "Visa® Account Updater for Merchants," [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay," Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems," EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifications for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author unknown, "NFC Guide: All You Need to Know About Near Field Communication" Square Guide [online] 2018[retrieved on Nov. 13, 2018]. Retrieved from Internet URL: https://squareup.com/guides/nfc, 8 pages.

(56)         References Cited

OTHER PUBLICATIONS

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup" CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag" StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author unknown, "Tap & Go Device Setup" Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J., and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K, "Goldbug Big Seven open source crypto-messengers to be compared—: or Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song, F., and Yun, A.l, "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Berg, Guy, "Fundamentals of EMV" Smart Card Alliance [online] date unknown [retrieved on Mar. 27, 2019]. Retrieved from Internet URL: https://www.securetechalliance.org/resources/media/scap13_preconference/02.pdf, 37 pages.

Pierce, Kevin, "Is the amazon echo NFC compatible,?" Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.

Author unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Menghin, M.J., "Power Optimization Techniques for Near Field Communication Systems" 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone" Conference paper (2013) IEEE AFRICON at Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera SLAM", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author unknown: "onetappayment™", [online] Jan. 24, 2019, [retrieved on Mar. 25, 2019]. Retrieved from Internet URL: https://www.payubiz.in/onetap, 4 pages.

Vu et al., (2012). "Distinguishing users with capacitive touch communication" Proceedings of the Annual International Conference on Mobile Computing and Networking, MOBICOM. 10.1145/2348543.2348569.

EMVCo, EMV Card Personalization Specification, version 1.0 (Jun. 2003), 81 pages.

Ullmann et al., (2012). "On-Card" User Authentication for Contactless Smart Cards based on Gesture Recognition, LNI, 223-234, 12 pages.

Faraj et al. (2008). "Investigation of Java Smart Card Technology for Multi-Task Applications" J. of Al-Anbar University for Pure Science, vol. 2: No. 1: 2008, 11 pages.

Dhamdhere (2017) "Key Benefits of a Unified Platform for Loyalty, Referral Marketing, and UGC" Annex Cloud [retrieved on Jul. 3, 2019]. Retrieved from Internet URL: https://www.annexcloude.com/blog/benefits-unified-platform/, 13 pages.

Author Unknown, "Global expansion of card tapping mobile OTP for security and convenience is imminent," Jun. 28, 2022, website: https://www.swidch.com/blogs/card-tapping-motp-blog.

Emvco: "EMV Card Personalisation Specification", Aug. 1, 2021, pp. 1-114, Retrieved from the Internet: URL: https://www.emvco.com/specification/?post_id=12467.

Saush, "Getting information from an EMV chip card with Java," Sep. 8, 2006, WordPress, pp. 1-13.

Smart Card Alliance, "Co-Branded Multi-Application Contactless Cards for Transit and Financial Payment," A Smart Card Alliance Transportation Council White Paper (40 pages), Mar. 2008.

The International Search Report and written Opinion mailed Jan. 17, 2025 for corresponding PCT/US2024/052524 (12 pages).

* cited by examiner

Process 1500

1505 Provision Transmitting Device and Receiving Device with Same Master Key

1510 Increment Counter

1515 Generate ENC Session Key and MAC Session Key

1520 Generate MAC Over Counter, Unique Identifier, and Shared Secret MAC Session Key 1525 Encrypt MAC with ENC Session Key 1530 Transmit Cryptogram 1535 Server Validates

SYSTEMS AND METHODS FOR AUTONOMOUS VEHICLE TRANSACTIONS

FIELD OF THE DISCLOSURE

The present disclosure relates to systems and methods for autonomous vehicle transactions.

BACKGROUND

There are advantages to consumer purchase transactions that do not require human interaction. Traditional transactions require employee manpower, involving training, expense, risk of mistake or loss, etc. Moreover, when considering delivery of goods, there is risk associated with human error while driving, risk of theft and potential bodily harm to the human employee.

Consumers' expectations regarding purchase of goods and services have also shifted over time. For example, when the Covid pandemic spread across the United States in 2020, consumers largely stopped shopping in brick and mortar stores in face-to-face transactions, either by requirement or by a consumer desire to avoid potential Covid exposure. Since that time, consumers have fundamentally adapted their approach to shopping. Those consumers are less likely to travel to stores and less interested in human interactions during purchase transactions. As a result, online shopping and home delivery of goods has increased exponentially and this fundamental shift appears to be permanent.

Delivery of goods purchased online take time to deliver and still require human manpower to drive the delivery vehicle and carry the product(s) to the consumers' houses. Those products often sit outside of homes and are subject to theft by so-called "porch pirates."

Aside from online purchases, consumers still would generally prefer to avoid the need to travel to a store and interact with a human in order to purchase goods. There is currently no alternative other than online shopping.

These and other deficiencies exist. Accordingly, there is a need for improving the delivery of online purchases as well as providing a new means for shopping from the comfort of home without use of the internet.

SUMMARY OF THE DISCLOSURE

In some aspects, the techniques described herein relate to a secure autonomous transaction system, including: an autonomous vehicle including: a user interface configured to receive a user authentication request; a processor in communication with a server and the user interface, configured to: receive one or more delivery instructions from the server; cause the autonomous vehicle to move to a delivery location based on the one or more delivery instructions; authenticate the user authentication request; and grant user access, based on successful authentication of the authentication request, to one or more partitioned areas of the autonomous vehicle.

In some aspects, the techniques described herein relate to a system, wherein the server is configured to: receive a transaction request from the user; approve the transaction request; transmit one or more transaction details to the processor of the autonomous vehicle; transmit a confirmation of transaction approval to the processor of the autonomous vehicle.

In some aspects, the techniques described herein relate to a system, wherein the transaction details include an address for delivery to the user.

In some aspects, the techniques described herein relate to a system, wherein the server further includes artificial intelligence configured to predict and direct a route for the autonomous vehicle to travel from a starting point to the user.

In some aspects, the techniques described herein relate to a system, wherein the prediction from the artificial intelligence is based on a plurality selected from the group of traffic, weather, street closings, one or more events, tolls, distance, predicted fuel economy, and a delivery timing requested by the user.

In some aspects, the techniques described herein relate to a system, wherein one or more goods are stored in the one or more areas of the autonomous vehicle that are accessible by the user after access is granted.

In some aspects, the techniques described herein relate to a system, wherein the one or more goods correspond to a purchase transaction made by the user.

In some aspects, the techniques described herein relate to a system, wherein the autonomous vehicle contains one or more goods corresponding to a plurality of transactions, including a user's transaction, within the autonomous vehicle.

In some aspects, the techniques described herein relate to a system, wherein the one or more goods corresponding to each of the plurality of transactions are stored in different partitions of the one or more partitioned areas of the autonomous vehicle.

In some aspects, the techniques described herein relate to a system, wherein the one or more partitioned areas of the autonomous vehicle include one or more of the trunk, the rear seat, and the front seat.

In some aspects, the techniques described herein relate to a system, wherein the rear seat is further partitioned into a left and right side, the left side accessible only through a driver-side rear door and the right side only accessible through a passenger-side rear door.

In some aspects, the techniques described herein relate to a system, wherein the front seat is partitioned such that the user has no access to any vehicle controls and may access the front seat only through the passenger-side front door.

In some aspects, the techniques described herein relate to a system, wherein: the one or more partitioned areas of the autonomous vehicle are further sub-divided into a plurality of sub-partitions where each sub-partition holds the contents of one of the plurality of transactions, and upon authentication by the user, and the processor is further configured to grant access to the sub-partition containing the goods relating to the user's transaction.

In some aspects, the techniques described herein relate to a system, wherein at least one of the one or more of the partitioned areas of the autonomous vehicle includes a vending machine in communication with the processor and the system, and the vending machine is configured to: receive transaction details for the user transaction from the server; receive authentication confirmation from the processor; and release, based on the transaction details and authentication confirmation, one or more goods from a secured location to a location accessible by the user.

In some aspects, the techniques described herein relate to a method for secure autonomous transactions, including: receiving, by a processor of an autonomous vehicle, one or more digital delivery instructions; moving the autonomous vehicle to a delivery location based on the one or more digital delivery instructions; receiving, via a user interface on the autonomous vehicle, a user authentication request; authenticating, via the processor of the autonomous vehicle, the user authentication request; granting user access, via the processor of the autonomous vehicle, to one or more partitioned areas of the autonomous vehicle based on successful authentication of the authentication request.

In some aspects, the techniques described herein relate to a method, further including: receiving, via a server, a transaction request from the user; approving, via the server, the transaction request; transmitting, via the server, one or more transaction details to the processor of the autonomous vehicle; transmitting, via the server, a confirmation of transaction approval to the processor of the autonomous vehicle.

In some aspects, the techniques described herein relate to a method, further including predicting and directing, via artificial intelligence, a route for the autonomous vehicle to travel from a starting point to the user.

In some aspects, the techniques described herein relate to a method, wherein: the one or more partitioned areas of the autonomous vehicle are further sub-divided into a plurality of sub-partitions where each sub-partition holds the contents of one of the plurality of transactions, and upon authentication by the user, the processor is further configured to grant access to the sub-partition containing the goods relating to the user's transaction.

In some aspects, the techniques described herein relate to a method, wherein at least one of the one or more of the partitioned areas of the autonomous vehicle includes a vending machine in communication with the processor and the system, and is configured to: receive transaction details for the user transaction from the server; receive authentication confirmation from the processor; and release, based on the transaction details and authentication confirmation, one or more goods from a secured location to a location accessible by the user.

In some aspects, the techniques described herein relate to a computer-readable non-transitory medium including computer-executable instructions that, when executed by at least one processor, perform procedures including the steps of: receiving, by a processor of an autonomous vehicle, one or more digital delivery instructions; moving the autonomous vehicle to a delivery location based on the one or more digital delivery instructions; receiving, via a user interface on the autonomous vehicle, a user authentication request; authenticating, via the processor of the autonomous vehicle, the user authentication request; granting user access, via the processor of the autonomous vehicle, to one or more partitioned areas of the autonomous vehicle based on successful authentication of the authentication request.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Various embodiments of the present disclosure, together with further objects and advantages, may best be understood by reference to the following description taken in conjunction with the accompanying drawings.

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

The present invention provides systems and methods by which an autonomous vehicle may receive confirmation of a consumer purchase and then deliver the purchase to the consumer in an automated fashion without human interaction. The delivery may include authentication of the consumer prior to granting access to the autonomous vehicle and/or a secured portion within the autonomous vehicle.

The present invention also provides systems and methods by which an autonomous vehicle may perform as a mobile vending machine. The vehicle may follow a route (predefined, predicted by AI, and/or constantly updated by AI to maximize one or more criteria). The mobile vending machine may stop at predefined locations or be hailed by potential consumers along the route. The vehicle may store goods in a multitude of different ways that control and account for removal. Purchases can be confirmed with consumers through authentication integrated within the autonomous vehicle for example, as described in FIG. 15.

The autonomous vehicle may be directed by an artificial intelligence algorithm that predicts routes based on different attributes in order to maximize efficiency, fuel consumption, timing, gross sales, gross revenue, profits, etc.

Figure 1:
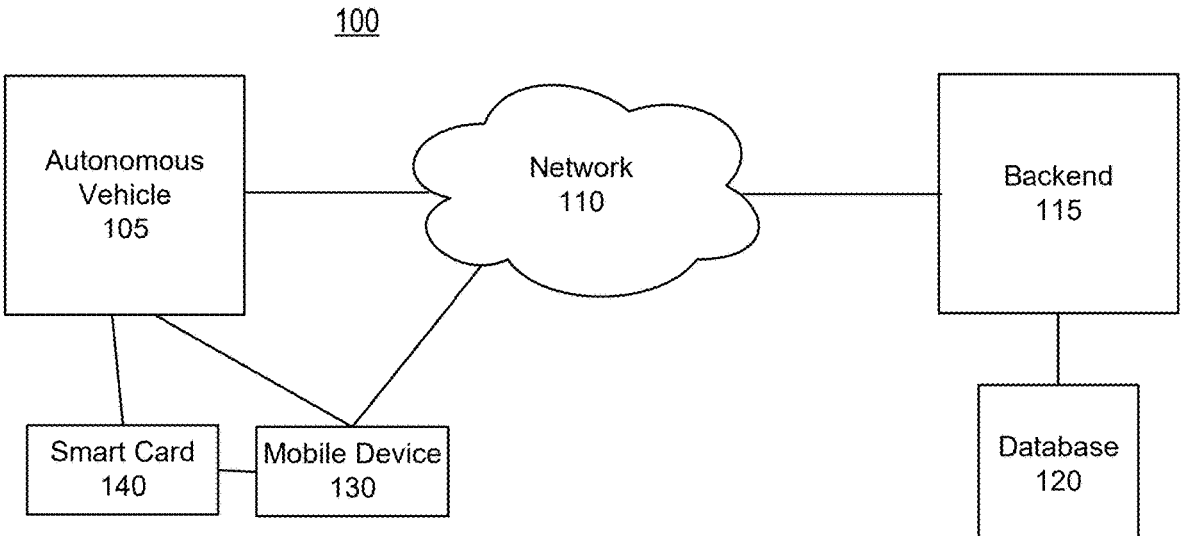
FIG. 1 illustrates an autonomous vehicle transaction system according to an exemplary embodiment.

FIG. 1 illustrates a secure autonomous vehicle transaction system 100. The system 100 may comprise may include an autonomous vehicle 105, a network 110, a backend 115, a database 120, a mobile device 130, and a smart card 140. Although FIG. 1 illustrates single instances of components of system 100, system 100 may include any number of components.

System 100 may include an autonomous vehicle 105. The autonomous vehicle 105 may include one or more processors and memory. The processors and memory may be configured to authenticate consumers using authentication technology for example, as described in FIG. 15. The autonomous vehicle 105 may be in data communication with any number of components of system 100. For example, the autonomous vehicle 105 may transmit data via network 110 to backend 115. The autonomous vehicle 105 may transmit data via network 110 to database 120. For example, the autonomous vehicle 105 may transmit authentication data over network 110 to backend 115 and may receive authorization data from backend 115. Autonomous vehicle 105 may transmit consumer purchase data to backend 115 as well as real-time traffic, weather, and route progress updates. Backend 115 may transmit route directions to autonomous vehicle 105. Without limitation, the autonomous vehicle 105 may include a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, a kiosk, a tablet, a terminal, an ATM, or other device.

System 100 may also include a mobile device 130 that may be in communication with backend 115 over network 110. Mobile device 130 may be associated with smart card 140 and may be used with autonomous vehicle 105 to authenticate a consumer and to gain physical access to autonomous vehicle 105 and/or to one or more compartments within autonomous vehicle 105. Similarly, smart card 140 may be used with autonomous vehicle 105 to authenticate a consumer and to gain physical access to autonomous vehicle 105 and/or to one or more compartments within autonomous vehicle 105.

Mobile device 130 may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device. Mobile device 130 may include processing circuitry and may contain additional components, including processors, memories, error and parity/CRC checkers, data encoders, anticollision algorithms, controllers, command decoders, security primitives and tamper-proofing hardware, as necessary to perform the functions described herein. The mobile device

130 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

System 100 may include a network 110. In some examples, network 110 may be one or more of a wireless network, a wired network or any combination of wireless network and wired network, and may be configured to connect to any one of components of system 100. For example, the autonomous vehicle 105 may be configured to connect to backend 115 via network 110. In some examples, network 110 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, near field communication (NFC), Radio Frequency Identification (RFID), Wi-Fi, and/or the like.

In addition, network 110 may include, without limitation, telephone lines, fiber optics, IEEE Ethernet 902.3, a wide area network, a wireless personal area network, a LAN, or a global network such as the Internet. In addition, network 110 may support an Internet network, a wireless communication network, a cellular network, or the like, or any combination thereof. Network 110 may further include one network, or any number of the exemplary types of networks mentioned above, operating as a stand-alone network or in cooperation with each other. Network 110 may utilize one or more protocols of one or more network elements to which they are communicatively coupled. Network 110 may translate to or from other protocols to one or more protocols of network devices. Although network 110 is depicted as a single network, it should be appreciated that according to one or more examples, network 110 may comprise a plurality of interconnected networks, such as, for example, the Internet, a service provider's network, a cable television network, corporate networks, such as credit card association networks, and home networks.

System 100 may include one or more servers which may include one or more processors and memory. Backend 115 may comprise one or more servers and may be configured as a central system, server or platform to control and call various data at different times to execute a plurality of workflow actions including displaying one or more webpages. Backend 115 may be configured to connect to autonomous vehicle 105. Backend 115 may be in data communication with one or more processors of autonomous vehicle 105. The autonomous vehicle 105 may be in communication with one or more servers of backend 115 via one or more networks 110.

In some examples, backend 115 can be a dedicated server computer, such as bladed servers, or can be personal computers, laptop computers, notebook computers, palm top computers, network computers, mobile devices, wearable devices, or any processor-controlled device capable of supporting the system 100. While FIG. 1 illustrates a single backend 115, it is understood that other embodiments can use multiple servers or multiple computer systems as necessary or desired to support the users and can also use back-up or redundant servers to prevent network downtime in the event of a failure of a particular server.

Backend 115 may include an application comprising instructions for execution thereon. For example, the application may comprise instructions for execution on the backend 115. The application may be in communication with any components of system 100. For example, backend 115 may execute one or more applications that enable, for example, network and/or data communications with one or more components of system 100 and transmit and/or receive data. Without limitation, backend 115 may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, or other device. Backend 115 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The backend 115 may include processing circuitry and may contain additional components, including processors, memories, error and parity/CRC checkers, data encoders, anticollision algorithms, controllers, command decoders, security primitives and tamper-proofing hardware, as necessary to perform the functions described herein. The backend 115 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

System 100 may include one or more databases 120. The database 120 may comprise a relational database, a non-relational database, or other database implementations, and any combination thereof, including a plurality of relational databases and non-relational databases. In some examples, the database 120 may comprise a desktop database, a mobile database, or an in-memory database. Further, the database 120 may be hosted internally by any component of system 100, such as the backend 115, or the database 120 may be hosted externally to any component of the system 100, such as the backend 115, by a cloud-based platform, or in any storage device that is in data communication with the autonomous vehicle 105 and backend 115. In some examples, database 120 may be in data communication with any number of components of system 100.

In some examples, exemplary procedures in accordance with the present disclosure described herein can be performed by a processing arrangement and/or a computing arrangement (e.g., a computer hardware arrangement). Such processing and/or computing arrangement can be, for example entirely or a part of, or include, but not limited to, a computer and/or processor that can include, for example one or more microprocessors, and use instructions stored on a computer-accessible medium (e.g., RAM, ROM, hard drive, or other storage device). For example, a computer-accessible medium can be part of the memory of the autonomous vehicle 105, backend 115, and/or database 120, or other computer hardware arrangement.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing and/or computing arrangement). The computer-accessible medium can contain executable instructions thereon. In addition or alternatively, a storage arrangement can be provided separately from the computer-accessible medium, which can provide the instructions to the processing and/or computing arrangement so as to configure the processing and/or computing arrangement to execute certain exemplary procedures, processes, and methods, as described herein above, for example.

Figure 2:
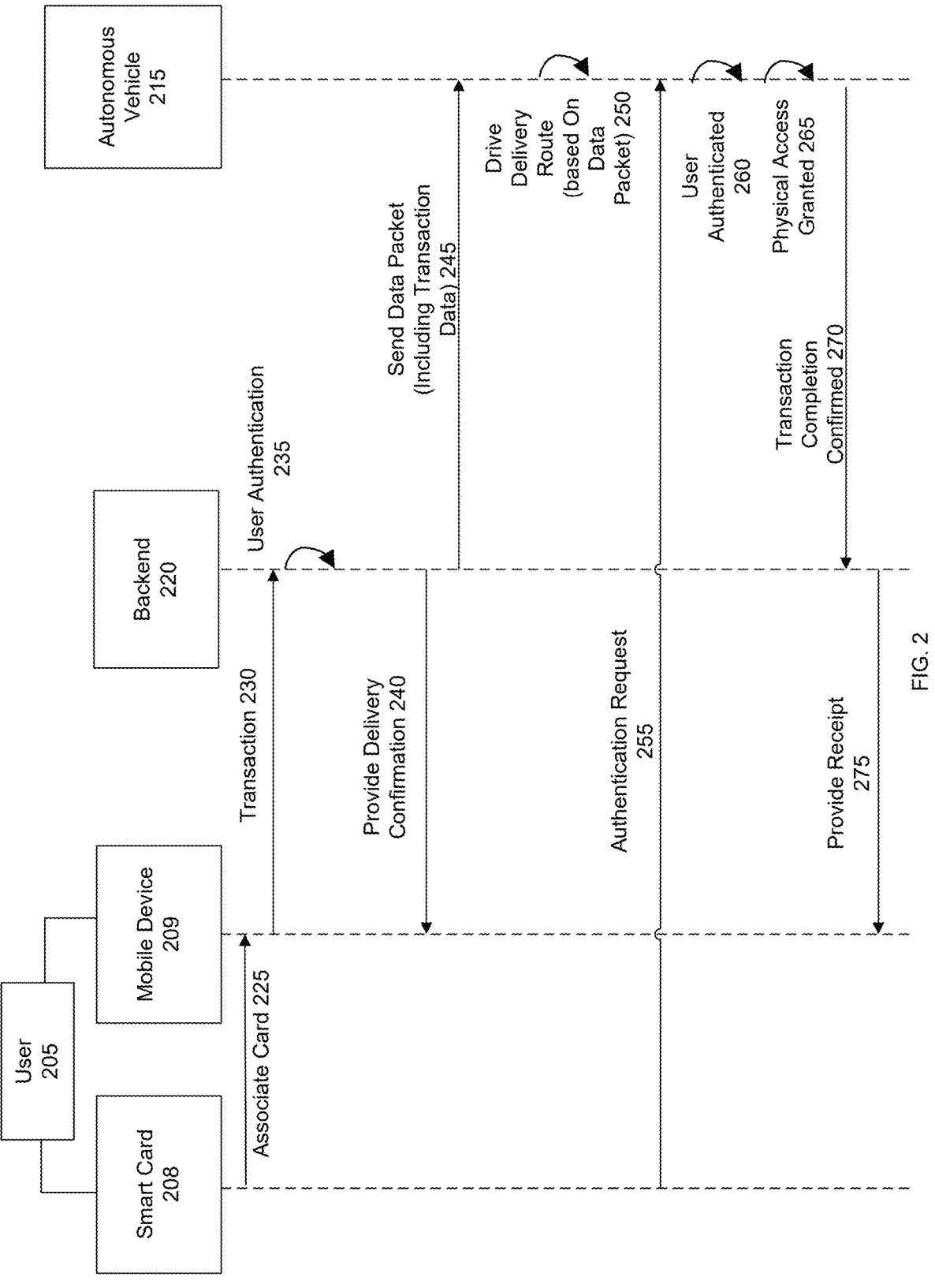
FIG. 2 illustrates a sequence of operations for utilizing an autonomous vehicle transaction system to complete an online transaction according to an exemplary embodiment.

The sequence diagram of FIG. 2 illustrates an exemplary application of embodiments of the invention in conjunction with the system 100 of FIG. 1. In the scenario set forth in FIG. 2, a user 205 has a smart card 208 and a mobile device 209. The mobile device 209 is in communication with a backend 220. Mobile device 209 may be a personal computer, smart phone, smart watch, or any other network enabled computing device. Mobile device 209 may include memory, a network communication, an interactive user interface, and a processor capable of running one or more software applications and a digital wallet. Smart card 208 may be any chip enabled credit card or the like. Smart card 208 may be in communication with mobile device 209 via Bluetooth, NFC, or any other suitable short range communication protocol.

Backend 220 may include one or more processors and may be in communication with mobile device 209 and autonomous vehicle 215. Backend 220 may be configured to transmit to and receive data from mobile device 209 pertaining to a purchase transaction, and may be configured to transmit to and receive data from mobile autonomous vehicle 215 pertaining to operation of autonomous vehicle 215, both as a vehicle and as a point of sales device.

Autonomous vehicle 215 may include one or more processors and memory, as well as storage and inventory control. It may be configured to communicate with backend 220 in order to receive and send driving and route instructions and data, authentication information, sales data, etc. Exemplary embodiments of autonomous vehicles are further described with reference to FIG. 10.

User 205 may hold smart card 208 that may be associated with one or more financial and/or credit accounts, etc. user 205 may also have a mobile device 209. At 225, user 205 may associate smart card 208 with mobile device 209 through any means available. By way of non-limiting example, this may be through inclusion of smart card 208 in a digital wallet of mobile device 209. It may also be through inclusion of smart card 208 with an application installed and running on mobile device 209. The application may be a shopping application or some other application that allows or facilitates payment of online purchases. Smart card 208 may be associated with mobile device 209 through any technological means, including but not limited to, manual entry, NFC, Bluetooth, etc.

At 230, mobile device 209 may transmit a transaction request to backend 220. user 205 may shop for goods on mobile device 209. The shopping may be directly or indirectly connected to backend 220. For example, the backend 220 may be associated with a specific retailer and user 205 may be shopping on that retailer's website through mobile device 209. Shopping on mobile device 209 may include adding one or more products to a virtual cart and then virtually checking out with those one or more products. The act of checking out with one or more products may result in mobile device 209 transmitting a transaction request to backend 220 at step 230.

Backend 220 may respond to the transaction request of 230 by attempting to authenticate the user 205 at step 235. The authentication attempt may include verifying the identity of user 205. Authentication may involve one or more of a user name, password, biometric, challenge question, single or multi-factors including passcodes sent to mobile device 209, etc. Upon successful authentication of user 205, a delivery confirmation may be sent to mobile device 209 at step 240. The delivery confirmation may include an invoice for the purchased good(s) as well as delivery instructions and/or timing. The delivery confirmation may include a means for communicating with backend 220 in order to modify one or more of the goods purchased and the delivery timing. There may also be the option to receive information such as FAQs, utilize chatbots, or access customer service representatives.

Backend 220 sends a data packet to autonomous vehicle 215 at step 245. The data packet may include a delivery address for user 205. The data packet may also include details regarding the purchase transaction, such as a list of items purchased by user 205 as well as authentication data for user 205. The authentication data may include not just the authentication that was completed at step 235, but also data required to perform a subsequent authentication. The data packet may further include a relationship between user 205's purchase transaction and the physical location of those goods in autonomous vehicle 215. The data packet may also include route directions, weather forecast(s), traffic conditions, road closures, etc. The data packet may be one or multiple data packets sent to autonomous vehicle 215. Each data packet may represent one sales transaction to one of a plurality of users. Thus, the autonomous vehicle 215 may be capable of handling multiple purchases simultaneously.

At step 250, autonomous vehicle 215 may drive to user 205. The route taken by autonomous vehicle 215 may be fully dictated by a route defined in the data packet sent from backend 220. The route may also be defined by a combination of data packets when delivery of more than one purchase transaction is required. Thus, in exemplary embodiments, the route may be defined by multiple delivery addresses, and may be optimized to minimize distance traveled. Alternatively, autonomous vehicle 215 may simply use a GPS application and, based on the delivery address(es) provided in the data packet(s), determine and drive a route to user 205 or to multiple users.

Upon arrival at the delivery address, at step 255, user 205 may attempt to gain physical access to autonomous vehicle 215. user 205 may use smart card 208 to attempt authentication with autonomous vehicle 215. In one embodiment, autonomous vehicle may have one or more physical card readers built into the exterior of the vehicle. user 205 may insert smart card 208 into one of these physical card readers and autonomous vehicle 215 may read smart card 208. Autonomous vehicle may be able to verify the smart card through open-loop or closed-loop authentication of the user's identity and the validity of smart card 208. Alternatively, autonomous vehicle 215 may include wireless communications such as Wi-Fi, NFC, Bluetooth, etc. user 205 may simply move smart card 208 near autonomous vehicle 215 and/or include a gesture with smart card 208 such as a swipe, tap, etc. in order to initiate an authorization request at step 255. Autonomous vehicle 215 may utilize authentication technology, for example, as described in FIG. 15, to authenticate user 205. Alternatively, user 205 may use mobile device 209 to initiate the authorization request at 255. In some embodiments, the smart phone may also use wireless communications in much the same way as described with respect to smart card 208.

Autonomous vehicle 215 may receive the authentication request and send that request to one or more of its processors. It may utilize the authentication data provided by backend 220 in order to perform an authentication and verify the identity of user 205 (or at least the validity of smart card 208 and/or mobile device 209). In some embodiments, the data from smart card 208 may be encrypted using authentication technology, for example, as described in FIG. 15, and autonomous vehicle 215 may be equipped with the authentication capabilities described in FIG. 15. Thus, autonomous vehicle 215 may be able to authenticate user 205 via technology at step 260.

Once autonomous vehicle 215 has successfully authenticated user 205, then at step 265, user 205 may be granted physical access to autonomous vehicle 215. A grant of physical access may mean unlocking of a particular door (i.e. driver side rear, passenger side rear, passenger side front, etc.) or automatically unlocking and opening a particular door. It may also mean opening of the trunk. In the event that autonomous vehicle 215 is not a passenger car, granting physical access could mean something different, such as opening a specific compartment on the outside of the vehicle, or the back gate of a delivery truck.

In the event of a passenger car, physical access may be limited to a certain area of the interior space of the car. For example, granting physical access to the driver-side rear door generally means user 205 will have access to the entirety of the inside of the car. However, in exemplary embodiments, autonomous vehicle 215 may be partitioned such that grant of physical access to one specific door limits access within the internal space of autonomous vehicle 215. For example, there may be a physical barrier installed within autonomous vehicle such that each door only provides access to interior volume direction adjacent to that specific door. So in the event that authentication results in autonomous vehicle granting physical access to the driver-side rear door, opening that door would only provide access to a volume directly behind that door and not to the rest of the vehicle. This prevents removal of other products that may not be part of the transaction described at step 230. These other goods may be unpurchased or purchased by other users. The autonomous vehicle may be driving a route to multiple users for multiple purchases and the physical division of the interior and thus, physical restriction on access may facilitate efficiency so that the vehicle does not have to make one round trip per user delivery and can ensure products reach their intended recipients.

Internal portioning may be more granular than simply tied to physical access from outside the autonomous vehicle 215. For example, if physical access is granted to the driver-side rear door, then upon opening said door, user 205 may be presented with a plurality of locked cubbies or other locked sub-partitions. The grant of physical access at step 265 may not only include access to the driver-side rear door, but also to one or more of the sub-partitions once the driver-side rear door is opened. Alternatively, autonomous vehicle 215 may require a second authentication to gain access to the appropriate/relevant sub-partition within autonomous vehicle 215. The same approach is available with the rear trunk, front trunk. Or other doors, including the driver's door. Autonomous vehicle 215 has no driver, so it is possible to remove physical vehicle controls such as the steering wheel, pedals, etc., and use that space for delivery of goods.

The same type of internal portioning is possible with other types of delivery vehicles. For example, a delivery truck could not only include the grant of physical access to the inside of the vehicle at step 265, but also to sub-partitions within the vehicle. For instance, a delivery truck may include multiple doors/windows/access panels/etc., on the outside of the vehicle. Once physical access is granted to one or more of these panels, there may be locked sub-partitioned volumes within the truck that may store multiple users' respective purchased products. The physical access granted at step 265 may include not only access to the panel from the outside of the vehicle, but also access to the sub-partition corresponding to the authenticated user (in this case, user 205).

Of course, the design of the internal volumes may be important for safety reasons. For example, if an internal volume is too large, a person could crawl inside and then autonomous vehicle 215 may depart with a human stow-away. Thus, autonomous vehicle 215 may be designed to prevent such occurrence. For instance, internal volumes and partitions/sub-partitions may be deliberately made such that an average human and/or an average human child would not be able to fit within any such space. Alternatively, if partitions are necessary that are inherently large enough to accommodate a human stow-away, other means may be employed to prevent stowing away. For example, if an internal partition is large enough to fit a human, strategically place bars or other features may prevent human encroachment. Further, a detection system may be employed that monitors weight, employs camera with facial or heat signature, etc., or any other means of detecting unauthorized riders. Autonomous vehicle 215 may be designed to remain stationary until any stow-away exits the vehicle. Some embodiments may also employ other means to incentivize stow-aways from exiting the vehicle such as deploying loud sounds, contacting authorities, deploying offensive odors, etc.

Upon removal of purchased goods by user 205, the transaction may be considered complete at step 270, and notification may be sent to backend 220. Autonomous vehicle 215 may be able to track successful removal of goods from internal spaces. Systems may be employed that track weight differentials, have light curtains or beams that indicate when they have been broken by hands reaching in to remove products, etc. Further, video surveillance may be used to confirm successful transaction completion and for evidence in the event of disputes. Autonomous vehicle 215 may be equipped with self-closing and relocking doors, partitions, sub-partitions, etc. These self-closing and relocking doors may be programmed to engage after a certain default amount of time, idle time, in the case of a security event, or any other out-of-process event. For example, if a user authenticates at autonomous vehicle 215 but then does not remove the purchased goods, then after a defined amount of time, autonomous vehicle 215 may close and relock any outside access doors, panels, etc., and may also close and relock any internal partitions. In some embodiments, autonomous vehicle 215 may then begin a visible countdown timer whereby user 205 may re-authenticate to re-gain access to the purchased products. If re-authentication does not occur, then autonomous vehicle 215 may leave and continue a defined route. Alternatively, autonomous vehicle 215 may provide no countdown timer and simply continue on a defined route. Other responses may be implemented as well.

In the event of a security event such as the detection of attempted theft, autonomous vehicle 215 may immediately close and relock all doors, partitions, windows, panels, etc. and then leave the scene of the security incident. Autonomous vehicle 215 may continue on a defined route or return to a starting point for inspection.

Upon autonomous vehicle 215 determining that the transaction was completed successfully and notification was sent to backend 220 at step 270, backend 220 may provide a receipt for the purchase to user 205 via mobile device 209 at step 275.

It should be appreciated that while FIG. 2 was described with respect to traditional internet shopping and delivery to home, the utility described herein is not so narrowly limited. There may be great utility in other areas and industries. For example, this system may be used in connection with golf courses. A player on a golf course might use his or her phone to order a beverage, snack, additional golf balls, tees, gloves, etc. An autonomous golf cart, modified to deliver purchased items may drive to the golfer to deliver purchased items. The steps identified and discussed above may be equally applicable to the golf cart and golfer interaction, including authentication, physical access, etc.

This system may also be applicable in intermediate shipping operations where suppliers are shipping goods to manufacturers, retailers, etc. In these instances, the vehicles could be larger than the scale of vehicle generally contemplated for consumer product transactions. For instance, the autonomous vehicle 215 could be a semi and trailer. It is also possible to envision an application of this invention implemented to some degree on a train where deliveries occur at set points, but authentication and physical access could be controlled in much the same way as discussed above, only adapted to train cars. Also, the above sequence could also be adapted to drone-based deliveries thereby obviating the need for one drone per user delivery 13 although there are size vs. weight considerations and different factors at play as compared to the autonomous ground-based vehicle contemplated in FIG. 2.

Figure 3:
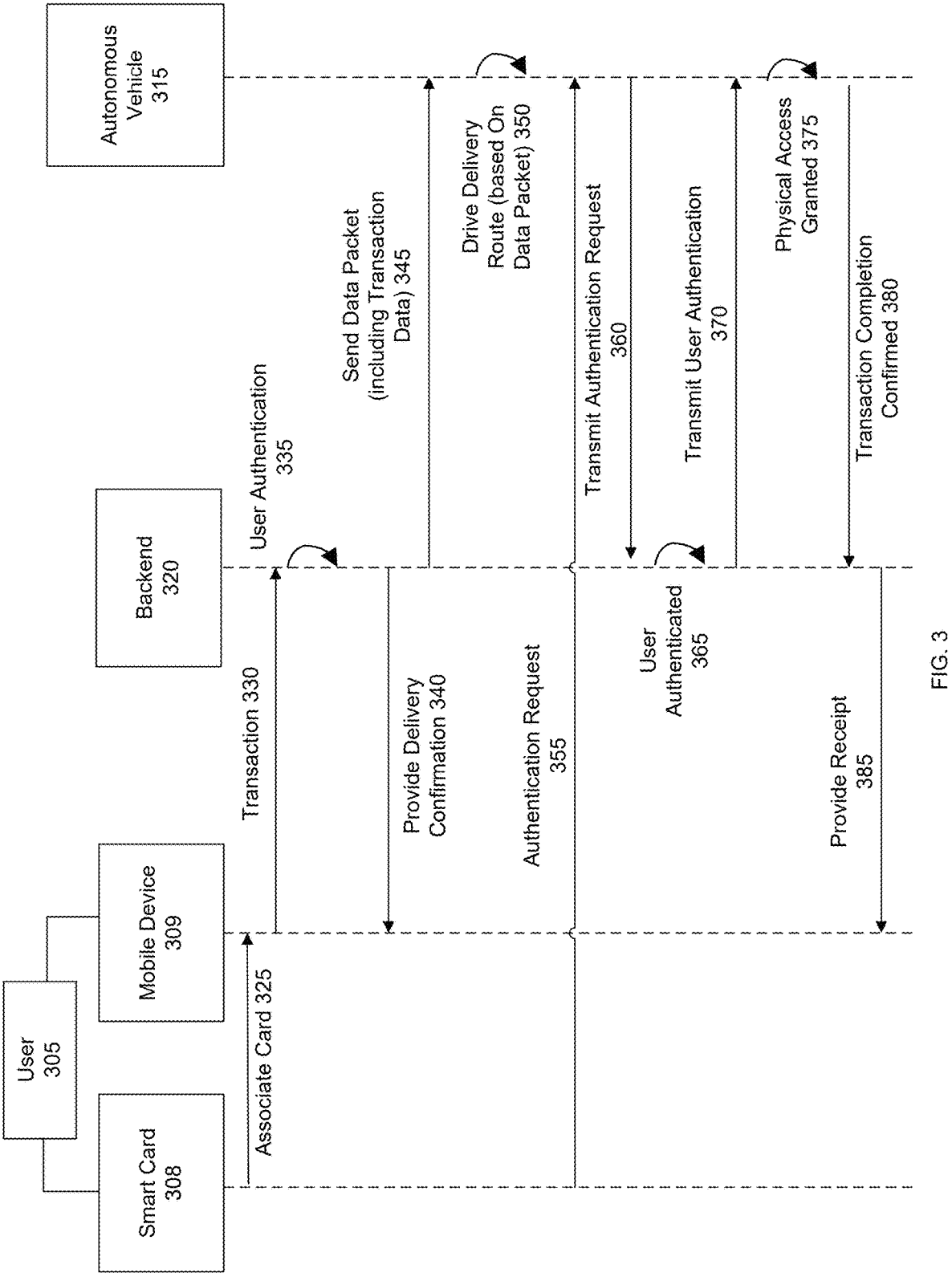
FIG. 3 illustrates a sequence of operations for utilizing an autonomous vehicle transaction system to complete an online transaction according to an exemplary embodiment.

The sequence diagram of FIG. 3 illustrates an exemplary application of embodiments of the invention in conjunction with the system 100 of FIG. 1. In the scenario set forth in FIG. 3, a user 305 has a smart card 308 and a mobile device 309. The mobile device 309 is in communication with a backend 320. Mobile device 309 may be a personal computer, smart phone, smart watch, or any other network enabled computing device. Mobile device 309 may include memory, a network communication, an interactive user interface, and a processor capable of running one or more software applications and a digital wallet. Smart Card 308 may be any chip enabled credit card or the like. Smart Card 308 may be in communication with mobile device 309 via Bluetooth, NFC, or any other suitable short range communication protocol.

Backend 320 may include one or more processors and may be in communication with mobile device 309 and autonomous vehicle 315. Backend 320 may be configured to transmit to and receive data from mobile device 309 pertaining to a purchase transaction, and may be configured to transmit to and receive data from mobile autonomous vehicle 315 pertaining to operation of autonomous vehicle 315, both as a vehicle and as a point of sales device.

Autonomous vehicle 315 may include one or more processors and memory, as well as storage and inventory control. It may be configured to communicate with backend 320 in order to receive and send driving and route instructions and data, authentication information, sales data, etc.

user 305 may hold smart card 308 that may be associated with one or more financial and/or credit accounts, etc. user 305 may also have a mobile device 309. At 325, user 305 may associate smart card 308 with mobile device 309 through any means available. By way of non-limiting example, this may be through inclusion of smart card 308 in a digital wallet of mobile device 309. It may also be through inclusion of smart card 308 with an application installed and running on mobile device 309. The application may be a shopping application or some other application that allows or facilitates payment of online purchases. Smart card 308 may be associated with mobile device 309 through any technological means, including but not limited to, manual entry, NFC, Bluetooth, etc.

At 330, mobile device 309 may transmit a transaction request to backend 320. user 305 may shop for goods on mobile device 309. The shopping may be directly or indirectly connected to backend 320. For example, the backend 320 may be associated with a specific retailer and user 305 may be shopping on that retailer's website through mobile device 309. Shopping on mobile device 309 may include adding one or more products to a virtual cart and then virtually checking out with those one or more products. The act of checking out with one or more products may result in mobile device 309 transmitting a transaction request to backend 320 at step 330.

Backend 320 may respond to the transaction request of 330 by attempting to authenticate the user 305 at step 335. The authentication attempt may include verifying the identity of user 305. Authentication may involve one or more of a user name, password, biometric, challenge question, single or multi-factors including passcodes sent to mobile device 309, etc. Upon successful authentication of user 305, a delivery confirmation may be sent to mobile device 309 at step 340. The delivery confirmation may include an invoice for the purchased good(s) as well as delivery instructions and/or timing. The delivery confirmation may include a means for communicating with backend 320 in order to modify one or more of the goods purchased and the delivery timing. There may also be the option to receive information such as FAQs, utilize chatbots, or access customer service representatives.

Backend 320 sends a data packet to autonomous vehicle 315 at step 345. The data packet may include a delivery address for user 305. The data packet may also include details regarding the purchase transaction, such as a list of items purchased by user 305 as well as authentication data for user 305. The authentication data may include not just the authentication that was completed at step 335, but also data required to perform a subsequent authentication. The data packet may further include a relationship between user 305's purchase transaction and the physical location of those goods in autonomous vehicle 315. The data packet may also include route directions, weather forecast(s), traffic conditions, road closures, etc. The data packet may be one or multiple data packets sent to autonomous vehicle 315. Each data packet may represent one sales transaction to one of a plurality of users. Thus, the autonomous vehicle 315 may be capable of handling multiple purchases simultaneously.

At step 350, autonomous vehicle 315 may drive to user 305. The route taken by autonomous vehicle 315 may be fully dictated by a route defined in the data packet sent from backend 320. The route may also be defined by a combination of data packets when delivery of more than one purchase transaction is required. Thus, in exemplary embodiments, the route may be defined by multiple delivery addresses, and may be optimized to minimize distance traveled. Alternatively, autonomous vehicle 315 may simply use a GPS application and, based on the delivery address(es) provided in the data packet(s), determine and drive a route to user 305 or to multiple users.

Upon arrival at the delivery address, at step 355, user 305 may attempt to gain physical access to autonomous vehicle 315. user 305 may use smart card 308 to attempt authentication with autonomous vehicle 315. In one embodiment, autonomous vehicle may have one or more physical card readers built into the exterior of the vehicle. User 305 may insert smart card 308 into one of these physical card readers and autonomous vehicle 315 may read smart card 308. Autonomous vehicle may be able to verify the smart card through open-loop or closed-loop authentication of the user's identity and the validity of smart card 308. Alternatively, autonomous vehicle 315 may include wireless communications such as Wi-Fi, NFC, Bluetooth, etc. User 305 may simply move smart card 308 near autonomous vehicle 315 and/or include a gesture with smart card 308 such as a swipe, tap, etc. in order to initiate an authorization request at step 355. Autonomous vehicle 315 may transmit the authorization request to backend 320 at step 360. Backend 320 may utilize authentication technology, for example, as described in FIG. 15, to authenticate user 305. Alternatively, user 305 may use mobile device 309 to initiate the authorization request at 355. In some embodiments, the smart phone may also use wireless communications in much the same way as described with respect to smart card 308.

Backend 320 may receive the authentication request and send that request to one or more of its processors. It may utilize the authentication data stored in one or more databases associated with backend 320 in order to perform an authentication and verify the identity of user 305 (or at least the validity of smart card 308 and/or mobile device 309). In some embodiments, the data from smart card 308 may be encrypted per authentication technology, for example, as described in FIG. 15, and backend 320 may be equipped with this same authentication technology. Thus, autonomous vehicle 315 may be able to authenticate user 305 via proprietary technology implemented by the backend 320 at step 365.

At step 370, the backend 320 may transmit confirmation of user authentication to autonomous vehicle 315. Once autonomous vehicle 315 has successfully received confirmation of use authentication, then at step 375, user 305 may be granted physical access to autonomous vehicle 315. A grant of physical access may mean unlocking of a particular door (i.e. driver side rear, passenger side rear, passenger side front, etc.) or automatically unlocking and opening a particular door. It may also mean opening of the trunk. In the event that autonomous vehicle 315 is not a passenger car, granting physical access could mean something different, such as opening a specific compartment on the outside of the vehicle, or the back gate of a delivery truck.

In the event of a passenger car, physical access may be limited to a certain area of the interior space of the car. For example, granting physical access to the driver-side rear door generally means user 305 will have access to the entirety of the inside of the car. However, in exemplary embodiments, autonomous vehicle 315 may be partitioned such that grant of physical access to one specific door limits access within the internal space of autonomous vehicle 315. For example, there may be a physical barrier installed within autonomous vehicle such that each door only provides access to interior volume direction adjacent to that specific door. So in the event that authentication results in autonomous vehicle granting physical access to the driver-side rear door, opening that door would only provide access to a volume directly behind that door and not to the rest of the vehicle. This prevents removal of other products that may not be part of the transaction described at step 330. These other goods may be unpurchased or purchased by other users. The autonomous vehicle may be driving a route to multiple users for multiple purchases and the physical division of the interior and thus, physical restriction on access may facilitate efficiency so that the vehicle does not have to make one round trip per user delivery and can ensure products reach their intended recipients.

Internal portioning may be more granular than simply tied to physical access from outside the autonomous vehicle 315. For example, if physical access is granted to the driver-side rear door, then upon opening said door, user 305 may be presented with a plurality of locked cubbies or other locked sub-partitions. The grant of physical access at step 375 may not only include access to the driver-side rear door, but also to one or more of the sub-partitions once the driver-side rear door is opened. The same approach is available with the rear trunk, front trunk. Or other doors, including the driver's door. Autonomous vehicle 315 has no driver, so it is possible to remove physical vehicle controls such as the steering wheel, pedals, etc., and use that space for delivery of goods.

The same type of internal portioning is possible with other types of delivery vehicles. For example, a delivery truck could not only include the grant of physical access to the inside of the vehicle at step 375, but also to sub-partitions within the vehicle. For instance, a delivery truck may include multiple doors/windows/access panels/etc., on the outside of the vehicle. Once physical access is granted to one or more of these panels, there may be locked sub-partitioned volumes within the truck that may store multiple users' respective purchased products. The physical access granted at step 375 may include not only access to the panel from the outside of the vehicle, but also access to the sub-partition corresponding to the authenticated user (in this case, user 305).

Of course, the design of the internal volumes may be important for safety reasons. For example, if an internal volume is too large, a person could crawl inside and then autonomous vehicle 315 may depart with a human stow-away. Thus, autonomous vehicle 315 may be designed to prevent such occurrence. For instance, internal volumes and partitions/sub-partitions may be deliberately made such that an average human and/or an average human child would not be able to fit within any such space. Alternatively, if partitions are necessary that are inherently large enough to accommodate a human stow-away, other means may be employed to prevent stowing away. For example, if an internal partition is large enough to fit a human, strategically place bars or other features may prevent human encroachment. Further, a detection system may be employed that monitors weight, employs camera with facial or heat signature, etc., or any other means of detecting unauthorized riders. Autonomous vehicle 315 may be designed to remain stationary until any stow-away exits the vehicle. Some embodiments may also employ other means to incentivize stow-aways from exiting the vehicle such as deploying loud sounds, contacting authorities, deploying offensive odors, etc.

Upon removal of purchased goods by user 305, the transaction may be considered complete at step 380, and notification may be sent to backend 320. Autonomous vehicle 315 may be able to track successful removal of goods from internal spaces. Systems may be employed that track weight differentials, have light curtains or beams that indicate when they have been broken by hands reaching in to remove products, etc. Further, video surveillance may be used to confirm successful transaction completion and for evidence in the event of disputes. Autonomous vehicle 315 may be equipped with self-closing and relocking doors, partitions, sub-partitions, etc. These self-closing and relocking doors may be programmed to engage after a certain default amount of time, idle time, in the case of a security event, or any other out-of-process event. For example, if a user authenticates at autonomous vehicle 315 but then does not remove the purchased goods, then after a defined amount of time, autonomous vehicle 315 may close and relock any outside access doors, panels, etc., and may also close and relock any internal partitions. In some embodiments, autonomous vehicle 315 may then begin a visible countdown timer whereby user 305 may re-authenticate to re-gain access to the purchased products. If re-authentication does not occur, then autonomous vehicle 315 may leave and continue a defined route. Alternatively, autonomous vehicle 315 may provide no countdown timer and simply continue on a defined route. Other responses may be implemented as well.

In the event of a security event such as the detection of attempted theft, autonomous vehicle 315 may immediately close and relock all doors, partitions, windows, panels, etc. and then leave the scene of the security incident. Autonomous vehicle 315 may continue on a defined route or return to a starting point for inspection.

Upon autonomous vehicle 315 determining that the transaction was completed successfully and notification was sent to backend 320 at step 380, backend 320 may provide a receipt for the purchase to user 305 via mobile device 309 at step 385.

In some embodiments, it may be desirable to implement a machine learning algorithm to predict one or more aspects of the autonomous vehicle 415 travel route. This approach would allow for adaptation of the system over time to maximize one or more stated goals such as fuel efficiency, minimization of delivery time, etc. The sequence diagram of FIG. 4 illustrates an exemplary scenario in which the backend fully employs a machine learning algorithm in connection with an autonomous vehicle transaction system.

Figure 4:
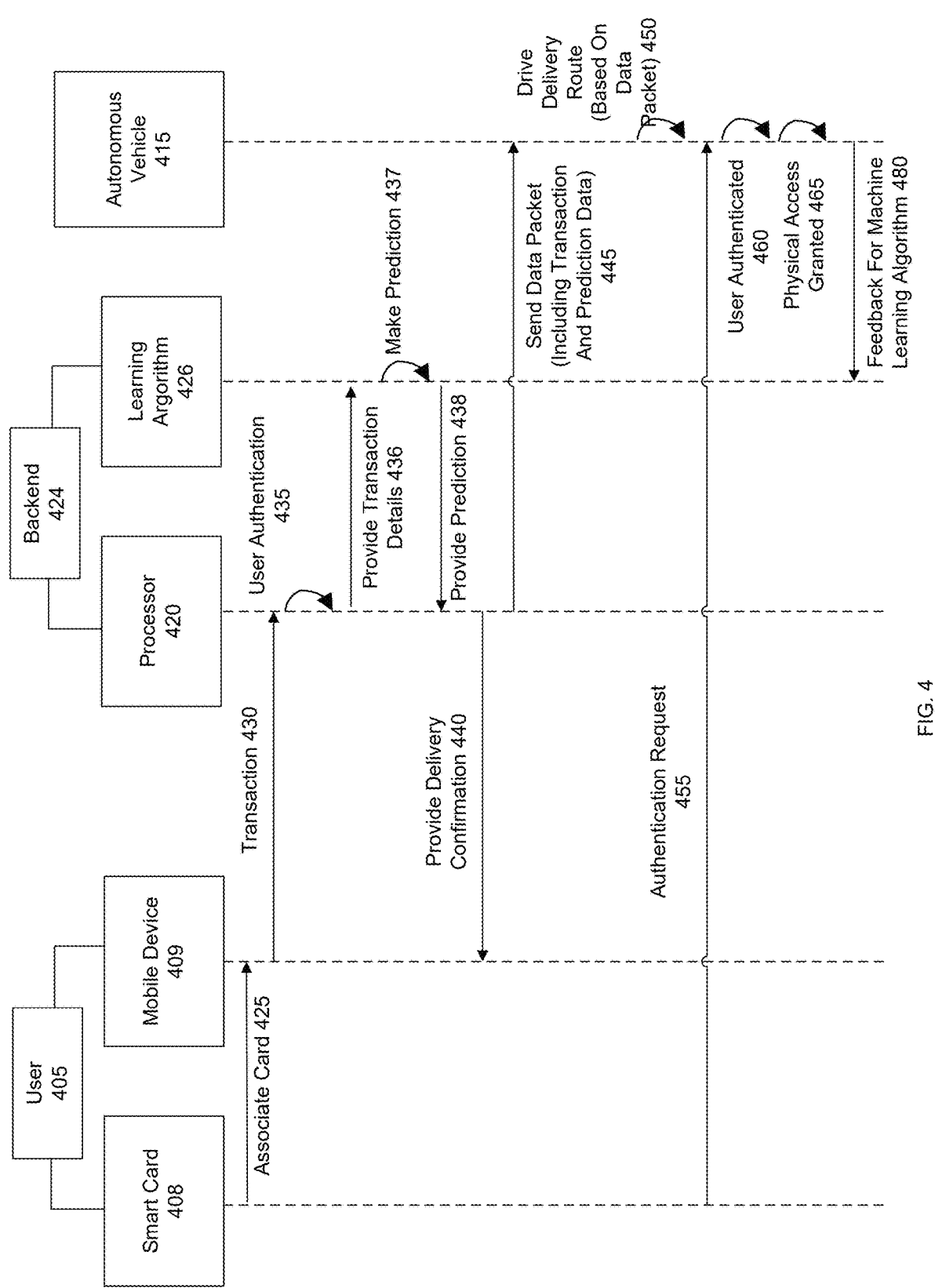
FIG. 4 illustrates a sequence of operations for utilizing machine learning and an autonomous vehicle transaction system to complete an online transaction according to an exemplary embodiment.

FIG. 4 illustrates an exemplary application of embodiments of the invention in conjunction with the system 100 of FIG. 1. In the scenario set forth in FIG. 4, a user 405 has a smart card 408 and a mobile device 409. The mobile device 409 is in communication with a backend 424. Mobile device 409 may be a personal computer, smart phone, smart watch, or any other network enabled computing device. Mobile device 409 may include memory, a network communication, an interactive user interface, and a processor capable of running one or more software applications and a digital wallet. Smart Card 408 may be any chip enabled credit card or the like. Smart Card 408 may be in communication with mobile device 409 via Bluetooth, NFC, or any other suitable short range communication protocol.

Backend 424 may include processor 420 as well as learning algorithm 426, and may be in communication with mobile device 409 and autonomous vehicle 415. Backend 424 may be configured to transmit to and receive data from mobile device 409 pertaining to a purchase transaction, and may be configured to transmit to and receive data from mobile autonomous vehicle 415 pertaining to operation of autonomous vehicle 415, both as a vehicle and as a point of sales device.

Autonomous vehicle 415 may include one or more processors and memory, as well as storage and inventory control. It may be configured to communicate with processor 420 in order to receive and send driving and route instructions and data, authentication information, sales data, etc.

User 405 may hold smart card 408 that may be associated with one or more financial and/or credit accounts, etc. User 405 may also have a mobile device 409. At 425, user 405 may associate smart card 408 with mobile device 409 through any means available. By way of non-limiting example, this may be through inclusion of smart card 408 in a digital wallet of mobile device 409. It may also be through inclusion of smart card 408 with an application installed and running on mobile device 409. The application may be a shopping application or some other application that allows or facilitates payment of online purchases. Smart card 408 may be associated with mobile device 409 through any technological means, including but not limited to, manual entry, NFC, Bluetooth, etc.

At 430, mobile device 409 may transmit a transaction request to processor 420. User 405 may shop for goods on mobile device 409. The shopping may be directly or indirectly connected to processor 420 of backend 424. For example, the processor 420 may be associated with a specific retailer and user 405 may be shopping on that retailer's website through mobile device 409. Shopping on mobile device 409 may include adding one or more products to a virtual cart and then virtually checking out with those one or more products. The act of checking out with one or more products may result in mobile device 409 transmitting a transaction request to processor 420 at step 430.

Processor 420 may respond to the transaction request of 430 by attempting to authenticate the user 405 at step 435. The authentication attempt may include verifying the identity of user 405. Authentication may involve one or more of a user name, password, biometric, challenge question, single or multi-factors including passcodes sent to mobile device 409, etc.

Processor 420 may provide transaction details to learning algorithm 426 at step 436. The transaction details may include items purchased, identity of user 405, and a delivery address for user 405. Learning algorithm may have access to additional data and information. For example, backend 424 may store historical transaction data for users, including user 405. The historical user transaction data may comprise a history of user transactions completed with one or more accounts associated with a financial entity or merchant associated with backend 424. Moreover, in instances where backend 424 is associated with a non-financial entity, the non-financial entity may maintain a database that includes a history of user transactions completed with one or more accounts for which the respective financial entities for those one or more accounts have provided the historical transaction data, or have provided access to transaction data maintained on the financial entities' databases. Backend 424 may store historical user transaction data for each of its users, thereby comprising a large group of consumer transaction history. At 437, learning algorithm 426 may utilize user 405 consumer transaction history data in making a prediction. That prediction may be provided to processor 420 at step 438. In one embodiment, learning algorithm 426 may also receive the large group of consumer transaction history as a discrete input to the learning algorithm 426. In some embodiments, machine learning algorithm 426 may receive additional inputs such as user data scraped from social media websites or other social media interfaces. The scrapped user data from social media may include posts made by the user, responses to posts made by others, discussions including the user, user likes, user dislikes, user interaction with social media content, lack of user interaction with social media content, etc. Learning algorithm 426 may also have access to other data such as current traffic conditions, current weather conditions, historical traffic conditions, historical weather conditions, event schedules for the area in which autonomous vehicle 415 operates (i.e. travels), road construction schedules, etc.

Learning algorithm 426 may be trained on training data sets comprising the same general data types discussed above. At step 437, learning algorithm 426 may use the received data to predict an optimal delivery route. The delivery route may be a direct route to user 405, or may involve a plurality of deliveries for different users (including user 405). The "optimal" route may be defined as a route which favors timing and therefore seeks to find the fastest delivery route. "Optimal" may also be the most fuel efficient route, the shortest route, the safest route, or any other potential criteria that could be maximized or minimized. In some embodiments, more than one factor may be considered and weightings may be given between those factors. For example, learning algorithm 426 may seek to find a quickest delivery route that also avoids tolls, roadwork, adverse weather, etc. There could be a prediction that seeks to minimize fuel consumption as a primary goal, but also use time as a secondary consideration, and learning algorithm 426 may predict a route that is not the lowest fuel consumption, but is the best predicted tradeoff between fuel consumption vs minimizing delivery time. Other more complex interactions may be considered and predicted by learning algorithm 426. The complexity of the prediction at 437 may be increased significantly when considering a multi-delivery route prediction. In this case, "optimal" may be defined in relation to a multitude of factors and how those factors interact with each other for each planned delivery. For instance, it might not make much sense to plan a route that doubles back repeatedly for subsequent deliveries, but there may be other considerations such as one-way streets, traffic, road closures, sporting event, avoidance of tolls, etc.

At 437, learning algorithm 426 may make one or more predictions based on varying criteria, as discussed above. Learning algorithm 426 may utilize a system of weights and ranks for the predictions based on a confidence in the prediction. The confidence in a prediction may be based on confidences in one or more data points relied on by learning algorithm 426, such as current weather conditions and how those conditions might change by the time autonomous vehicle 415 reaches the area(s) corresponding to the weather conditions. The same is true for current traffic, road closures due to accidents or other transient events, etc. Confidence in prediction(s) may also be based on affirming feedback based on one or more prior predictions. Machine learning algorithm 426 may be trained to better predict driving routes by analyzing results across a plurality of autonomous vehicles.

Once the learning algorithm 426 has predicted one or more driving routes, a delivery confirmation may be sent to mobile device 409 at step 440. The delivery confirmation may include an invoice for the purchased good(s) as well as delivery instructions and/or timing. The delivery confirmation may include a means for communicating with backend 424 via processor 420 in order to modify one or more of the goods purchased and the delivery timing. There may also be the option to receive information such as FAQs, utilize chatbots, or access customer service representatives.

Further, once the learning algorithm 426 has predicted one or more driving routes, those predicted routes are sent to processor 420 for packaging and inclusion in a data packet that is sent to autonomous vehicle 415 at step 445. The data packet may include a delivery address, name, and other information relating to user 405. The data packet may also include details regarding the purchase transaction, such as a list of items purchased by user 405 as well as authentication data for user 405. The authentication data may include not just the authentication that was completed at step 435, but also data required to perform a subsequent authentication. The data packet may further include a relationship between user 405's purchase transaction and the physical location of those goods in autonomous vehicle 415. The data packet may also include the prediction provided by learning algorithm 426 which may comprise specific route directions, and which may also include weather forecast(s), traffic conditions, road closures, etc. The prediction may also have alternate directions based on potential occurrences or changes in conditions. Alternatively, learning algorithm 426 may continue to make one or more predictions during the assumed delivery period of autonomous vehicle 415, and any new predictions differing from the original prediction may be sent to processor 420, and then packaged and sent to autonomous vehicle 415. Such updates may cause deviations from the original route and constitute an updated route based on the updated prediction. The data packet may be one or multiple data packets sent to autonomous vehicle 415. Each data packet may represent one sales transaction to one of a plurality of users. Thus, the autonomous vehicle 415 may be capable of handling multiple purchases simultaneously or within driving a single route.

At step 450, autonomous vehicle 415 may drive to user 405. The route taken by autonomous vehicle 415 may be fully dictated by the prediction or predictions from learning algorithm 426. Thus, in exemplary embodiments, the route may be defined by multiple delivery addresses, and may be optimized to minimize distance traveled or any other factor or combination of factors.

Upon arrival at the delivery address for user 405, at step 455, user 405 may attempt to gain physical access to autonomous vehicle 415. User 405 may use smart card 408 to attempt authentication with autonomous vehicle 415. In one embodiment, autonomous vehicle may have one or more physical card readers built into the exterior of the vehicle. User 405 may insert smart card 408 into one of these physical card readers and autonomous vehicle 415 may read smart card 408. Autonomous vehicle may be able to verify the smart card through open-loop or closed-loop authentication of the user's identity and the validity of smart card 408. Alternatively, autonomous vehicle 415 may include wireless communications such as Wi-Fi, NFC, Bluetooth, etc. User 405 may simply move smart card 408 near autonomous vehicle 415 and/or include a gesture with smart card 408 such as a swipe, tap, etc. in order to initiate an authorization request at step 455. Autonomous vehicle 215 may utilize authentication technology, for example, as described in FIG. 15, to authenticate user 405. Alternatively, user 405 may use mobile device 409 to initiate the authorization request at 455. In some embodiments, the smart phone may also use wireless communications in much the same way as described with respect to smart card 408.

Autonomous vehicle 415 may receive the authentication request and send that request to one or more of its processors. It may utilize the authentication data provided by processor 420 in order to perform an authentication and verify the identity of user 405 (or at least the validity of smart card 408 and/or mobile device 409). In some embodiments, the data from smart card 408 may be encrypted per authentication technology, for example, as described in FIG. 15, and autonomous vehicle 415 may be equipped with the same authentication technology. Thus, autonomous vehicle 415 may be able to authenticate user 405 via proprietary technology at step 460.

Once autonomous vehicle 415 has successfully authenticated user 405, then at step 465, user 405 may be granted physical access to autonomous vehicle 415. A grant of physical access may mean unlocking of a particular door (i.e. driver side rear, passenger side rear, passenger side front, etc.) or automatically unlocking and opening a particular door. It may also mean opening of the trunk. In the event that autonomous vehicle 415 is not a passenger car, granting physical access could mean something different, such as opening a specific compartment on the outside of the vehicle, or the back gate of a delivery truck.

In the event of a passenger car, physical access may be limited to a certain area of the interior space of the car. For example, granting physical access to the driver-side rear door generally means user 405 will have access to the entirety of the inside of the car. However, in exemplary embodiments, autonomous vehicle 415 may be partitioned such that grant of physical access to one specific door limits access within the internal space of autonomous vehicle 415. For example, there may be a physical barrier installed within autonomous vehicle such that each door only provides access to interior volume direction adjacent to that specific door. So in the event that authentication results in autonomous vehicle granting physical access to the driver-side rear door, opening that door would only provide access to a volume directly behind that door and not to the rest of the vehicle. This prevents removal of other products that may not be part of the transaction described at step 430. These other goods may be unpurchased or purchased by other users. The autonomous vehicle may be driving a route to multiple users for multiple purchases and the physical division of the interior and thus, physical restriction on access may facilitate efficiency so that the vehicle does not have to make one round trip per user delivery and can ensure products reach their intended recipients.

Internal portioning may be more granular than simply tied to physical access from outside the autonomous vehicle 415. For example, if physical access is granted to the driver-side rear door, then upon opening said door, user 405 may be presented with a plurality of locked cubbies or other locked sub-partitions. The grant of physical access at step 465 may not only include access to the driver-side rear door, but also to one or more of the sub-partitions once the driver-side rear door is opened. The same approach is available with the rear trunk, front trunk. Or other doors, including the driver's door. Autonomous vehicle 415 has no driver, so it is possible to remove physical vehicle controls such as the steering wheel, pedals, etc., and use that space for delivery of goods.

The same type of internal portioning is possible with other types of delivery vehicles. For example, a delivery truck could not only include the grant of physical access to the inside of the vehicle at step 465, but also to sub-partitions within the vehicle. For instance, a delivery truck may include multiple doors/windows/access panels/etc., on the outside of the vehicle. Once physical access is granted to one or more of these panels, there may be locked sub-partitioned volumes within the truck that may store multiple users' respective purchased products. The physical access granted at step 465 may include not only access to the panel from the outside of the vehicle, but also access to the sub-partition corresponding to the authenticated user (in this case, user 405).

Of course, the design of the internal volumes may be important for safety reasons. For example, if an internal volume is too large, a person could crawl inside and then autonomous vehicle 415 may depart with a human stow-away. Thus, autonomous vehicle 415 may be designed to prevent such occurrence. For instance, internal volumes and partitions/sub-partitions may be deliberately made such that an average human and/or an average human child would not be able to fit within any such space. Alternatively, if partitions are necessary that are inherently large enough to accommodate a human stow-away, other means may be employed to prevent stowing away. For example, if an internal partition is large enough to fit a human, strategically place bars or other features may prevent human encroachment. Further, a detection system may be employed that monitors weight, employs camera with facial or heat signature, etc., or any other means of detecting unauthorized riders. Autonomous vehicle 415 may be designed to remain stationary until any stow-away exits the vehicle. Some embodiments may also employ other means to incentivize stow-aways from exiting the vehicle such as deploying loud sounds, contacting authorities, deploying offensive odors, etc.

Upon removal of purchased goods by user 405, the transaction may be considered complete. Autonomous vehicle 415 may be able to track successful removal of goods from internal spaces. Systems may be employed that track weight differentials, have light curtains or beams that indicate when they have been broken by hands reaching in to remove products, etc. Further, video surveillance may be used to confirm successful transaction completion and for evidence in the event of disputes. Autonomous vehicle 415 may be equipped with self-closing and relocking doors, partitions, sub-partitions, etc. These self-closing and relocking doors may be programmed to engage after a certain default amount of time, idle time, in the case of a security event, or any other out-of-process event. For example, if a user authenticates at autonomous vehicle 415 but then does not remove the purchased goods, then after a defined amount of time, autonomous vehicle 415 may close and relock any outside access doors, panels, etc., and may also close and relock any internal partitions. In some embodiments, autonomous vehicle 415 may then begin a visible countdown timer whereby user 405 may re-authenticate to re-gain access to the purchased products. If re-authentication does not occur, then autonomous vehicle 415 may leave and continue a defined route. Alternatively, autonomous vehicle 415 may provide no countdown timer and simply continue on a defined route. Other responses may be implemented as well.

In the event of a security event such as the detection of attempted theft, autonomous vehicle 415 may immediately close and relock all doors, partitions, windows, panels, etc. and then leave the scene of the security incident. Autonomous vehicle 415 may continue on a defined route or return to a starting point for inspection.

Upon autonomous vehicle 415 determining that the transaction was completed, autonomous vehicle 415 may send feedback for machine learning algorithm 426 at step 480. This feedback may be sent to processor 420 and then shared from processor 420 to learning algorithm 426. The feedback may include metrics regarding the delivery. For example, the metrics may include whether delivery was successful, whether user 405 was able to successfully authenticate, timing details (such as time to authenticate and time to complete transaction once arrived at delivery address, driving conditions, weather, road conditions, traffic, construction, road closures, and any other factors that inform the delivery route. These metrics may be compared against the prediction to determine how closely the prediction matched the real-world implementation of the predicted route. Further these metrics may be compared against factors used to create the prediction in order to explain differences between the prediction and the real-world implementation of the predicted route. Learning algorithm 426 may use the feedback data to update and refine learning algorithm 426 including, but not limited to, changing associations between factors, implementing new discovered factors that may be relevant to a prediction, changing weighting of factors, etc.

In some embodiments, it may be desirable to implement a machine learning algorithm to predict one or more aspects of the autonomous vehicle 515 travel route. This approach would allow for adaptation of the system over time to maximize one or more stated goals such as fuel efficiency, minimization of delivery time, etc. The sequence diagram of FIG. 5 illustrates an exemplary scenario in which the backend fully employs a machine learning algorithm in connection with an autonomous vehicle transaction system.

Figure 5:
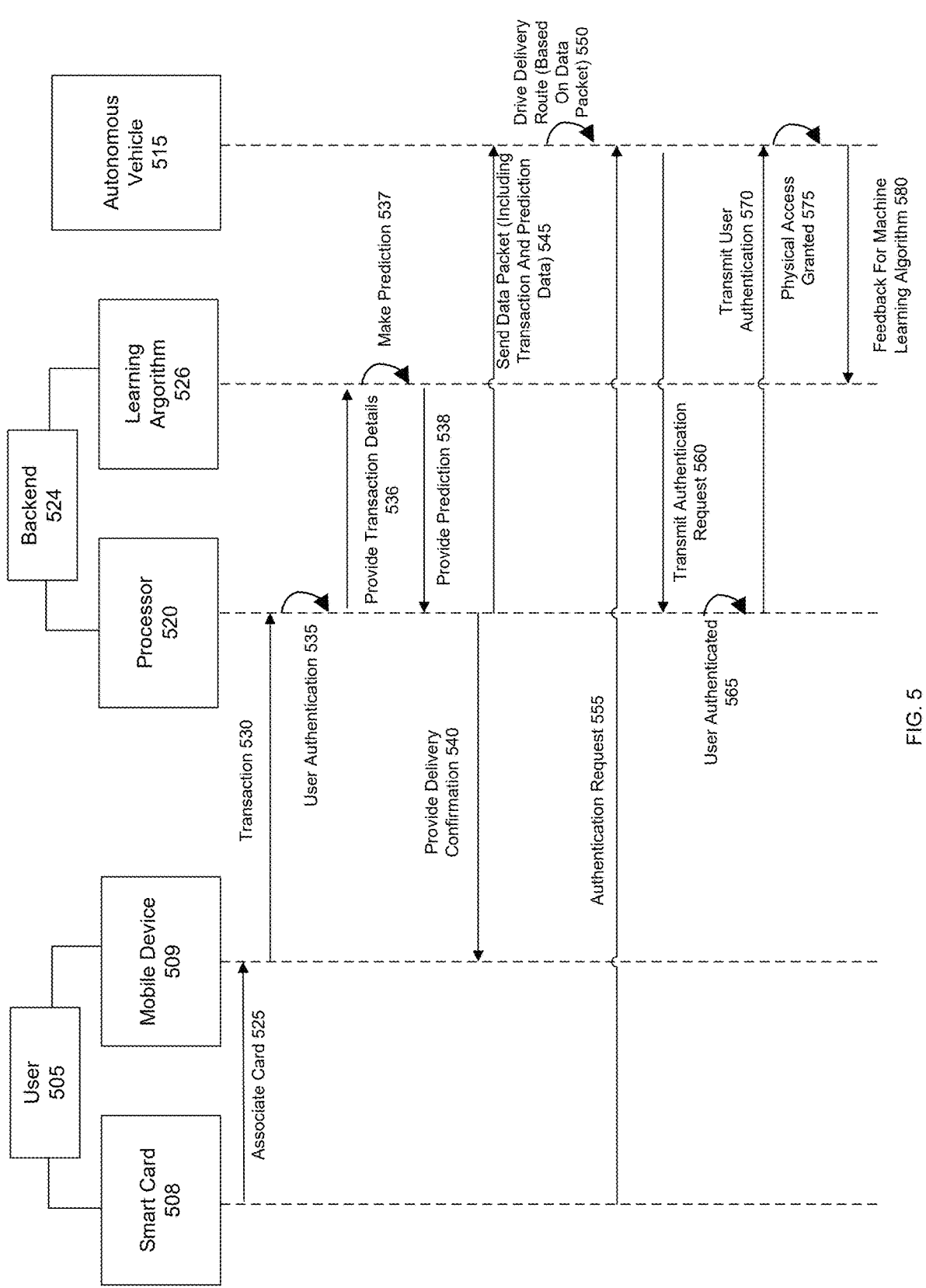
FIG. 5 illustrates a sequence of operations for utilizing machine learning and an autonomous vehicle transaction system to complete an online transaction according to an exemplary embodiment.

FIG. 5 illustrates an exemplary application of embodiments of the invention in conjunction with the system 100 of FIG. 1. In the scenario set forth in FIG. 5, a user 505 has a smart card 508 and a mobile device 509. The mobile device 509 is in communication with a backend 524. Mobile device 509 may be a personal computer, smart phone, smart watch, or any other network enabled computing device. Mobile device 509 may include memory, a network communication, an interactive user interface, and a processor capable of running one or more software applications and a digital wallet. Smart Card 508 may be any chip enabled credit card or the like. Smart Card 508 may be in communication with mobile device 509 via Bluetooth, NFC, or any other suitable short range communication protocol.

Backend 524 may include processor 520 as well as learning algorithm 526, and may be in communication with mobile device 509 and autonomous vehicle 515. Backend 524 may be configured to transmit to and receive data from mobile device 509 pertaining to a purchase transaction, and may be configured to transmit to and receive data from mobile autonomous vehicle 515 pertaining to operation of autonomous vehicle 515, both as a vehicle and as a point of sales device.

Autonomous vehicle 515 may include one or more processors and memory, as well as storage and inventory control. It may be configured to communicate with processor 520 in order to receive and send driving and route instructions and data, authentication information, sales data, etc.

User 505 may hold smart card 508 that may be associated with one or more financial and/or credit accounts, etc. User 505 may also have a mobile device 509. At 525, user 505 may associate smart card 508 with mobile device 509 through any means available. By way of non-limiting example, this may be through inclusion of smart card 508 in a digital wallet of mobile device 509. It may also be through inclusion of smart card 508 with an application installed and running on mobile device 509. The application may be a shopping application or some other application that allows or facilitates payment of online purchases. Smart card 508 may be associated with mobile device 509 through any technological means, including but not limited to, manual entry, NFC, Bluetooth, etc.

At 530, mobile device 509 may transmit a transaction request to processor 520. User 505 may shop for goods on mobile device 509. The shopping may be directly or indirectly connected to processor 520 of backend 524. For example, the processor 520 may be associated with a specific retailer and user 505 may be shopping on that retailer's website through mobile device 509. Shopping on mobile device 509 may include adding one or more products to a virtual cart and then virtually checking out with those one or more products. The act of checking out with one or more products may result in mobile device 509 transmitting a transaction request to processor 520 at step 530.

Processor 520 may respond to the transaction request of 530 by attempting to authenticate the user 505 at step 535. The authentication attempt may include verifying the identity of user 505. Authentication may involve one or more of a user name, password, biometric, challenge question, single or multi-factors including passcodes sent to mobile device 509, etc.

Processor 520 may provide transaction details to learning algorithm 526 at step 536. The transaction details may include items purchased, identity of user 505, and a delivery address for user 505. Learning algorithm may have access to additional data and information. For example, backend 524 may store historical transaction data for users, including user 505. The historical user transaction data may comprise a history of user transactions completed with one or more accounts associated with a financial entity or merchant associated with backend 524. Moreover, in instances where backend 524 is associated with a non-financial entity, the non-financial entity may maintain a database that includes a history of user transactions completed with one or more accounts for which the respective financial entities for those one or more accounts have provided the historical transaction data, or have provided access to transaction data maintained on the financial entities' databases. Backend 524 may store historical user transaction data for each of its users, thereby comprising a large group of consumer transaction history. At 537, learning algorithm 526 may utilize user 505 consumer transaction history data in making a prediction. That prediction may be provided to processor 520 at step 538. In one embodiment, learning algorithm 526 may also receive the large group of consumer transaction history as a discrete input to the learning algorithm 526. In some embodiments, machine learning algorithm 526 may receive additional inputs such as user data scraped from social media websites or other social media interfaces. The scrapped user data from social media may include posts made by the user, responses to posts made by others, discussions including the user, user likes, user dislikes, user interaction with social media content, lack of user interaction with social media content, etc. Learning algorithm 526 may also have access to other data such as current traffic conditions, current weather conditions, historical traffic conditions, historical weather conditions, event schedules for the area in which autonomous vehicle 515 operates (i.e. travels), road construction schedules, etc.

Learning algorithm 526 may be trained on training data sets comprising the same general data types discussed above. At step 537, learning algorithm 526 may use the received data to predict an optimal delivery route. The delivery route may be a direct route to user 505, or may involve a plurality of deliveries for different users (including user 505). The "optimal" route may be defined as a route which favors timing and therefore seeks to find the fastest delivery route. "Optimal" may also be the most fuel efficient route, the shortest route, the safest route, or any other potential criteria that could be maximized or minimized. In some embodiments, more than one factor may be considered and weightings may be given between those factors. For example, learning algorithm 526 may seek to find a quickest delivery route that also avoids tolls, roadwork, adverse weather, etc. There could be a prediction that seeks to minimize fuel consumption as a primary goal, but also use time as a secondary consideration, and learning algorithm 526 may predict a route that is not the lowest fuel consumption, but is the best predicted tradeoff between fuel consumption vs minimizing delivery time. Other more complex interactions may be considered and predicted by learning algorithm 526. The complexity of the prediction at 537 may be increased significantly when considering a multi-delivery route prediction. In this case, "optimal" may be defined in relation to a multitude of factors and how those factors interact with each other for each planned delivery. For instance, it might not make much sense to plan a route that doubles back repeatedly for subsequent deliveries, but there may be other considerations such as one-way streets, traffic, road closures, sporting event, avoidance of tolls, etc.

At 537, learning algorithm 526 may make one or more predictions based on varying criteria, as discussed above. Learning algorithm 526 may utilize a system of weights and ranks for the predictions based on a confidence in the prediction. The confidence in a prediction may be based on confidences in one or more data points relied on by learning algorithm 526, such as current weather conditions and how those conditions might change by the time autonomous vehicle 515 reaches the area(s) corresponding to the weather conditions. The same is true for current traffic, road closures due to accidents or other transient events, etc. Confidence in prediction(s) may also be based on affirming feedback based on one or more prior predictions. Machine learning algorithm 526 may be trained to better predict driving routes by analyzing results across a plurality of autonomous vehicles.

Once the learning algorithm 526 has predicted one or more driving routes, a delivery confirmation may be sent to mobile device 509 at step 540. The delivery confirmation may include an invoice for the purchased good(s) as well as delivery instructions and/or timing. The delivery confirmation may include a means for communicating with backend 524 via processor 520 in order to modify one or more of the goods purchased and the delivery timing. There may also be the option to receive information such as FAQs, utilize chatbots, or access customer service representatives.

Further, once the learning algorithm 526 has predicted one or more driving routes, those predicted routes are sent to processor 520 for packaging and inclusion in a data packet that is sent to autonomous vehicle 515 at step 545. The data packet may include a delivery address, name, and other information relating to user 505. The data packet may also include details regarding the purchase transaction, such as a list of items purchased by user 505 as well as authentication data for user 505. The authentication data may include not just the authentication that was completed at step 535, but also data required to perform a subsequent authentication. The data packet may further include a relationship between user 505's purchase transaction and the physical location of those goods in autonomous vehicle 515. The data packet may also include the prediction provided by learning algorithm 526 which may comprise specific route directions, and which may also include weather forecast(s), traffic conditions, road closures, etc. The prediction may also have alternate directions based on potential occurrences or changes in conditions. Alternatively, learning algorithm 526 may continue to make one or more predictions during the assumed delivery period of autonomous vehicle 515, and any new predictions differing from the original prediction may be sent to processor 520, and then packaged and sent to autonomous vehicle 515. Such updates may cause deviations from the original route and constitute an updated route based on the updated prediction. The data packet may be one or multiple data packets sent to autonomous vehicle 515. Each data packet may represent one sales transaction to one of a plurality of users. Thus, the autonomous vehicle 515 may be capable of handling multiple purchases simultaneously or within driving a single route.

At step 550, autonomous vehicle 515 may drive to user 505. The route taken by autonomous vehicle 515 may be fully dictated by the prediction or predictions from learning algorithm 526. Thus, in exemplary embodiments, the route may be defined by multiple delivery addresses, and may be optimized to minimize distance traveled or any other factor or combination of factors.

Upon arrival at the delivery address, at step 555, user 505 may attempt to gain physical access to autonomous vehicle 515. User 505 may use smart card 508 to attempt authentication with autonomous vehicle 515. In one embodiment, autonomous vehicle may have one or more physical card readers built into the exterior of the vehicle. User 505 may insert smart card 508 into one of these physical card readers and autonomous vehicle 515 may read smart card 508. Autonomous vehicle may be able to verify the smart card through open-loop or closed-loop authentication of the user's identity and the validity of smart card 508. Alternatively, autonomous vehicle 515 may include wireless communications such as Wi-Fi, NFC, Bluetooth, etc. User 505 may simply move smart card 508 near autonomous vehicle 315 and/or include a gesture with smart card 508 such as a swipe, tap, etc. in order to initiate an authorization request at step 555. Autonomous vehicle 515 may transmit the authorization request to processor 520 at step 560. Processor 520 may utilize authentication technology, for example, as described in FIG. 15, to authenticate user 505. Alternatively, user 505 may use mobile device 509 to initiate the authorization request at 555. In some embodiments, the smart phone may also use wireless communications in much the same way as described with respect to smart card 508.

Processor 520 may receive the authentication request and may utilize the authentication data stored in one or more databases associated with backend 524 in order to perform an authentication and verify the identity of user 505 (or at least the validity of smart card 508 and/or mobile device 509). In some embodiments, the data from smart card 508 may be encrypted per authentication technology, for example, as described in FIG. 15, and backend 524 may be equipped with the same authentication technology. Thus, autonomous vehicle 515 may be able to authenticate user 505 via authentication technology implemented by the backend 524 at step 565.

At step 570, the processor 520 may transmit confirmation of user authentication to autonomous vehicle 515. Once autonomous vehicle 515 has successfully received confirmation of use authentication, then at step 575, user 505 may be granted physical access to autonomous vehicle 515. A grant of physical access may mean unlocking of a particular door (i.e. driver side rear, passenger side rear, passenger side front, etc.) or automatically unlocking and opening a particular door. It may also mean opening of the trunk. In the event that autonomous vehicle 515 is not a passenger car, granting physical access could mean something different, such as opening a specific compartment on the outside of the vehicle, or the back gate of a delivery truck.

In the event of a passenger car, physical access may be limited to a certain area of the interior space of the car. For example, granting physical access to the driver-side rear door generally means user 505 will have access to the entirety of the inside of the car. However, in exemplary embodiments, autonomous vehicle 515 may be partitioned such that grant of physical access to one specific door limits access within the internal space of autonomous vehicle 515. For example, there may be a physical barrier installed within autonomous vehicle such that each door only provides access to interior volume direction adjacent to that specific door. So in the event that authentication results in autonomous vehicle granting physical access to the driver-side rear door, opening that door would only provide access to a volume directly behind that door and not to the rest of the vehicle. This prevents removal of other products that may not be part of the transaction described at step 530. These other goods may be unpurchased or purchased by other users. The autonomous vehicle may be driving a route to multiple users for multiple purchases and the physical division of the interior and thus, physical restriction on access may facilitate efficiency so that the vehicle does not have to make one round trip per user delivery and can ensure products reach their intended recipients.

Internal portioning may be more granular than simply tied to physical access from outside the autonomous vehicle 515. For example, if physical access is granted to the driver-side rear door, then upon opening said door, user 505 may be presented with a plurality of locked cubbies or other locked sub-partitions. The grant of physical access at step 565 may not only include access to the driver-side rear door, but also to one or more of the sub-partitions once the driver-side rear door is opened. The same approach is available with the rear trunk, front trunk. Or other doors, including the driver's door. Autonomous vehicle 515 has no driver, so it is possible to remove physical vehicle controls such as the steering wheel, pedals, etc., and use that space for delivery of goods.

The same type of internal portioning is possible with other types of delivery vehicles. For example, a delivery truck could not only include the grant of physical access to the inside of the vehicle at step 565, but also to sub-partitions within the vehicle. For instance, a delivery truck may include multiple doors/windows/access panels/etc., on the outside of the vehicle. Once physical access is granted to one or more of these panels, there may be locked sub-partitioned volumes within the truck that may store multiple users' respective purchased products. The physical access granted at step 565 may include not only access to the panel from the outside of the vehicle, but also access to the sub-partition corresponding to the authenticated user (in this case, user 505).

Of course, the design of the internal volumes may be important for safety reasons. For example, if an internal volume is too large, a person could crawl inside and then autonomous vehicle 515 may depart with a human stowaway. Thus, autonomous vehicle 515 may be designed to prevent such occurrence. For instance, internal volumes and partitions/sub-partitions may be deliberately made such that an average human and/or an average human child would not be able to fit within any such space. Alternatively, if partitions are necessary that are inherently large enough to accommodate a human stow-away, other means may be employed to prevent stowing away. For example, if an internal partition is large enough to fit a human, strategically place bars or other features may prevent human encroachment. Further, a detection system may be employed that monitors weight, employs camera with facial or heat signature, etc., or any other means of detecting unauthorized riders. Autonomous vehicle 515 may be designed to remain stationary until any stow-away exits the vehicle. Some embodiments may also employ other means to incentivize stow-aways from exiting the vehicle such as deploying loud sounds, contacting authorities, deploying offensive odors, etc.

Upon removal of purchased goods by user 505, the transaction may be considered complete at step 570, and notification may be sent to backend 520. Autonomous vehicle 515 may be able to track successful removal of goods from internal spaces. Systems may be employed that track weight differentials, have light curtains or beams that indicate when they have been broken by hands reaching in to remove products, etc. Further, video surveillance may be used to confirm successful transaction completion and for evidence in the event of disputes. Autonomous vehicle 515 may be equipped with self-closing and relocking doors, partitions, sub-partitions, etc. These self-closing and relocking doors may be programmed to engage after a certain default amount of time, idle time, in the case of a security event, or any other out-of-process event. For example, if a user authenticates at autonomous vehicle 515 but then does not remove the purchased goods, then after a defined amount of time, autonomous vehicle 515 may close and relock any outside access doors, panels, etc., and may also close and relock any internal partitions. In some embodiments, autonomous vehicle 515 may then begin a visible countdown timer whereby user 505 may re-authenticate to re-gain access to the purchased products. If re-authentication does not occur, then autonomous vehicle 515 may leave and continue a defined route. Alternatively, autonomous vehicle 515 may provide no countdown timer and simply continue on a defined route. Other responses may be implemented as well.

In the event of a security event such as the detection of attempted theft, autonomous vehicle 515 may immediately close and relock all doors, partitions, windows, panels, etc. and then leave the scene of the security incident. Autonomous vehicle 515 may continue on a defined route or return to a starting point for inspection.

Upon autonomous vehicle 515 determining that the transaction was completed, autonomous vehicle 515 may send feedback for machine learning algorithm 526 at step 580. This feedback may be sent to processor 520 and then shared from processor 520 to learning algorithm 526. The feedback may include metrics regarding the delivery. For example, the metrics may include whether delivery was successful, whether user 505 was able to successfully authenticate, timing details (such as time to authenticate and time to complete transaction once arrived at delivery address, driving conditions, weather, road conditions, traffic, construction, road closures, and any other factors that inform the delivery route. These metrics may be compared against the prediction to determine how closely the prediction matched the real-world implementation of the predicted route. Further these metrics may be compared against factors used to create the prediction in order to explain differences between the prediction and the real-world implementation of the predicted route. Learning algorithm 526 may use the feedback data to update and refine learning algorithm 526 including, but not limited to, changing associations between factors, implementing new discovered factors that may be relevant to a prediction, changing weighting of factors, etc.

In some embodiments, it may be desirable to implement a machine learning algorithm to predict one or more aspects of the autonomous vehicle 615 travel route. This approach would allow for adaptation of the system over time to maximize one or more stated goals such as fuel efficiency, minimization of delivery time, etc. The sequence diagram of FIG. 6 illustrates an exemplary scenario in which the backend fully employs a machine learning algorithm in connection with an autonomous vehicle transaction system.

Figure 6:
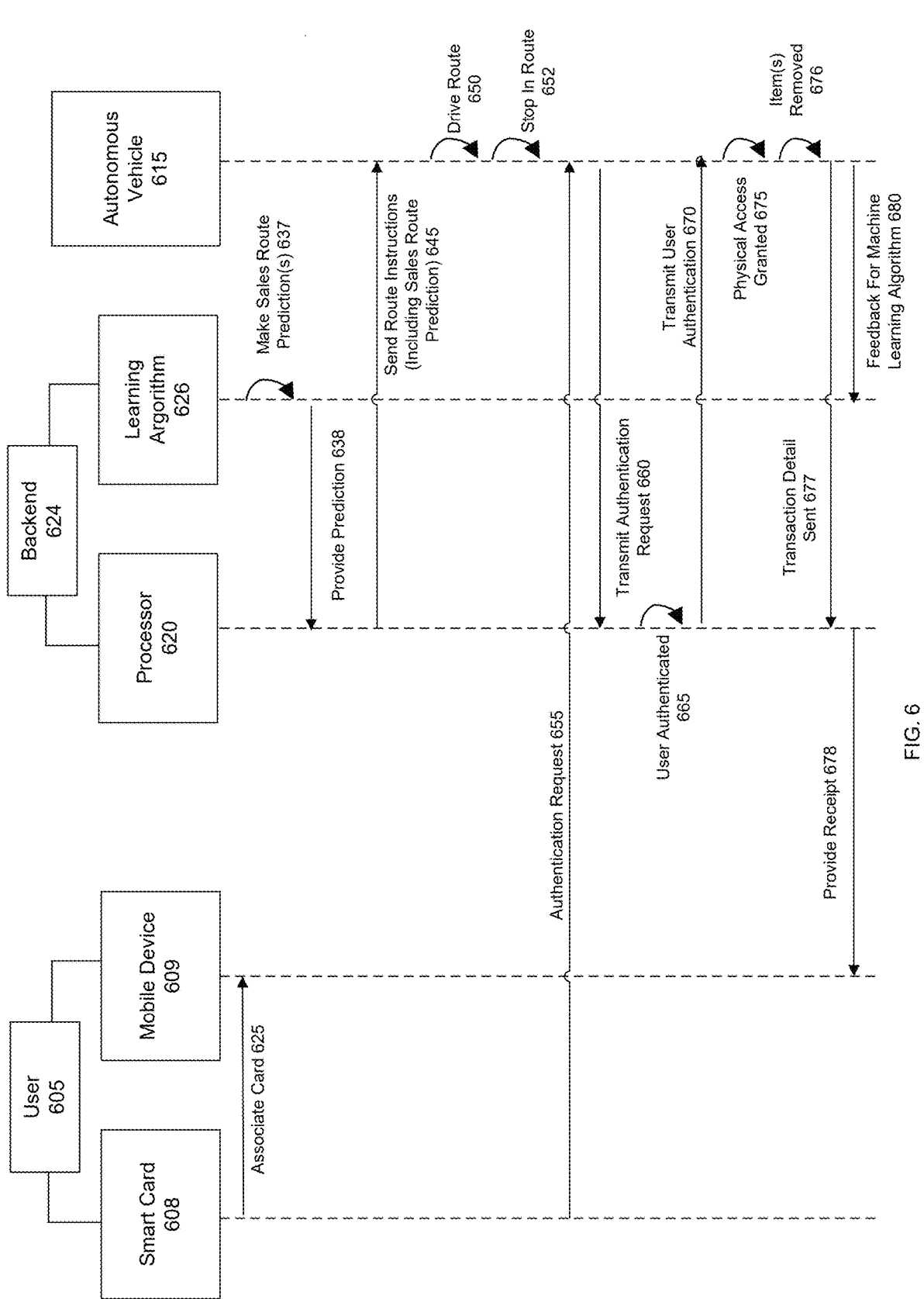
FIG. 6 illustrates a sequence of operations for utilizing machine learning and an autonomous vehicle transaction system as a mobile vending machine.

FIG. 6 illustrates an exemplary application of embodiments of the invention in conjunction with the system 100 of FIG. 1. In the scenario set forth in FIG. 6, a user 605 has a smart card 608 and a mobile device 609. The mobile device 609 is in communication with a backend 624. Mobile device 609 may be a personal computer, smart phone, smart watch, or any other network enabled computing device. Mobile device 609 may include memory, a network communication, an interactive user interface, and a processor capable of running one or more software applications and a digital wallet. Smart Card 608 may be any chip enabled credit card or the like. Smart Card 608 may be in communication with mobile device 609 via Bluetooth, NFC, or any other suitable short range communication protocol.

Backend 624 may include processor 620 as well as learning algorithm 626, and may be in communication with mobile device 609 and autonomous vehicle 615. Backend 624 may be configured to transmit to and receive data from mobile device 609 pertaining to a purchase transaction, and may be configured to transmit to and receive data from mobile autonomous vehicle 615 pertaining to operation of autonomous vehicle 615, both as a vehicle and as a point of sales device.

Autonomous vehicle 615 may include one or more processors and memory, as well as storage and inventory control. It may be configured to communicate with processor 620 in order to receive and send driving and route instructions and data, authentication information, sales data, etc.

User 605 may hold smart card 608 that may be associated with one or more financial and/or credit accounts, etc. User 605 may also have a mobile device 609. At 625, user 605 may associate smart card 608 with mobile device 609 through any means available. By way of non-limiting example, this may be through inclusion of smart card 608 in a digital wallet of mobile device 609. It may also be through inclusion of smart card 608 with an application installed and running on mobile device 609. The application may be a shopping application or some other application that allows or facilitates payment of online purchases. Smart card 608 may be associated with mobile device 609 through any technological means, including but not limited to, manual entry, NFC, Bluetooth, etc.

At step 637, learning algorithm 626 may make one or more predictions based on different data as inputs. Learning algorithm 626 may have access to data and information. For example, backend 624 may store historical transaction data for users, including user 605. The historical user transaction data may comprise a history of user transactions completed with one or more accounts associated with a financial entity or merchant associated with backend 624. Moreover, in instances where backend 624 is associated with a non-financial entity, the non-financial entity may maintain a database that includes a history of user transactions completed with one or more accounts for which the respective financial entities for those one or more accounts have provided the historical transaction data, or have provided access to transaction data maintained on the financial entities' databases. Backend 624 may store historical user transaction data for each of its users, thereby comprising a large group of consumer transaction history. Historical user transaction history may include who bought what, where they bought those items, how many of those items were purchased, when those items were purchased, how many times those items were purchased, etc. At 637, learning algorithm 626 may utilize user 605's consumer transaction history data in making a prediction. That prediction may be provided to processor 620 at step 638. In one embodiment, learning algorithm 626 may also receive the large group of consumer transaction history as a discrete input to the learning algorithm 626. In some embodiments, machine learning algorithm 626 may receive additional inputs such as user data scraped from social media websites or other social media interfaces. The scrapped user data from social media may include posts made by the user, responses to posts made by others, discussions including the user, user likes, user dislikes, user interaction with social media content, lack of user interaction with social media content, etc. Learning algorithm 626 may also have access to other data such as current traffic conditions, current weather conditions, historical traffic conditions, historical weather conditions, event schedules for the area in which autonomous vehicle 615 operates (i.e. travels), road construction schedules, etc. Learning algorithm 626 may be trained on training data sets comprising the same general data types.

At step 637, learning algorithm 626 may use the received data to make one or more predictions. The autonomous vehicle 615 of FIG. 6 may operate as a mobile vending machine and therefore the one or more predictions may seek to facilitate an optimal sales route. The "optimal" sales route may be defined as a route which seeks to maximize gross sales, unit sales, profit, or any other sales-based metric. "optimal" may also seek to maximize or minimize any number of other factors/metrics. For example, an optimal sales route may seek to minimize fuel consumption, distance driven, time spent on the route, etc. An optimal sale route may be one that maximizes multiple metrics with one being favored or each being equally valued. "Optimal" may also be defined as maximizing or minimizing one or more metric in light of other metrics that may be kept within certain ranges. For example, an "optimal" sales route may seek to maximize profits, while also putting importance on unit sales, while also maintaining sales route time under a ceiling time (e.g., two hours). Other scenarios may be possible.

In some embodiments, where more than one metric or factor may be considered, learning algorithm 626 may apply relative weightings to each metric. For example, in a scenario where autonomous vehicle 615 is selling ice cream, learning algorithm 626 may seek to find a delivery route that maximizes gross sales while also avoiding tolls, roadwork, adverse weather, etc. There could be a prediction that seeks to minimize fuel consumption as a primary goal, but also use sales or some other metric or metrics as secondary considerations, and learning algorithm 626 may predict a route that is not the absolute lowest fuel consumption, but is the best predicted tradeoff between fuel consumption vs those other secondary metrics. Other more complex interactions may be considered and predicted by learning algorithm 626. Learning algorithm 626 may leverage historical sales data to better understand locations that are likely to result in sales base on timing of sales, volume of sales at each such location, etc. This sales data may be cross-referenced with other historical data such as weather and event data. For example, if a large number of jersey sales previously occurred at or near a stadium on a certain day, then it may be relevant to understand that a sporting event was taking place during those sales. Or in the case of ice cream sales, it may be relevant to understand if there was a reason why a large group of people were near the sales area (e.g., sporting event, concert, etc.). It may also be relevant to understand if it was a hot day, thereby helping to drive ice cream sales. Learning algorithm 626 may utilize all such data and metrics to predict a sales route that has the highest chance to maximize a given metric and may also predict the outcome of one or more metrics based on the prediction.

In exemplary embodiments, "optimal" may be defined in relation to a multitude of factors and how those factors interact with each other for a predicted sales route. For instance, it might not make much sense to plan a sales route that doubles back repeatedly for subsequent planned sales stops, but there may be other considerations such as one-way streets, traffic, road closures, sporting event, avoidance of tolls, etc.

At 637, learning algorithm 626 may make one or more predictions based on varying criteria, as discussed above. Learning algorithm 626 may utilize a system of weights and ranks for the predictions based on a confidence in the prediction. The confidence in a prediction may be based on confidences in one or more data points relied on by learning algorithm 626, such as current weather conditions and how those conditions might change by the time autonomous vehicle 615 reaches the area(s) corresponding to the weather conditions. The same is true for current traffic, road closures due to accidents or other transient events, etc. Confidence in prediction(s) may also be based on affirming feedback based on one or more prior predictions. Machine learning algorithm 626 may be trained to better predict sales routes by analyzing results across a plurality of autonomous vehicles.

Once learning algorithm 626 has predicted a sales route, the predicted route may be sent to processor 620 at step 638 for packaging and inclusion in a data packet that is sent to autonomous vehicle 615 at step 645. The data packet may include the sales route prediction as well as specific driving instructions and stop locations, as well as times to remain at each stop. The data packet may also include weather forecast(s), traffic conditions, road closures, etc. The prediction may also have alternate directions based on potential occurrences or changes in conditions. Alternatively, learning algorithm 626 may continue to make one or more predictions during the implementation of the sales route by autonomous vehicle 615, and any new predictions differing from the original prediction may be sent to processor 620, and then packaged and sent to autonomous vehicle 615. Such updates may cause deviations from the original route and constitute an updated route based on the updated prediction. The data packet may be one or multiple data packets sent to autonomous vehicle 615.

At step 650, autonomous vehicle 615 may drive the sales route. The route taken by autonomous vehicle 615 may be fully dictated by the prediction or predictions from learning algorithm 626. Thus, in exemplary embodiments, the route may be defined by multiple sales stop locations, and may be optimized to minimize distance traveled between sales stop locations or any other factor or combination of factors.

At step 652, autonomous vehicle 615 may stop at a designated sales stop location for a defined period of time in order to make autonomous vehicle 615 available to users for sales transactions.

User 605 may approach autonomous vehicle 615 during a sales stop and attempt to gain physical access to autonomous vehicle 615. User 605 may use smart card 608 to attempt authentication with autonomous vehicle 615. In one embodiment, autonomous vehicle may have one or more physical card readers built into the exterior of the vehicle. User 605 may insert smart card 608 into one of these physical card readers and autonomous vehicle 615 may read smart card 608. Autonomous vehicle may be able to verify the smart card through open-loop or closed-loop authentication of the user's identity and the validity of smart card 608. Alternatively, autonomous vehicle 615 may include wireless communications such as Wi-Fi, NFC, Bluetooth, etc. User 605 may simply move smart card 608 near autonomous vehicle 315 and/or include a gesture with smart card 608 such as a swipe, tap, etc. in order to initiate an authorization request at step 655. Autonomous vehicle 615 may transmit the authorization request to processor 620 at step 660. Processor 620 may utilize authentication technology, for example, as described in FIG. 15, to authenticate user 605. Alternatively, user 605 may use mobile device 609 to initiate the authorization request at 655. In some embodiments, the smart phone may also use wireless communications in much the same way as described with respect to smart card 608.

Processor 620 may receive the authentication request and may utilize the authentication data stored in one or more databases associated with backend 624 in order to perform an authentication and verify the identity of user 605 (or at least the validity of smart card 608 and/or mobile device 609). In some embodiments, the data from smart card 608 may be encrypted per authentication technology, for example, as described in FIG. 15, and backend 624 may be equipped with the same authentication technology. Thus, autonomous vehicle 615 may be able to authenticate user 605 via authentication technology implemented by the backend 624 at step 665.

At step 670, the processor 620 may transmit confirmation of user authentication to autonomous vehicle 615. Once autonomous vehicle 615 has successfully received confirmation of use authentication, then at step 675, user 605 may be granted physical access to autonomous vehicle 615. A grant of physical access may mean unlocking of a particular door (i.e. driver side rear, passenger side rear, passenger side front, etc.) or automatically unlocking and opening a particular door. It may also mean opening of the trunk. In the event that autonomous vehicle 615 is not a passenger car, granting physical access could mean something different, such as opening a specific compartment on the outside of the vehicle, or the back gate of a delivery truck.

In the event of a passenger car, physical access may be limited to a certain area of the interior space of the car. For example, granting physical access to the driver-side rear door generally means user 605 will have access to the entirety of the inside of the car. However, in exemplary embodiments, autonomous vehicle 615 may be partitioned such that grant of physical access to one specific door limits access within the internal space of autonomous vehicle 615. For example, there may be a physical barrier installed within autonomous vehicle such that each door only provides access to interior volume direction adjacent to that specific door. So in the event that authentication results in autonomous vehicle granting physical access to the driver-side rear door, opening that door would only provide access to a volume directly behind that door and not to the rest of the vehicle. This allows for multiple users to interface with autonomous vehicle 615 simultaneously. For example, if user 605 authenticates to the driver-side rear door and gains physical access to that area of autonomous vehicle 615, then a second user could authenticate to the passenger-side rear door and gain physical access to that portion of the vehicle at the same time. Additional users could gain access to other portioned sections of autonomous vehicle 615 concurrently. This approach would prevent one user potentially getting charged for a product removed by a different user.

Internal portioning may be more granular than simply being tied to physical access from outside the autonomous vehicle 615. For example, if physical access is granted to the driver-side rear door, then upon opening said door, user 605 may be presented with a plurality of locked cubbies or other locked sub-partitions. The grant of physical access at step 665 may not only include access to the driver-side rear door, but also to one or more of the sub-partitions once the driver-side rear door is opened. The same approach is available with the rear trunk, front trunk. Or other doors, including the driver's door. Autonomous vehicle 615 has no driver, so it is possible to remove physical vehicle controls such as the steering wheel, pedals, etc., and use that space for delivery of goods.

The same type of internal portioning is possible with other types of delivery vehicles. For example, a delivery truck could not only include the grant of physical access to the inside of the vehicle at step 665, but also to sub-partitions within the vehicle. For instance, a delivery truck may include multiple doors/windows/access panels/etc., on the outside of the vehicle. Once physical access is granted to one or more of these panels, there may be locked sub-partitioned volumes within the truck that may store multiple users' respective purchased products. The physical access granted at step 665 may include not only access to the panel from the outside of the vehicle, but also access to the sub-partition corresponding to the authenticated user (in this case, user 605).

Further, for a mobile sales kiosk implementation of autonomous vehicle 615, there could be vending machines behind physical access from the outside of autonomous vehicle 615. For example, upon opening the driver-side rear door, user 605 may be presented with a traditional vending machine whereby product selections may be made, with or without additional authentication (e.g. swipe, gesture, etc. of smart card 608 or mobile device 609). Similarly, the vending machines may be built into the exterior of autonomous vehicle 615 thereby obviating the need for user 605 to first gain physical access to the interior of autonomous vehicle 615. In addition to a traditional vending machine, embodiments may include other means for offering and sale of goods. Sales may be tracked by light beam or curtain, weight monitoring, visual camera, etc. Products offered by autonomous vehicle 615 may be varied and may be delineated by various areas of autonomous vehicle 615. For example, ice cream may be offered on the driver side of autonomous vehicle 615 while sun screen and other hot weather goods are offered on the passenger side of autonomous vehicle 615. Other complimentary and disparate goods may be sold from a single autonomous vehicle 615.

Of course, the design of the internal volumes may be important for safety reasons. For example, if an internal volume is too large, a person could crawl inside and then autonomous vehicle 615 may depart with a human stowaway. Thus, autonomous vehicle 615 may be designed to prevent such occurrence. For instance, internal volumes and partitions/sub-partitions may be deliberately made such that an average human and/or an average human child would not be able to fit within any such space. Alternatively, if partitions are necessary that are inherently large enough to accommodate a human stow-away, other means may be employed to prevent stowing away. For example, if an internal partition is large enough to fit a human, strategically place bars or other features may prevent human encroachment. Further, a detection system may be employed that monitors weight, employs camera with facial or heat signature, etc., or any other means of detecting unauthorized riders. Autonomous vehicle 615 may be designed to remain stationary until any stow-away exits the vehicle. Some embodiments may also employ other means to incentivize stow-aways from exiting the vehicle such as deploying loud sounds, contacting authorities, deploying offensive odors, etc.

At step 676, user 605 removes one or more product from autonomous vehicle 615. Upon removal of purchased goods by user 605, the transaction may be considered complete at step 677, and notification may be sent to processor 620. Autonomous vehicle 615 may be able to track successful removal of goods from internal spaces. Systems may be employed that track weight differentials, have light curtains or beams that indicate when they have been broken by hands reaching in to remove products, etc. Further, video surveillance may be used to confirm successful transaction completion and for evidence in the event of disputes. Autonomous vehicle 615 may be equipped with self-closing and relocking doors, partitions, sub-partitions, etc. These self-closing and relocking doors may be programmed to engage after a certain default amount of time, idle time, in the case of a security event, or any other out-of-process event. For example, if a user authenticates at autonomous vehicle 615 but then does not remove the purchased goods, then after a defined amount of time, autonomous vehicle 615 may close and relock any outside access doors, panels, etc., and may also close and relock any internal partitions. In some embodiments, autonomous vehicle 615 may then begin a visible countdown timer whereby user 605 may re-authenticate to re-gain access to the purchased products. If re-authentication does not occur, then autonomous vehicle 615 may leave and continue the sales route. Alternatively, autonomous vehicle 615 may provide no countdown timer and simply continue on a defined route. Other responses may be implemented as well.

In the event of a security event such as the detection of attempted theft, autonomous vehicle 615 may immediately close and relock all doors, partitions, windows, panels, etc. and then leave the scene of the security incident. Autonomous vehicle 615 may continue on a defined route or return to a starting point for inspection.

Upon autonomous vehicle 615 determining that the transaction was completed, at 678, processor 620 may send a digital receipt to mobile device 609 confirming the transaction. Also, autonomous vehicle 615 may send feedback for machine learning algorithm 626 at step 680. This feedback may be sent to processor 620 and then shared from processor 620 to learning algorithm 626. The feedback may include metrics regarding the delivery. For example, the metrics may include sales details, volume, pricing, time at sale stop location, successful vs. unsuccessful authentication attempts by users, driving conditions, weather, road conditions, traffic, construction, road closures, and any other factors that inform the sales route. These metrics may be compared against the prediction to determine how closely the prediction matched the real-world implementation of the predicted sales route. Further these metrics may be compared against factors used to create the prediction in order to explain differences between the prediction and the real-world implementation of the predicted route. Learning algorithm 626 may use the feedback data to update and refine learning algorithm 626 including, but not limited to, changing associations between factors, implementing new discovered factors that may be relevant to a prediction, changing weighting of factors, etc.

It should be appreciated that the system of FIG. 6 may also be integrated with one or more mobile device applications. It may be possible for a user to track the location of one or more autonomous vehicles as they each drive their sales routes. Moreover, the system may permit for sales calls initiated through the mobile device application. For example, a user might see an autonomous vehicle driving a route nearby and may call the vehicle through the application. The autonomous vehicle may be able to divert from the predicted sales route and detour to the user who called the vehicle through the app. Rules may be put into place as to when an autonomous vehicle may detour from a given sales route, such as distance of detour, and/or other considerations such as fuel/energy constraints, weather, traffic, etc. A user call through an app may cause learning algorithm 626 to make a new prediction and either allow or disallow the detour. In another embodiment, a detour may only be allowed if a transaction is completed on the app prior to the detour. Other configurations and factors may effect the operation of autonomous vehicle 615 under these circumstances.

The system of FIG. 6 may be implemented in other off-road scenarios. For instance, an automated beverage and snack cart could be implemented by a golf course whereby the automated cart is configured to travel a predicted path with sales stops. Golfers may authenticate to the cart and purchase drinks, snacks, golf related items such as balls, tees, etc. This system could be implemented in much the same way as with the autonomous vehicle designed to travel on road. Other implementations may be possible.

In some embodiments, it may be desirable to implement a machine learning algorithm to predict one or more aspects of the autonomous vehicle 715 travel route. This approach would allow for adaptation of the system over time to maximize one or more stated goals such as fuel efficiency, minimization of delivery time, etc. The sequence diagram of FIG. 7 illustrates an exemplary scenario in which the backend fully employs a machine learning algorithm in connection with an autonomous vehicle transaction system.

Figure 7:
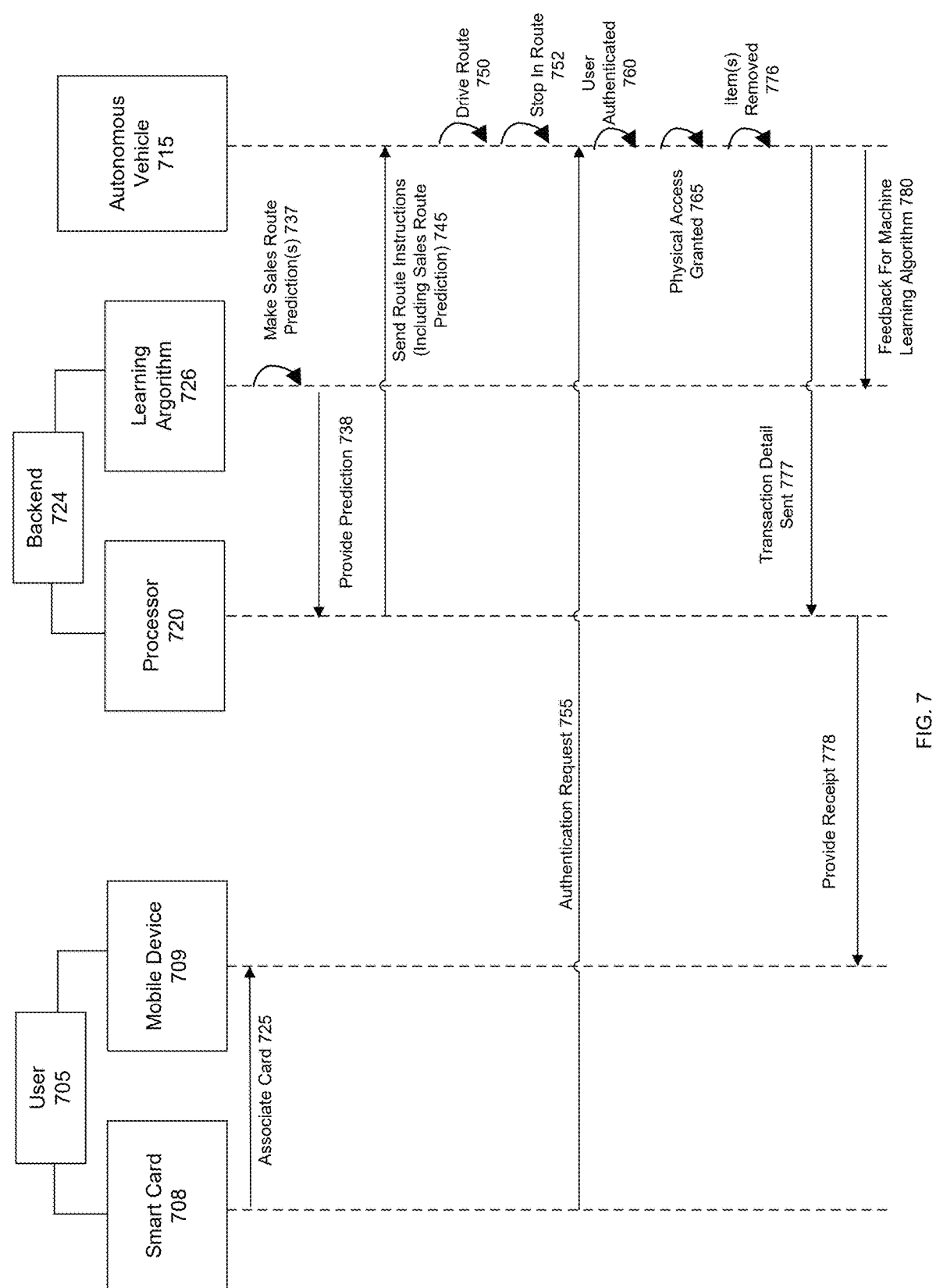
FIG. 7 illustrates a sequence of operations for utilizing machine learning and an autonomous vehicle transaction system as a mobile vending machine.

FIG. 7 illustrates an exemplary application of embodiments of the invention in conjunction with the system 100 of FIG. 1. In the scenario set forth in FIG. 7, a user 705 has a smart card 708 and a mobile device 709. The mobile device 709 is in communication with a backend 724. Mobile device 709 may be a personal computer, smart phone, smart watch, or any other network enabled computing device. Mobile device 709 may include memory, a network communication, an interactive user interface, and a processor capable of running one or more software applications and a digital wallet. Smart Card 708 may be any chip enabled credit card or the like. Smart Card 708 may be in communication with mobile device 709 via Bluetooth, NFC, or any other suitable short range communication protocol.

Backend 724 may include processor 720 as well as learning algorithm 726, and may be in communication with mobile device 709 and autonomous vehicle 715. Backend 724 may be configured to transmit to and receive data from mobile device 709 pertaining to a purchase transaction, and may be configured to transmit to and receive data from mobile autonomous vehicle 715 pertaining to operation of autonomous vehicle 715, both as a vehicle and as a point of sales device.

Autonomous vehicle 715 may include one or more processors and memory, as well as storage and inventory control. It may be configured to communicate with processor 720 in order to receive and send driving and route instructions and data, authentication information, sales data, etc.

User 705 may hold smart card 708 that may be associated with one or more financial and/or credit accounts, etc. User 705 may also have a mobile device 709. At 725, user 705 may associate smart card 708 with mobile device 709 through any means available. By way of non-limiting example, this may be through inclusion of smart card 708 in a digital wallet of mobile device 709. It may also be through inclusion of smart card 708 with an application installed and running on mobile device 709. The application may be a shopping application or some other application that allows or facilitates payment of online purchases. Smart card 708 may be associated with mobile device 709 through any technological means, including but not limited to, manual entry, NFC, Bluetooth, etc.

At step 737, learning algorithm 726 may make one or more predictions based on different data as inputs. Learning algorithm 726 may have access to data and information. For example, backend 724 may store historical transaction data for users, including user 705. The historical user transaction data may comprise a history of user transactions completed with one or more accounts associated with a financial entity or merchant associated with backend 724. Moreover, in instances where backend 724 is associated with a non-financial entity, the non-financial entity may maintain a database that includes a history of user transactions completed with one or more accounts for which the respective financial entities for those one or more accounts have provided the historical transaction data, or have provided access to transaction data maintained on the financial entities' databases. Backend 724 may store historical user transaction data for each of its users, thereby comprising a large group of consumer transaction history. Historical user transaction history may include who bought what, where they bought those items, how many of those items were purchased, when those items were purchased, how many times those items were purchased, etc. At 737, learning algorithm 726 may utilize user 705's consumer transaction history data in making a prediction. That prediction may be provided to processor 720 at step 738. In one embodiment, learning algorithm 726 may also receive the large group of consumer transaction history as a discrete input to the learning algorithm 726. In some embodiments, machine learning algorithm 726 may receive additional inputs such as user data scraped from social media websites or other social media interfaces. The scrapped user data from social media may include posts made by the user, responses to posts made by others, discussions including the user, user likes, user dislikes, user interaction with social media content, lack of user interaction with social media content, etc. Learning algorithm 726 may also have access to other data such as current traffic conditions, current weather conditions, historical traffic conditions, historical weather conditions, event schedules for the area in which autonomous vehicle 715 operates (i.e. travels), road construction schedules, etc. Learning algorithm 726 may be trained on training data sets comprising the same general data types.

At step 737, learning algorithm 726 may use the received data to make one or more predictions. The autonomous vehicle 715 of FIG. 7 may operate as a mobile vending machine and therefore the one or more predictions may seek to facilitate an optimal sales route. The "optimal" sales route may be defined as a route which seeks to maximize gross sales, unit sales, profit, or any other sales-based metric. "optimal" may also seek to maximize or minimize any number of other factors/metrics. For example, an optimal sales route may seek to minimize fuel consumption, distance driven, time spent on the route, etc. An optimal sale route may be one that maximizes multiple metrics with one being favored or each being equally valued. "Optimal" may also be defined as maximizing or minimizing one or more metric in light of other metrics that may be kept within certain ranges. For example, an "optimal" sales route may seek to maximize profits, while also putting importance on unit sales, while also maintaining sales route time under a ceiling time (e.g., two hours). Other scenarios may be possible.

In some embodiments, where more than one metric or factor may be considered, learning algorithm 726 may apply relative weightings to each metric. For example, in a scenario where autonomous vehicle 715 is selling ice cream, learning algorithm 726 may seek to find a delivery route that maximizes gross sales while also avoiding tolls, roadwork, adverse weather, etc. There could be a prediction that seeks to minimize fuel consumption as a primary goal, but also use sales or some other metric or metrics as secondary considerations, and learning algorithm 726 may predict a route that is not the absolute lowest fuel consumption, but is the best predicted tradeoff between fuel consumption vs those other secondary metrics. Other more complex interactions may be considered and predicted by learning algorithm 726. Learning algorithm 726 may leverage historical sales data to better understand locations that are likely to result in sales base on timing of sales, volume of sales at each such location, etc. This sales data may be cross-referenced with other historical data such as weather and event data. For example, if a large number of jersey sales previously occurred at or near a stadium on a certain day, then it may be relevant to understand that a sporting event was taking place during those sales. Or in the case of ice cream sales, it may be relevant to understand if there was a reason why a large group of people were near the sales area (e.g., sporting event, concert, etc.). It may also be relevant to understand if it was a hot day, thereby helping to drive ice cream sales. Learning algorithm 726 may utilize all such data and metrics to predict a sales route that has the highest chance to maximize a given metric and may also predict the outcome of one or more metrics based on the prediction.

In exemplary embodiments, "optimal" may be defined in relation to a multitude of factors and how those factors interact with each other for a predicted sales route. For instance, it might not make much sense to plan a sales route that doubles back repeatedly for subsequent planned sales stops, but there may be other considerations such as one-way streets, traffic, road closures, sporting event, avoidance of tolls, etc.

At 737, learning algorithm 726 may make one or more predictions based on varying criteria, as discussed above. Learning algorithm 726 may utilize a system of weights and ranks for the predictions based on a confidence in the prediction. The confidence in a prediction may be based on confidences in one or more data points relied on by learning algorithm 726, such as current weather conditions and how those conditions might change by the time autonomous vehicle 715 reaches the area(s) corresponding to the weather conditions. The same is true for current traffic, road closures due to accidents or other transient events, etc. Confidence in prediction(s) may also be based on affirming feedback based on one or more prior predictions. Machine learning algorithm 726 may be trained to better predict sales routes by analyzing results across a plurality of autonomous vehicles.

Once learning algorithm 726 has predicted a sales route, the predicted route may be sent to processor 720 at step 738 for packaging and inclusion in a data packet that is sent to autonomous vehicle 715 at step 745. The data packet may include the sales route prediction as well as specific driving instructions and stop locations, as well as times to remain at each stop. The data packet may also include weather forecast(s), traffic conditions, road closures, etc. The prediction may also have alternate directions based on potential occurrences or changes in conditions. Alternatively, learning algorithm 726 may continue to make one or more predictions during the implementation of the sales route by autonomous vehicle 715, and any new predictions differing from the original prediction may be sent to processor 720, and then packaged and sent to autonomous vehicle 715. Such updates may cause deviations from the original route and constitute an updated route based on the updated prediction. The data packet may be one or multiple data packets sent to autonomous vehicle 715.

At step 750, autonomous vehicle 715 may drive the sales route. The route taken by autonomous vehicle 715 may be fully dictated by the prediction or predictions from learning algorithm 726. Thus, in exemplary embodiments, the route may be defined by multiple sales stop locations, and may be optimized to minimize distance traveled between sales stop locations or any other factor or combination of factors.

At step 752, autonomous vehicle 715 may stop at a designated sales stop location for a defined period of time in order to make autonomous vehicle 715 available to users for sales transactions.

User 705 may approach autonomous vehicle 715 during a sales stop and attempt to gain physical access to autonomous vehicle 715. User 705 may use smart card 708 to attempt authentication with autonomous vehicle 715. In one embodiment, autonomous vehicle may have one or more physical card readers built into the exterior of the vehicle. User 705 may insert smart card 708 into one of these physical card readers and autonomous vehicle 715 may read smart card 708. Autonomous vehicle may be able to verify the smart card through open-loop or closed-loop authentication of the user's identity and the validity of smart card 708. Alternatively, autonomous vehicle 715 may include wireless communications such as Wi-Fi, NFC, Bluetooth, etc. User 705 may simply move smart card 708 near autonomous vehicle 315 and/or include a gesture with smart card 708 such as a swipe, tap, etc. in order to initiate an authorization request at step 755. Autonomous vehicle 715 may utilize authentication technology, for example, as described in FIG. 15, to authenticate user 705. Alternatively, user 705 may use mobile device 709 to initiate the authorization request at 755. In some embodiments, the smart phone may also use wireless communications in much the same way as described with respect to smart card 708.

Autonomous vehicle 715 may receive the authentication request and send that request to one or more of its processors. It may utilize the authentication data provided by backend 220 in order to perform an authentication and verify the identity of user 705 (or at least the validity of smart card 708 and/or mobile device 709). In some embodiments, the data from smart card 708 may be encrypted per authentication technology, for example, as described in FIG. 15, and autonomous vehicle 715 may be equipped with the same authentication technology. Thus, autonomous vehicle 715 may be able to authenticate user 705 via authentication technology at step 760.

At step 765, user 705 may be granted physical access to autonomous vehicle 715. A grant of physical access may mean unlocking of a particular door (i.e. driver side rear, passenger side rear, passenger side front, etc.) or automatically unlocking and opening a particular door. It may also mean opening of the trunk. In the event that autonomous vehicle 715 is not a passenger car, granting physical access could mean something different, such as opening a specific compartment on the outside of the vehicle, or the back gate of a delivery truck.

In the event of a passenger car, physical access may be limited to a certain area of the interior space of the car. For example, granting physical access to the driver-side rear door generally means user 705 will have access to the entirety of the inside of the car. However, in exemplary embodiments, autonomous vehicle 715 may be partitioned such that grant of physical access to one specific door limits access within the internal space of autonomous vehicle 715. For example, there may be a physical barrier installed within autonomous vehicle such that each door only provides access to interior volume direction adjacent to that specific door. So in the event that authentication results in autonomous vehicle granting physical access to the driver-side rear door, opening that door would only provide access to a volume directly behind that door and not to the rest of the vehicle. This allows for multiple users to interface with autonomous vehicle 715 simultaneously. For example, if user 705 authenticates to the driver-side rear door and gains physical access to that area of autonomous vehicle 715, then a second user could authenticate to the passenger-side rear door and gain physical access to that portion of the vehicle at the same time. Additional users could gain access to other portioned sections of autonomous vehicle 715 concurrently. This approach would prevent one user potentially getting charged for a product removed by a different user.

Internal portioning may be more granular than simply being tied to physical access from outside the autonomous vehicle 715. For example, if physical access is granted to the driver-side rear door, then upon opening said door, user 705 may be presented with a plurality of locked cubbies or other locked sub-partitions. The grant of physical access at step 765 may not only include access to the driver-side rear door, but also to one or more of the sub-partitions once the driver-side rear door is opened. The same approach is available with the rear trunk, front trunk. Or other doors, including the driver's door. Autonomous vehicle 715 has no driver, so it is possible to remove physical vehicle controls such as the steering wheel, pedals, etc., and use that space for delivery of goods.

The same type of internal portioning is possible with other types of delivery vehicles. For example, a delivery truck could not only include the grant of physical access to the inside of the vehicle at step 765, but also to sub-partitions within the vehicle. For instance, a delivery truck may include multiple doors/windows/access panels/etc., on the outside of the vehicle. Once physical access is granted to one or more of these panels, there may be locked sub-partitioned volumes within the truck that may store multiple users' respective purchased products. The physical access granted at step 765 may include not only access to the panel from the outside of the vehicle, but also access to the sub-partition corresponding to the authenticated user (in this case, user 705).

Further, for a mobile sales kiosk implementation of autonomous vehicle 715, there could be vending machines behind physical access from the outside of autonomous vehicle 715. For example, upon opening the driver-side rear door, user 705 may be presented with a traditional vending machine whereby product selections may be made, with or without additional authentication (e.g. swipe, gesture, etc. of smart card 708 or mobile device 709). Similarly, the vending machines may be built into the exterior of autonomous vehicle 715 thereby obviating the need for user 705 to first gain physical access to the interior of autonomous vehicle 715. In addition to a traditional vending machine, embodiments may include other means for offering and sale of goods. Sales may be tracked by light beam or curtain, weight monitoring, visual camera, etc. Products offered by autonomous vehicle 715 may be varied and may be delineated by various areas of autonomous vehicle 715. For example, ice cream may be offered on the driver side of autonomous vehicle 715 while sun screen and other hot weather goods are offered on the passenger side of autonomous vehicle 715. Other complimentary and disparate goods may be sold from a single autonomous vehicle 715.

Of course, the design of the internal volumes may be important for safety reasons. For example, if an internal volume is too large, a person could crawl inside and then autonomous vehicle 715 may depart with a human stowaway. Thus, autonomous vehicle 715 may be designed to prevent such occurrence. For instance, internal volumes and partitions/sub-partitions may be deliberately made such that an average human and/or an average human child would not be able to fit within any such space. Alternatively, if partitions are necessary that are inherently large enough to accommodate a human stow-away, other means may be employed to prevent stowing away. For example, if an internal partition is large enough to fit a human, strategically place bars or other features may prevent human encroachment. Further, a detection system may be employed that monitors weight, employs camera with facial or heat signature, etc., or any other means of detecting unauthorized riders. Autonomous vehicle 715 may be designed to remain stationary until any stow-away exits the vehicle. Some embodiments may also employ other means to incentivize stow-aways from exiting the vehicle such as deploying loud sounds, contacting authorities, deploying offensive odors, etc.

At step 776, user 705 removes one or more product from autonomous vehicle 715. Upon removal of purchased goods by user 705, the transaction may be considered complete at step 777, and notification may be sent to processor 720. Autonomous vehicle 715 may be able to track successful removal of goods from internal spaces. Systems may be employed that track weight differentials, have light curtains or beams that indicate when they have been broken by hands reaching in to remove products, etc. Further, video surveillance may be used to confirm successful transaction completion and for evidence in the event of disputes. Autonomous vehicle 715 may be equipped with self-closing and relocking doors, partitions, sub-partitions, etc. These self-closing and relocking doors may be programmed to engage after a certain default amount of time, idle time, in the case of a security event, or any other out-of-process event. For example, if a user authenticates at autonomous vehicle 715 but then does not remove the purchased goods, then after a defined amount of time, autonomous vehicle 715 may close and relock any outside access doors, panels, etc., and may also close and relock any internal partitions. In some embodiments, autonomous vehicle 715 may then begin a visible countdown timer whereby user 705 may re-authenticate to re-gain access to the purchased products. If re-authentication does not occur, then autonomous vehicle 715 may leave and continue the sales route. Alternatively, autonomous vehicle 715 may provide no countdown timer and simply continue on a defined route. Other responses may be implemented as well.

In the event of a security event such as the detection of attempted theft, autonomous vehicle 715 may immediately close and relock all doors, partitions, windows, panels, etc. and then leave the scene of the security incident. Autonomous vehicle 715 may continue on a defined route or return to a starting point for inspection.

Upon autonomous vehicle 715 determining that the transaction was completed, at 778, processor 720 may send a digital receipt to mobile device 709 confirming the transaction. Also, autonomous vehicle 715 may send feedback for machine learning algorithm 726 at step 780. This feedback may be sent to processor 720 and then shared from processor 720 to learning algorithm 726. The feedback may include metrics regarding the delivery. For example, the metrics may include sales details, volume, pricing, time at sale stop location, successful vs. unsuccessful authentication attempts by users, driving conditions, weather, road conditions, traffic, construction, road closures, and any other factors that inform the sales route. These metrics may be compared against the prediction to determine how closely the prediction matched the real-world implementation of the predicted sales route. Further these metrics may be compared against factors used to create the prediction in order to explain differences between the prediction and the real-world implementation of the predicted route. Learning algorithm 726 may use the feedback data to update and refine learning algorithm 726 including, but not limited to, changing associations between factors, implementing new discovered factors that may be relevant to a prediction, changing weighting of factors, etc.

In some embodiments, it may be desirable to implement a machine learning algorithm to predict one or more aspects of the autonomous vehicle 815 travel route. This approach would allow for adaptation of the system over time to maximize one or more stated goals such as fuel efficiency, minimization of delivery time, etc. The sequence diagram of FIG. 8 illustrates an exemplary scenario in which the backend fully employs a machine learning algorithm in connection with an autonomous vehicle transaction system.

Figure 8:
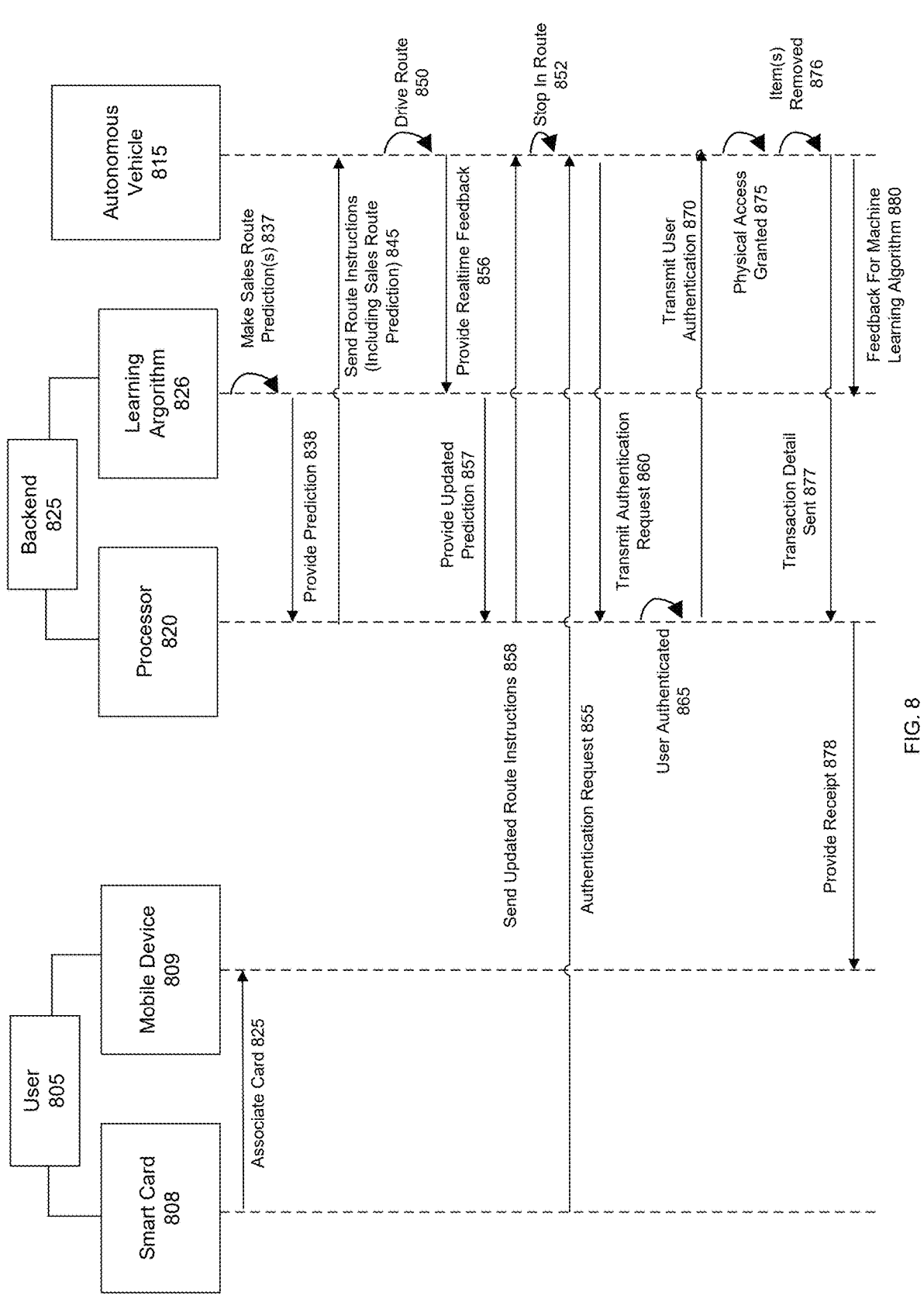
FIG. 8 illustrates a sequence of operations for utilizing machine learning and an autonomous vehicle transaction system as a mobile vending machine.

FIG. 8 illustrates an exemplary application of embodiments of the invention in conjunction with the system 100 of FIG. 1. In the scenario set forth in FIG. 8, a user 805 has a smart card 808 and a mobile device 809. The mobile device 809 is in communication with a backend 820. Mobile device 809 may be a personal computer, smart phone, smart watch, or any other network enabled computing device. Mobile device 809 may include memory, a network communication, an interactive user interface, and a processor capable of running one or more software applications and a digital wallet. Smart Card 808 may be any chip enabled credit card or the like. Smart Card 808 may be in communication with mobile device 809 via Bluetooth, NFC, or any other suitable short range communication protocol.

Backend 824 may include processor 820 as well as learning algorithm 826, and may be in communication with mobile device 809 and autonomous vehicle 815. Backend 824 may be configured to transmit to and receive data from mobile device 809 pertaining to a purchase transaction, and may be configured to transmit to and receive data from mobile autonomous vehicle 815 pertaining to operation of autonomous vehicle 815, both as a vehicle and as a point of sales device.

Autonomous vehicle 815 may include one or more processors and memory, as well as storage and inventory control. It may be configured to communicate with processor 820 in order to receive and send driving and route instructions and data, authentication information, sales data, etc.

User 805 may hold smart card 808 that may be associated with one or more financial and/or credit accounts, etc. User 805 may also have a mobile device 809. At 825, user 805 may associate smart card 808 with mobile device 809 through any means available. By way of non-limiting example, this may be through inclusion of smart card 808 in a digital wallet of mobile device 809. It may also be through inclusion of smart card 808 with an application installed and running on mobile device 809. The application may be a shopping application or some other application that allows or facilitates payment of online purchases. Smart card 808 may be associated with mobile device 809 through any technological means, including but not limited to, manual entry, NFC, Bluetooth, etc.

At step 837, learning algorithm 826 may make one or more predictions based on different data as inputs. Learning algorithm 826 may have access to data and information. For example, backend 824 may store historical transaction data for users, including user 805. The historical user transaction data may comprise a history of user transactions completed with one or more accounts associated with a financial entity or merchant associated with backend 824. Moreover, in instances where backend 824 is associated with a non-financial entity, the non-financial entity may maintain a database that includes a history of user transactions completed with one or more accounts for which the respective financial entities for those one or more accounts have provided the historical transaction data, or have provided access to transaction data maintained on the financial entities' databases. Backend 824 may store historical user transaction data for each of its users, thereby comprising a large group of consumer transaction history. Historical user transaction history may include who bought what, where they bought those items, how many of those items were purchased, when those items were purchased, how many times those items were purchased, etc. At 837, learning algorithm 826 may utilize user 805's consumer transaction history data in making a prediction. That prediction may be provided to processor 820 at step 838. In one embodiment, learning algorithm 826 may also receive the large group of consumer transaction history as a discrete input to the learning algorithm 826. In some embodiments, machine learning algorithm 826 may receive additional inputs such as user data scraped from social media websites or other social media interfaces. The scrapped user data from social media may include posts made by the user, responses to posts made by others, discussions including the user, user likes, user dislikes, user interaction with social media content, lack of user interaction with social media content, etc. Learning algorithm 826 may also have access to other data such as current traffic conditions, current weather conditions, historical traffic conditions, historical weather conditions, event schedules for the area in which autonomous vehicle 815 operates (i.e. travels), road construction schedules, etc. Learning algorithm 826 may be trained on training data sets comprising the same general data types.

At step 837, learning algorithm 826 may use the received data to make one or more predictions. The autonomous vehicle 815 of FIG. 8 may operate as a mobile vending machine and therefore the one or more predictions may seek to facilitate an optimal sales route. The "optimal" sales route may be defined as a route which seeks to maximize gross sales, unit sales, profit, or any other sales-based metric. "optimal" may also seek to maximize or minimize any number of other factors/metrics. For example, an optimal sales route may seek to minimize fuel consumption, distance driven, time spent on the route, etc. An optimal sale route may be one that maximizes multiple metrics with one being favored or each being equally valued. "Optimal" may also be defined as maximizing or minimizing one or more metric in light of other metrics that may be kept within certain ranges. For example, an "optimal" sales route may seek to maximize profits, while also putting importance on unit sales, while also maintaining sales route time under a ceiling time (e.g., two hours). Other scenarios may be possible.

In some embodiments, where more than one metric or factor may be considered, learning algorithm 826 may apply relative weightings to each metric. For example, in a scenario where autonomous vehicle 815 is selling ice cream, learning algorithm 826 may seek to find a delivery route that maximizes gross sales while also avoiding tolls, roadwork, adverse weather, etc. There could be a prediction that seeks to minimize fuel consumption as a primary goal, but also use sales or some other metric or metrics as secondary considerations, and learning algorithm 826 may predict a route that is not the absolute lowest fuel consumption, but is the best predicted tradeoff between fuel consumption vs those other secondary metrics. Other more complex interactions may be considered and predicted by learning algorithm 826. Learning algorithm 826 may leverage historical sales data to better understand locations that are likely to result in sales base on timing of sales, volume of sales at each such location, etc. This sales data may be cross-referenced with other historical data such as weather and event data. For example, if a large number of jersey sales previously occurred at or near a stadium on a certain day, then it may be relevant to understand that a sporting event was taking place during those sales. Or in the case of ice cream sales, it may be relevant to understand if there was a reason why a large group of people were near the sales area (e.g., sporting event, concert, etc.). It may also be relevant to understand if it was a hot day, thereby helping to drive ice cream sales. Learning algorithm 826 may utilize all such data and metrics to predict a sales route that has the highest chance to maximize a given metric and may also predict the outcome of one or more metrics based on the prediction.

In exemplary embodiments, "optimal" may be defined in relation to a multitude of factors and how those factors interact with each other for a predicted sales route. For instance, it might not make much sense to plan a sales route that doubles back repeatedly for subsequent planned sales stops, but there may be other considerations such as one-way streets, traffic, road closures, sporting event, avoidance of tolls, etc.

At 837, learning algorithm 826 may make one or more predictions based on varying criteria, as discussed above. Learning algorithm 826 may utilize a system of weights and ranks for the predictions based on a confidence in the prediction. The confidence in a prediction may be based on confidences in one or more data points relied on by learning algorithm 826, such as current weather conditions and how those conditions might change by the time autonomous vehicle 815 reaches the area(s) corresponding to the weather conditions. The same is true for current traffic, road closures due to accidents or other transient events, etc. Confidence in prediction(s) may also be based on affirming feedback based on one or more prior predictions. Machine learning algorithm 826 may be trained to better predict sales routes by analyzing results across a plurality of autonomous vehicles.

Once learning algorithm 826 has predicted a sales route, the predicted route may be sent to processor 820 at step 838 for packaging and inclusion in a data packet that is sent to autonomous vehicle 815 at step 845. The data packet may include the sales route prediction as well as specific driving instructions and stop locations, as well as times to remain at each stop. The data packet may also include weather forecast(s), traffic conditions, road closures, etc. The prediction may also have alternate directions based on potential occurrences or changes in conditions. Alternatively, learning algorithm 826 may continue to make one or more predictions during the implementation of the sales route by autonomous vehicle 815, and any new predictions differing from the original prediction may be sent to processor 820, and then packaged and sent to autonomous vehicle 815. Such updates may cause deviations from the original route and constitute an updated route based on the updated prediction. The data packet may be one or multiple data packets sent to autonomous vehicle 815.

At step 850, autonomous vehicle 815 may drive the sales route. The route taken by autonomous vehicle 815 may be fully dictated by the prediction or predictions from learning algorithm 826. Thus, in exemplary embodiments, the route may be defined by multiple sales stop locations, and may be optimized to minimize distance traveled between sales stop locations or any other factor or combination of factors.

At 856, autonomous vehicle 815 may provide real-time feedback to processor 820 and learning algorithm 826. The real-time feedback may include conditions experienced from the road, such as unexpected weather, traffic, road closures, road construction; accidents, etc. At step 857, learning algorithm 826 may use the real-time feedback to improve and modify the prediction made at 837. For example, if an accident has caused a traffic delay, learning algorithm 826 may determine a different sales route is now optimal based on various criteria. Learning algorithm 826 may predict an updated sales route that is more than simply a different driving direction. For example, the traffic backup may be predicted to affect potential sales at one or more sales stop locations. As a result, the updated predictions may remove, change, or add more sales stops, reduce the overall route time, decrease or otherwise alter stop times at one or more sales stops, etc. Other changes may be predicted based on real-time feedback provided by autonomous vehicle 815. At step 858, processor 820 may provide the updated sale route instructions to autonomous vehicle 815, and autonomous vehicle 815 may modify the traveled sales route accordingly. Real-time feedback from autonomous vehicle 815 may be provided at multiple times during a sales route, or even on a continuous and ongoing basis.

At step 852, autonomous vehicle 815 may stop at a designated sales stop location for a defined period of time in order to make autonomous vehicle 815 available to users for sales transactions.

User 805 may approach autonomous vehicle 815 during a sales stop and attempt to gain physical access to autonomous vehicle 815. User 805 may use smart card 808 to attempt authentication with autonomous vehicle 815. In one embodiment, autonomous vehicle may have one or more physical card readers built into the exterior of the vehicle. User 805 may insert smart card 808 into one of these physical card readers and autonomous vehicle 815 may read smart card 808. Autonomous vehicle may be able to verify the smart card through open-loop or closed-loop authentication of the user's identity and the validity of smart card 808. Alternatively, autonomous vehicle 815 may include wireless communications such as Wi-Fi, NFC, Bluetooth, etc. User 805 may simply move smart card 808 near autonomous vehicle 315 and/or include a gesture with smart card 808 such as a swipe, tap, etc. in order to initiate an authorization request at step 855. Autonomous vehicle 815 may transmit the authorization request to processor 820 at step 860. Processor 820 may utilize authentication technology, for example, as described in FIG. 15, to authenticate user 805. Alternatively, user 805 may use mobile device 809 to initiate the authorization request at 855. In some embodiments, the smart phone may also use wireless communications in much the same way as described with respect to smart card 808.

Processor 820 may receive the authentication request and may utilize the authentication data stored in one or more databases associated with backend 824 in order to perform an authentication and verify the identity of user 805 (or at least the validity of smart card 808 and/or mobile device 809). In some embodiments, the data from smart card 808 may be encrypted per authentication technology, for example, as described in FIG. 15, and backend 824 may be equipped with the same authentication technology. Thus, autonomous vehicle 815 may be able to authenticate user 805 via authentication technology implemented by the backend 824 at step 865.

At step 870, the processor 820 may transmit confirmation of user authentication to autonomous vehicle 815. Once autonomous vehicle 815 has successfully received confirmation of use authentication, then at step 875, user 805 may be granted physical access to autonomous vehicle 815. A grant of physical access may mean unlocking of a particular door (i.e. driver side rear, passenger side rear, passenger side front, etc.) or automatically unlocking and opening a particular door. It may also mean opening of the trunk. In the event that autonomous vehicle 815 is not a passenger car, granting physical access could mean something different, such as opening a specific compartment on the outside of the vehicle, or the back gate of a delivery truck.

In the event of a passenger car, physical access may be limited to a certain area of the interior space of the car. For example, granting physical access to the driver-side rear door generally means user 805 will have access to the entirety of the inside of the car. However, in exemplary embodiments, autonomous vehicle 815 may be partitioned such that grant of physical access to one specific door limits access within the internal space of autonomous vehicle 815. For example, there may be a physical barrier installed within autonomous vehicle such that each door only provides access to interior volume direction adjacent to that specific door. So in the event that authentication results in autonomous vehicle granting physical access to the driver-side rear door, opening that door would only provide access to a volume directly behind that door and not to the rest of the vehicle. This allows for multiple users to interface with autonomous vehicle 815 simultaneously. For example, if user 805 authenticates to the driver-side rear door and gains physical access to that area of autonomous vehicle 815, then a second user could authenticate to the passenger-side rear door and gain physical access to that portion of the vehicle at the same time. Additional users could gain access to other portioned sections of autonomous vehicle 815 concurrently. This approach would prevent one user potentially getting charged for a product removed by a different user.

Internal portioning may be more granular than simply being tied to physical access from outside the autonomous vehicle 815. For example, if physical access is granted to the driver-side rear door, then upon opening said door, user 805 may be presented with a plurality of locked cubbies or other locked sub-partitions. The grant of physical access at step 865 may not only include access to the driver-side rear door, but also to one or more of the sub-partitions once the driver-side rear door is opened. The same approach is available with the rear trunk, front trunk. Or other doors, including the driver's door. Autonomous vehicle 815 has no driver, so it is possible to remove physical vehicle controls such as the steering wheel, pedals, etc., and use that space for delivery of goods.

The same type of internal portioning is possible with other types of delivery vehicles. For example, a delivery truck could not only include the grant of physical access to the inside of the vehicle at step 865, but also to sub-partitions within the vehicle. For instance, a delivery truck may include multiple doors/windows/access panels/etc., on the outside of the vehicle. Once physical access is granted to one or more of these panels, there may be locked sub-partitioned volumes within the truck that may store multiple users' respective purchased products. The physical access granted at step 865 may include not only access to the panel from the outside of the vehicle, but also access to the sub-partition corresponding to the authenticated user (in this case, user 805).

Further, for a mobile sales kiosk implementation of autonomous vehicle 815, there could be vending machines behind physical access from the outside of autonomous vehicle 815. For example, upon opening the driver-side rear door, user 805 may be presented with a traditional vending machine whereby product selections may be made, with or without additional authentication (e.g. swipe, gesture, etc. of smart card 808 or mobile device 809). Similarly, the vending machines may be built into the exterior of autonomous vehicle 815 thereby obviating the need for user 805 to first gain physical access to the interior of autonomous vehicle 815. In addition to a traditional vending machine, embodiments may include other means for offering and sale of goods. Sales may be tracked by light beam or curtain, weight monitoring, visual camera, etc. Products offered by autonomous vehicle 815 may be varied and may be delineated by various areas of autonomous vehicle 815. For example, ice cream may be offered on the driver side of autonomous vehicle 815 while sun screen and other hot weather goods are offered on the passenger side of autonomous vehicle 815. Other complimentary and disparate goods may be sold from a single autonomous vehicle 815.

Of course, the design of the internal volumes may be important for safety reasons. For example, if an internal volume is too large, a person could crawl inside and then autonomous vehicle 815 may depart with a human stow-away. Thus, autonomous vehicle 815 may be designed to prevent such occurrence. For instance, internal volumes and partitions/sub-partitions may be deliberately made such that an average human and/or an average human child would not be able to fit within any such space. Alternatively, if partitions are necessary that are inherently large enough to accommodate a human stow-away, other means may be employed to prevent stowing away. For example, if an internal partition is large enough to fit a human, strategically place bars or other features may prevent human encroachment. Further, a detection system may be employed that monitors weight, employs camera with facial or heat signature, etc., or any other means of detecting unauthorized riders. Autonomous vehicle 815 may be designed to remain stationary until any stow-away exits the vehicle. Some embodiments may also employ other means to incentivize stow-aways from exiting the vehicle such as deploying loud sounds, contacting authorities, deploying offensive odors, etc.

At step 876, user 805 removes one or more product from autonomous vehicle 815. Upon removal of purchased goods by user 805, the transaction may be considered complete at step 877, and notification may be sent to processor 820. Autonomous vehicle 815 may be able to track successful removal of goods from internal spaces. Systems may be employed that track weight differentials, have light curtains or beams that indicate when they have been broken by hands reaching in to remove products, etc. Further, video surveillance may be used to confirm successful transaction completion and for evidence in the event of disputes. Autonomous vehicle 815 may be equipped with self-closing and relocking doors, partitions, sub-partitions, etc. These self-closing and relocking doors may be programmed to engage after a certain default amount of time, idle time, in the case of a security event, or any other out-of-process event. For example, if a user authenticates at autonomous vehicle 815 but then does not remove the purchased goods, then after a defined amount of time, autonomous vehicle 815 may close and relock any outside access doors, panels, etc., and may also close and relock any internal partitions. In some embodiments, autonomous vehicle 815 may then begin a visible countdown timer whereby user 805 may re-authenticate to re-gain access to the purchased products. If re-authentication does not occur, then autonomous vehicle 815 may leave and continue the sales route. Alternatively, autonomous vehicle 815 may provide no countdown timer and simply continue on a defined route. Other responses may be implemented as well.

In the event of a security event such as the detection of attempted theft, autonomous vehicle 815 may immediately close and relock all doors, partitions, windows, panels, etc. and then leave the scene of the security incident. Autonomous vehicle 815 may continue on a defined route or return to a starting point for inspection.

Upon autonomous vehicle 815 determining that the transaction was completed, at 878, processor 820 may send a digital receipt to mobile device 809 confirming the transaction. Also, autonomous vehicle 815 may send feedback for machine learning algorithm 826 at step 880. This feedback may be sent to processor 820 and then shared from processor 820 to learning algorithm 826. The feedback may include metrics regarding the delivery. For example, the metrics may include sales details, volume, pricing, time at sale stop location, successful vs. unsuccessful authentication attempts by users, driving conditions, weather, road conditions, traffic, construction, road closures, and any other factors that inform the sales route. These metrics may be compared against the prediction to determine how closely the prediction matched the real-world implementation of the predicted sales route. Further these metrics may be compared against factors used to create the prediction in order to explain differences between the prediction and the real-world implementation of the predicted route. Learning algorithm 826 may use the feedback data to update and refine learning algorithm 826 including, but not limited to, changing associations between factors, implementing new discovered factors that may be relevant to a prediction, changing weighting of factors, etc.

Figure 9:
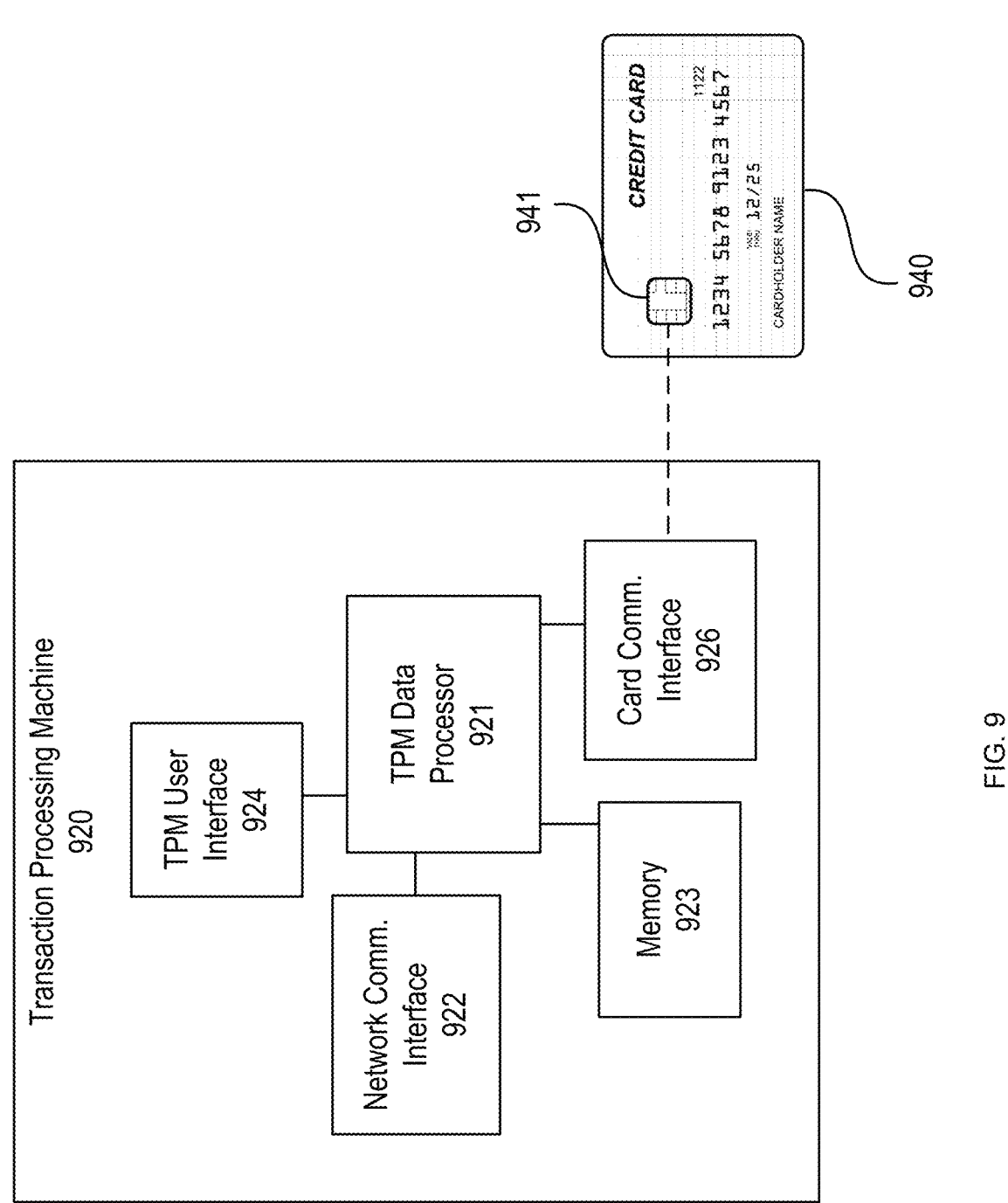
FIG. 9 is a schematic representation of a transaction processing machine of an autonomous vehicle usable in implementing embodiments of the invention.

With reference to FIG. 9, the transaction processing machine (TPM) 920 may be any network enabled processor configured for processing a transaction involving a transaction card 940. The TPM 920 may be, for example, a cash register, automated teller machine, vending machine, or other POS terminal that is built into an autonomous vehicle and is capable of communicating with the transaction card 940 and is capable of communicating with a card network via the network 110. In some embodiments, the TPM 920 may include a TPM data processor 921, a network communication interface 922, a TPM user interface 924, a memory 923, and a card communication interface 926.

The TPM data processor 921 can include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The memory 923 can be a read-only memory, write-once read-multiple memory or read/write memory, e.g., RAM, ROM and EEPROM, and the transaction processing machine 920 can include one or more of these memories.

The TPM user interface 924 may include a user input mechanism, which can be any device for entering information and instructions into the TPM 920, such as a touchscreen, keyboard, mouse, cursor-control device, microphone, stylus, or digital camera. The user interface 924 may also include a display, which can be any type of device for presenting visual information such as a computer monitor, a flat panel display, and a mobile device screen, including liquid crystal displays, light-emitting diode displays, plasma panels, and cathode ray tube displays.

The network communication interface 922 may be configured to establish and support wired or wireless data communication capability for connecting the TPM 920 to the network 110 or other communication network. The card communication interface 926 may be configured for receiving the transaction card 940 and making electrical contact for wired communication between the TPM data processor 921 and the data processing chip 941. Alternatively or in addition, the card communication interface 926 may be configured to support short-range wireless communications between the transaction card 940 and the TPM data processor such as near field communication (NFC), radio-frequency identification, and Bluetooth. The card communication interface 926 may, in particular, be configured for establishing wired or wireless communication with the data processing chip 941 on board the transaction card 940 and for receiving information transmitted by the data processing chip 941 via the card communication interface 926.

In embodiments of the invention, the TPM memory 923 may have stored therein one or more applications usable by the data processor 921 to conduct transactions and to communicate with a transaction processing system. These applications may include instructions usable by the data processor 921 to identify transaction events, store event data in the memory 923, and communicate event data. In some embodiments, they may include instructions for receiving and transmitting transaction messages from the transaction card 940. The application may be configured to instruct the data processor 921 to interpret some or all of the unencrypted portion of a message.

Figure 10:
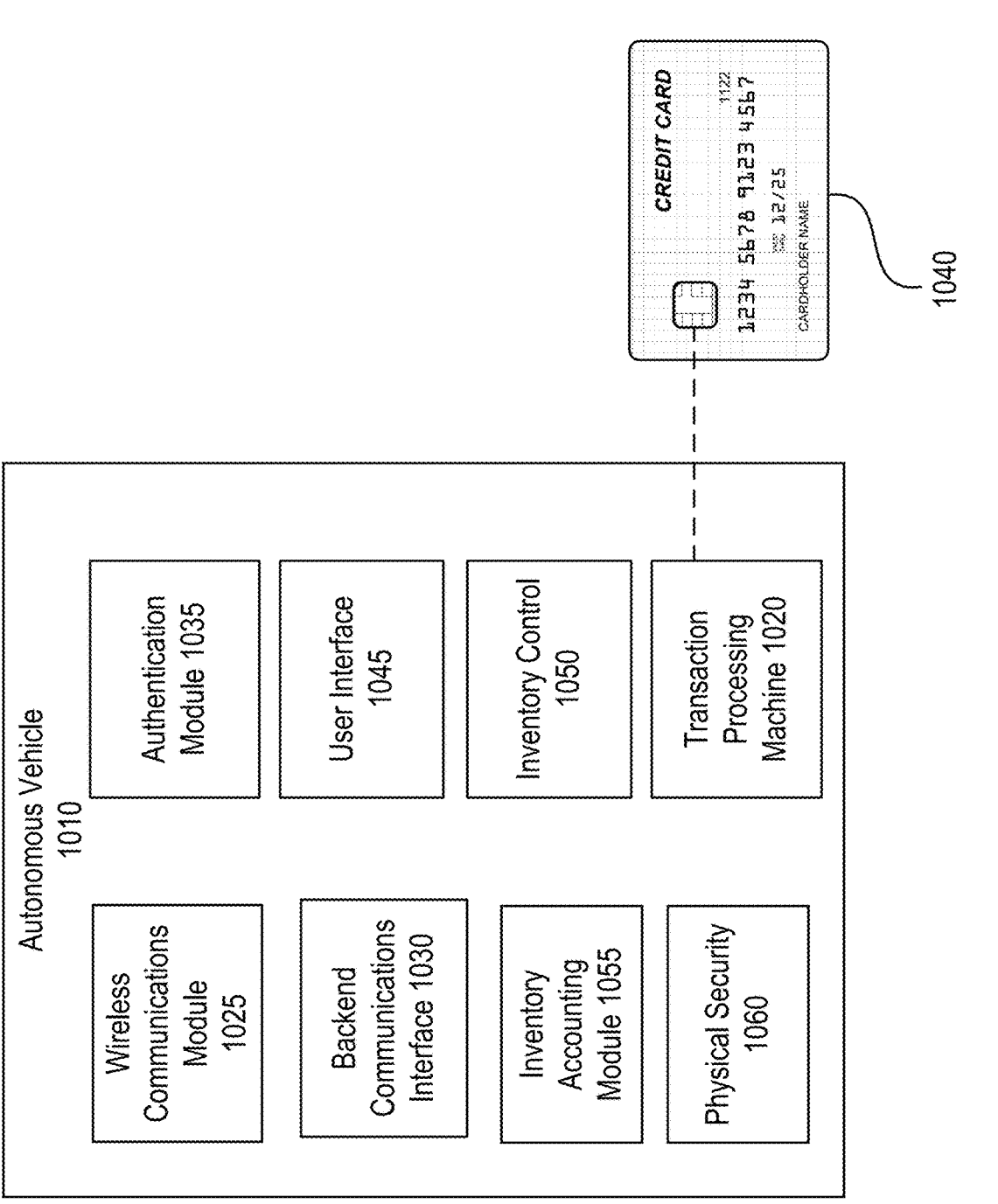
FIG. 10 is a schematic representation of an autonomous vehicle usable in implementing embodiments of the invention.

With reference to FIG. 10, autonomous vehicle 1010 may include various components, modules, etc. For example, autonomous vehicle 1010 may include transaction processing machine (TPM) 1020. This TPM (1020) may be similar to the transaction processing machine 920, discussed in detail with respect to FIG. 9. TPM 1020 may be integrated into autonomous vehicle 1010 and may be capable of interacting with smart card 1040. The integration of TPM

1020 may include the physical installation of one or more card readers into autonomous vehicle 1010. The physical card readers may be accessible from inside autonomous vehicle 1010 or from the outside of autonomous vehicle 1010, or both. In some embodiments where more than one card reader is installed in autonomous vehicle 1010, each card reader may provide the ability to authenticate to a different discrete section of autonomous vehicle 1010. Additionally, TPM 1020 may interface with wireless communications module 1025 in order to provide short range communication capabilities such as NFC, RFID, Bluetooth, etc. Thus, autonomous vehicle 1010 may be able to support contactless authentication and processing of smart card 1040. Contactless interactions may include swipes, taps, or other such gestures as recognized by wireless communications module 1025 and TPM 1020.

Autonomous vehicle 1010 may also include a backend communications interface 1030 that may comprise one or more processors and may also include one or more memory, database, etc. The backend communications interface 1030 may also be in connection with wireless communications module 1025, and may be capable of sending and receiving information from a backend server (not pictured in FIG. 10, but which may be similar to the backend server depicted in FIG. 1). Communications between backend communications interface 1030 and a backend server may include receiving data packets from the backend server that may include driving routes, predictions, weather data, traffic data, events data, road construction data, etc. Communications may further include feedback of real-time conditions, including road, weather, event, accident, etc. In addition, communications may also include authentication data, requests, and authorizations.

Authentication module 1035 may be in communication with backend communications interface 1030, wireless communications module 1025, and TPM 1020. Authentication module 1035 may be capable of receiving authentication data from the backend server via backend communications interface 1030. Authentication module 1035 may be further capable of receiving authentication data from smart card 1040 via TPM 1020 that was initiated by an authentication request (e.g., swipe, tap, gesture, etc.). Authentication module 1035 may be capable of implementing authentication technology, for example, as described in FIG. 15, to authenticate a user.

Autonomous vehicle 1010 may include a user interface 1045. A user interface 1045 may communicate with a user to prompt interactions leading to a purchase transaction. For example, autonomous vehicle 1010 may include a user interface 1045 on the exterior of the vehicle that may prompt a user to attempt authentication. The user interface 1045 may provide instructions and directions such authentication status, confirmation of physical access to a specific area of autonomous vehicle 1010, as well as directing a user to a specific sub-partition within the vehicle. User interface may also display available goods, quantities, locations of goods, etc., and may also display pricing and/or other relevant information. In some embodiments, there may be more than one user interface 1045. In embodiments where there are more than one user interface 1045, there may be multiple user interfaces on the exterior of the vehicle, on the interior of the vehicle, or a combination of interior and exterior user interfaces.

Autonomous vehicle 1010 may include inventory control 1050 as well as inventory accounting module 1055. These may be in communication with each other, and both in communication with the backend server via backend communications interface 1030 and wireless communications module 1025. The inventory control 1050 may be any system or equipment used to track product removal from autonomous vehicle 1010. For example, a transaction may not be considered complete until a user is in possession of the purchased item or items. Thus, autonomous vehicle 1010 must be equipped with the capability to judge when a user reasonably has possession of one or more purchased items. Inventory control 1050 may consist of a light curtain, light beam, etc. that may be able to determine when a user has removed an item from autonomous vehicle 1010 by when such light beam, curtain, etc. has been broken by a hand reaching into a partition, sub-partition, etc. in order to retrieve one or more items. Similarly, inventory control 1050 may include a weight/scale based system that can detect a reduction in weight of a partition, sub-partition, etc., when one or more purchased items are removed from autonomous vehicle 1010. Further, any sort of camera system may be employed by inventory control 1050 to not only determine when a transaction is complete, but also for evidence of a transaction should a dispute arise at a later time. The foregoing is meant to be exemplary and non-limiting, other inventory controls may be employed by inventory control 1050.

Inventory accounting module 1055 may track onboard inventory, sales, etc. The accounting may adjust each time a sale is deemed successfully completed, as determined by inventory control 1050. Inventory accounting module 1055 may provide periodic updates to the backend server. For instance, if autonomous vehicle 1010 sells out of one or more item, then the backend server may send updated sales route data. That sales route data may change the driving route, the stop locations, the stop durations, etc.

Autonomous vehicle 1010 also includes physical security 1060. Users may not access the interior of autonomous vehicle 1010 until they have been successfully authenticated. This restriction of access to the vehicle interior is controlled by physical security 1060 and may include locked doors, trunks, windows, panels, etc. Further, once inside autonomous vehicle 1010, physical security 1060 may also include restriction of access to one or more sub-panels and/or products.

Figure 11:
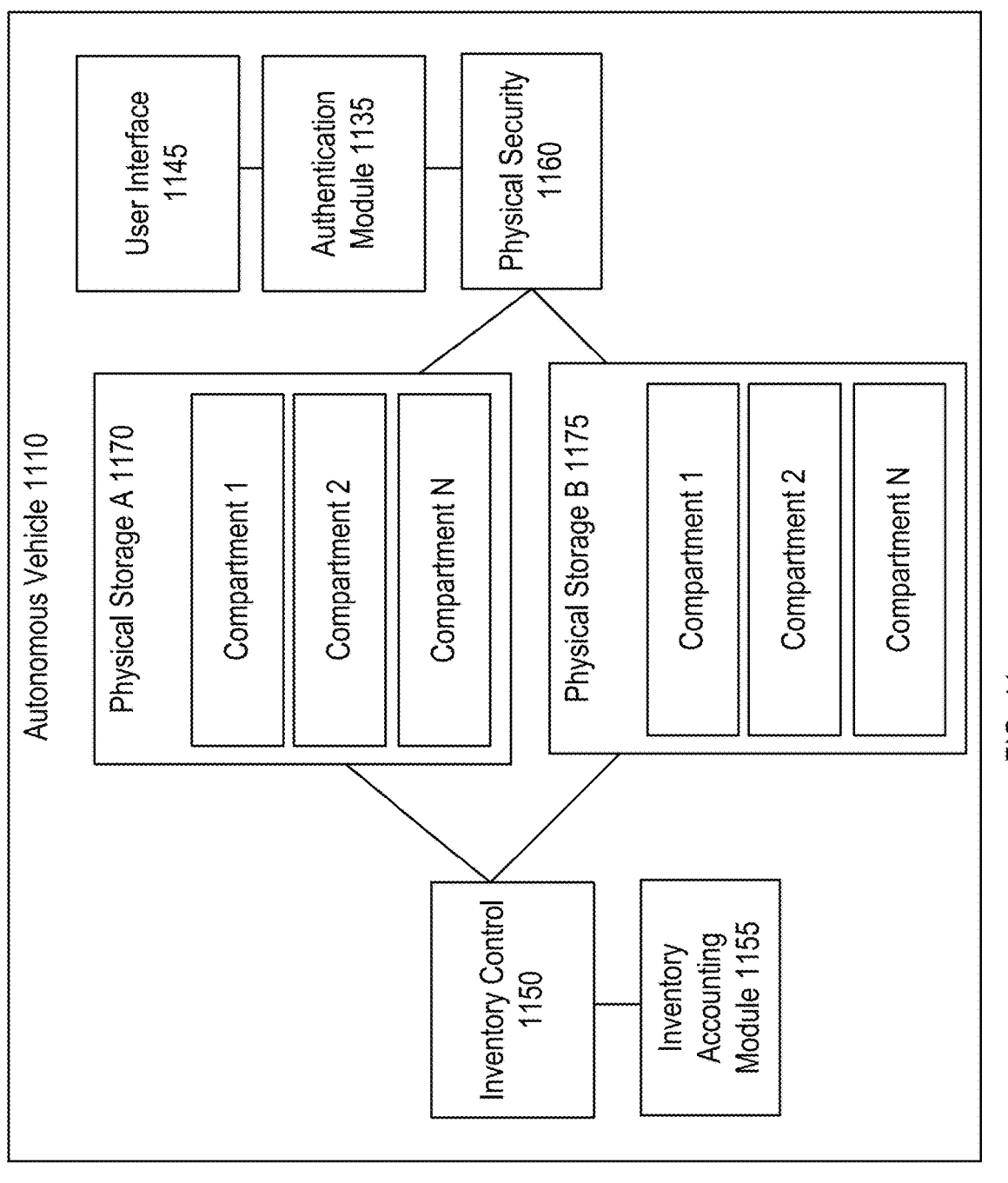
FIG. 11 is a schematic representation of an autonomous vehicle usable in implementing embodiments of the invention.

With reference to FIG. 11, autonomous vehicle 1110 may include a system for storing one or more items for delivery. When autonomous vehicle 1110 drives a delivery route, it may be making more than one stop on the delivery route and attempting to deliver goods to more than one user. Accordingly, autonomous vehicle 1110 may need a way in which to separate the purchases of the various users. Autonomous vehicle 1110 may divide the interior space of the vehicle and provide access to only the interior space corresponding to each users' purchased goods. For example, user 1 may only have access to the driver-side rear door, and once that door is opened, there is a partitioned volume of interior space where user 1's purchased goods may be retrieved. Alternatively, autonomous vehicle 1110 may be designed to include cubbies accessible through windows, panels, etc. built into the exterior of autonomous vehicle 1110. Moreover, in either of these potential designs, there may be sub-partitions within those spaces. For instance, in the example where user 1 gains access to the driver-side rear door, once open, user 1 may be confronted with a plurality of sub-partitions, compartments, etc. So in this example, physical storage A 1170 would consist of the interior volume partitioned behind the driver-side rear door. Then, the sub-partitions within that partitioned interior volume would be compartments 1 through N, depending on the specific number of sub-partitions, the size of each, shape, etc. Physical storage B 1175 may be a second distinct interior volume such as the partitioned interior volume behind the passenger-side rear door, or, for example, the trunk. Then compartments 1 through N of physical storage B 1175 would be any sub-partitions within that second partitioned interior volume. In the second example provided above, a large window, panel, etc. may open to reveal a number of locked compartments. In this example, the internal volume behind the window, panel, etc. is physical storage A 1170, and the compartments are compartments 1 through N. In this example, there may be more than one window, panel, etc. accessible from the outside of autonomous vehicle 1110. The internal volume behind the secondary window, panel, etc. is physical storage B 1175, and the compartments within this secondary volume are compartments 1 through N of physical storage B 1175. It should be appreciated that autonomous vehicle 1110 is not limited to one or two physical storage spaces and there may be any number of physical storage spaces built into autonomous vehicle 1110.

Access to physical storage A 1170 and/or physical storage B 1175 may be controlled by physical security 1160. Users may not access physical storage A 1170 and/or physical storage B 1175 of autonomous vehicle 1110 until they have been successfully authenticated. This restriction of access to the vehicle interior is controlled by physical security 1160 and may include locked doors, trunks, windows, panels, etc. Further, once inside either physical storage A 1170 and/or physical storage B 1175, physical security 1160 may also include restriction of access to the compartments 1 through N of physical storage A 1170 and/or physical storage B 1175.

Authentication module 1135 may be in communication with physical security 1160, as well as with a backend server and a transaction processing machine (TPM). Authentication module 1135 may be capable of receiving authentication data from the backend server. Authentication module 1135 may be further capable of receiving authentication data from a TPM that was initiated by an authentication request (e.g., smart card or mobile device swipe, tap, gesture, etc.). Authentication module 1135 may be capable of implementing authentication technology, for example, as described in FIG. 15, to authenticate a user. Once a user is successfully authenticated, authentication module 1135 may communicate the successful authentication to physical security 1160, which may then provide physical access to the authenticated user.

Autonomous vehicle 1110 may include a user interface 1145. User interface 1145 may communicate with a user to prompt interactions leading to a purchase transaction. For example, autonomous vehicle 1110 may include user interface 1145 on the exterior of the vehicle that may prompt a user to attempt authentication. The user interface 1145 may provide instructions and directions such authentication status, confirmation of physical access to a specific area of autonomous vehicle 1110, such as physical storage A 1170 and/or physical storage B 1175 as well as any compartment therein. User interface may also display available goods, quantities, locations of goods, etc., and may also display pricing and/or other relevant information. In some embodiments, there may be more than one user interface 1145. In embodiments where there are more than one user interface 1145, there may be multiple user interfaces on the exterior of the vehicle, on the interior of the vehicle, or a combination of interior and exterior user interfaces.

Autonomous vehicle 1110 may include inventory control 1150 as well as inventory accounting module 1155. These may be in communication with each other, and may serve to track and account for sales and product inventory. Inventory control 1150 may be any system or equipment used to track product removal from physical storage A 1170 and/or physical storage B 1175 as well as any compartment therein. For example, a transaction may not be considered complete until a user is in possession of the purchased item or items. Thus, autonomous vehicle 1110 must be equipped with the capability to judge when a user reasonably has possession of one or more purchased items. Inventory control 1150 may consist of a light curtain, light beam, etc. that may be able to determine when a user has removed an item from physical storage A 1170 and/or physical storage B 1175 as well as any compartment therein by when such light beam, curtain, etc. has been broken by a hand reaching into a partition, sub-partition, etc. in order to retrieve one or more items. Thus, these sensors may be installed on a per-compartment basis. Similarly, inventory control 1150 may include a weight/scale based system that can detect a reduction in weight of a partition, sub-partition, etc., when one or more purchased items are removed from physical storage A 1170 and/or physical storage B 1175 as well as any compartment therein. Again, such weight sensors may be installed on a per-compartment basis. Further, any sort of camera system may be employed by inventory control 1150 to not only determine when a transaction is complete, but also for evidence of a transaction should a dispute arise at a later time. The foregoing is meant to be exemplary and non-limiting, other inventory controls may be employed by inventory control 1150. Inventory accounting module 1155 may track onboard inventory, sales, etc. The accounting may adjust each time a sale is deemed successfully completed, as determined by inventory control 1150.

Figure 12:
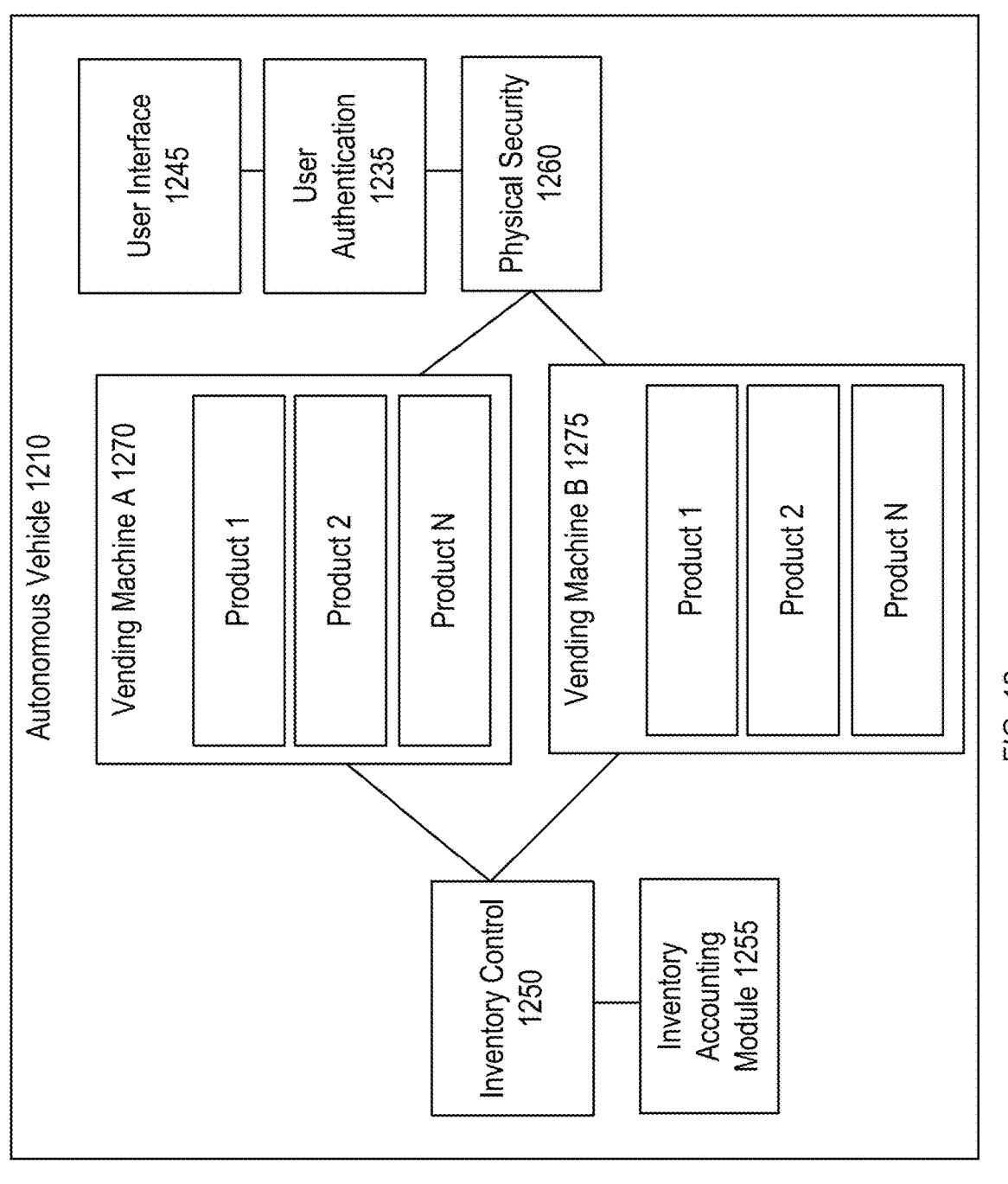
FIG. 12 is a schematic representation of an autonomous vehicle usable in implementing embodiments of the invention.

With reference to FIG. 12, autonomous vehicle 1210 may include a system for storing one or more items for delivery. When autonomous vehicle 1210 drives a sales route, it may be making more than one stop on the sales route and offering goods to any users who might approach autonomous vehicle 1210. Accordingly, autonomous vehicle 1210 may need a way in which to compartmentalize the goods that are offered for sale. Autonomous vehicle 1210 may divide the interior space of the vehicle and provide access to only the section authorized based on a user authentication. Alternatively, autonomous vehicle 1210 may be designed to include cubbies accessible through windows, panels, etc. built into the exterior of autonomous vehicle 1110.

Vending machine A 1270 and/or vending machine B 1275 may be similar to traditional vending machines. For example, in some embodiments, a user may access an interior space of autonomous vehicle 1210 (such as behind the driver-side rear door) after authentication and be presented with a vending machine A 1270. This vending machine may include any number of discrete items, products 1 through N, and in any quantity. Purchase of these items may require secondary authentication or may be permitted based on prior authentication required to gain physical access to autonomous vehicle 1210. General operation of a vending machine A 1270 may be similar to any existing vending machine. A second vending machine, vending machine B 1275, may reside in a different partitioned interior section of autonomous vehicle 1210. Alternatively, a user may access a specific window, panel, etc. from the outside of autonomous vehicle 1110, and be faced with vending machine A 1270, which may be similar to a traditional vending. Vending machine B 1275 may be situated behind a different window, panel, etc. on autonomous vehicle 1210.

Access to vending machine A 1270 and/or vending machine B 1275 may be controlled by physical security 1260. Users may not access vending machine A 1270 and/or vending machine B 1275 of autonomous vehicle 1210 until they have been successfully authenticated. This restriction of access to the vehicle interior is controlled by physical security 1260 and may include locked doors, trunks, windows, panels, etc. Further, once inside either vending machine A 1270 and/or vending machine B 1275, physical security 1160 may also include restriction of access to the products 1 through N of vending machine A 1270 and/or vending machine B 1275. Thus secondary authentication and/or purchase of products from the vending machines may be required.

Authentication module 1235 may be in communication with physical security 1260, as well as with a backend server and a transaction processing machine (TPM). Authentication module 1235 may be capable of receiving authentication data from the backend server. Authentication module 1235 may be further capable of receiving authentication data from a TPM that was initiated by an authentication request (e.g., smart card or mobile device swipe, tap, gesture, etc.). Authentication module 1235 may be capable of implementing authentication technology, for example, as described in FIG. 15, to authenticate a user. Once a user is successfully authenticated, authentication module 1235 may communicate the successful authentication to physical security 1260, which may then provide physical access to the authenticated user.

Autonomous vehicle 1210 may include a user interface 1245. User interface 1245 may communicate with a user to prompt interactions leading to a purchase transaction. For example, autonomous vehicle 1210 may include user interface 1245 on the exterior of the vehicle that may prompt a user to attempt authentication. The user interface 1245 may provide instructions and directions such authentication status, confirmation of physical access to a specific area of autonomous vehicle 1210, such as a specific panel as well as vending machine A 1270 and/or vending machine B 1275 therein. User interface 1245 may also display available goods, quantities, locations of goods, etc., and may also display pricing and/or other relevant information. In some embodiments, there may be more than one user interface 1245. In embodiments where there are more than one user interface 1245, there may be multiple user interfaces on the exterior of the vehicle, on the interior of the vehicle, or a combination of interior and exterior user interfaces.

Autonomous vehicle 1210 may include inventory control 1250 as well as inventory accounting module 1255. These may be in communication with each other, and may serve to track and account for sales and product inventory. Inventory control 1250 may be any system or equipment used to track product removal from vending machine A 1270 and/or vending machine B 1275 as well as any compartment therein. For example, a transaction may not be considered complete until a user is in possession of the purchased item or items. Thus, autonomous vehicle 1210 must be equipped with the capability to judge when a user reasonably has possession of one or more purchased items. Inventory control 1250 may consist of a light curtain, light beam, etc. that may be able to determine when a user has removed an item from vending machine A 1270 and/or vending machine B 1275 by when such light beam, curtain, etc. has been broken by a hand reaching into a delivery tray, or the like, in order to retrieve one or more items. Thus, these sensors may be installed on a per-vending machine basis. Similarly, inventory control 1250 may include a weight/scale based system that can detect weight change in a delivery tray, indicative of an item reaching that tray and then being removed from the tray of vending machine A 1170 and/or vending machine B 1175. Again, such weight sensors may be installed on a per-vending machine basis. Further, any sort of camera system may be employed by inventory control 1250 to not only determine when a transaction is complete, but also for evidence of a transaction should a dispute arise at a later time. The foregoing is meant to be exemplary and non-limiting, other inventory controls may be employed by inventory control 1250. Inventory accounting module 1255 may track onboard inventory, sales, etc. The accounting may adjust each time a sale is deemed successfully completed, as determined by inventory control 1250.

Figure 13:
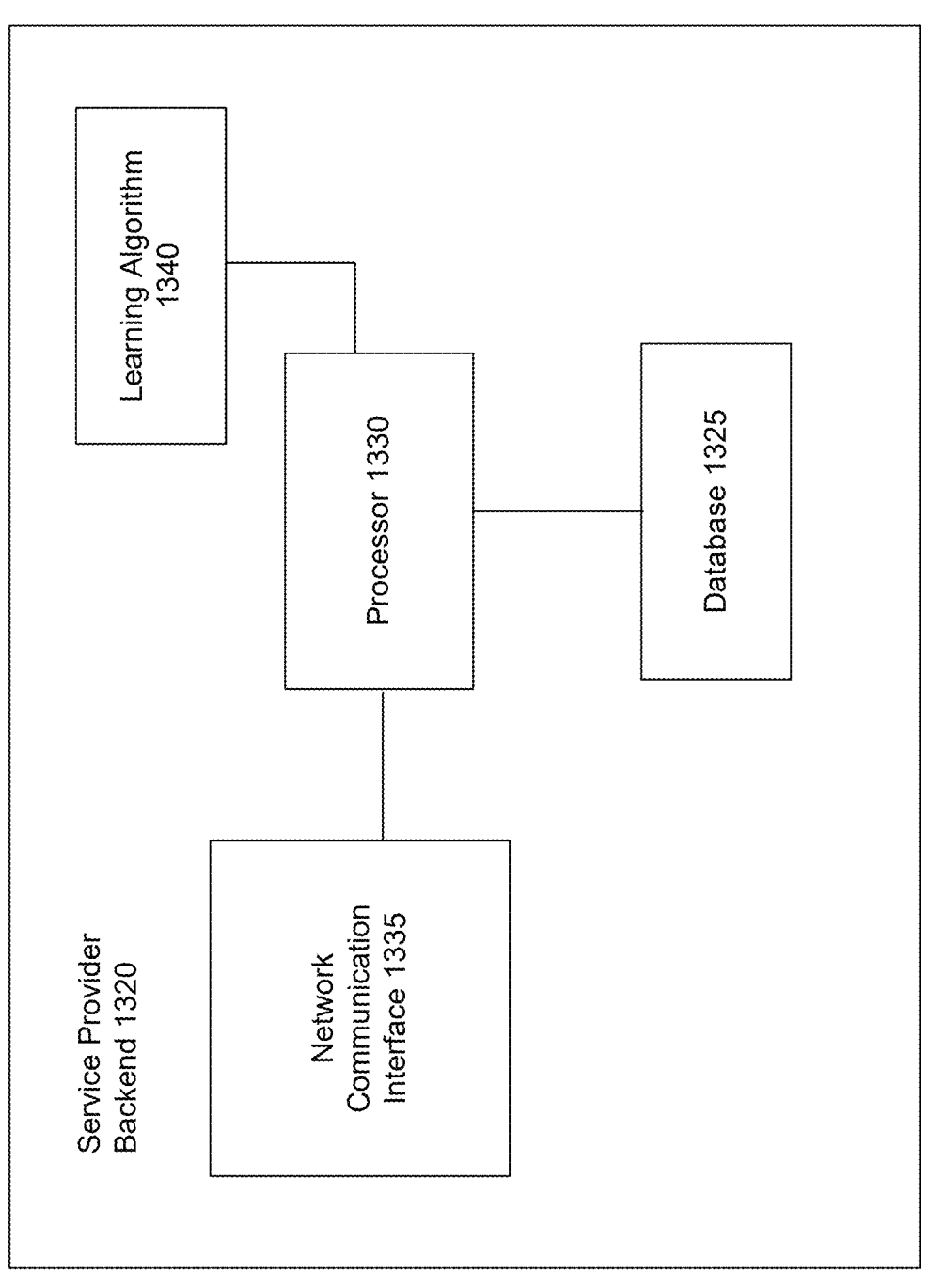
FIG. 13 is a schematic representation of a service provider backend, usable in embodiments of the invention.

With reference to FIG. 13, backend 1320 may be a server such as a dedicated server computer, such as bladed servers, or personal computer, laptop computer, notebook computer, palm top computer, network computer, or any processor-controlled device capable of supporting the system 100. While FIG. 13 illustrates a backend 1320 that may be a single server, it is understood that other embodiments can use multiple servers or multiple computer systems as necessary or desired to support the users and can also use back-up or redundant servers to prevent network downtime in the event of a failure of a particular server. In a particular embodiment illustrated in FIG. 13, backend 1320 includes a processor 1330 in communication with a database 1325, a network communication interface 1335, and a machine learning algorithm 1340. The processor 1330 may include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The database 1325 may comprise memory and can be a read-only memory, write-once read-multiple memory or read/write memory, e.g., RAM, ROM and EEPROM.

The network communication interface 1335 is configured to establish and support wired and/or wireless data communication capability for connecting a mobile device and an autonomous vehicle to the network 110 or other communication network. The network communication interface 1335 can also be configured to support communication with a short-range wireless communication interface, such as Bluetooth.

In embodiments of the invention, the processor 1330 may receive a transaction request over network 110, via network communication interface 1335. Processor 1330 may authenticate the user based and match user information against information stored in Database 1325. Processor 1330 may also send the user data as well as historical transaction data and other information such as weather conditions, traffic, event information, construction, etc. to machine learning algorithm 1340 for use in predicting one or more driving routes. Machine learning algorithm 1340 may use the provided data/information, as well as additional inputs to predict one or more delivery/sales routes for an autonomous vehicle. Processor 1330 may receive the predicted routes and incorporate those into a data packet that it then may store in database 1325.

Processor 1330 may also send the data packet to an autonomous. Backend 1320 may also receive, from the autonomous vehicle, feedback data comprising real-time updates on traffic, weather, accidents, etc. as well as details and metrics pertaining to sales and/or deliveries of goods. This feedback data may be stored in database 1325, and may further be provided as feedback to machine learning algorithm 1340. Machine learning algorithm 1340 may use the feedback data to determine the accuracy of the predicted routes, and further train the machine learning algorithm for improved, accuracy and computer efficiency.

Figure 14:
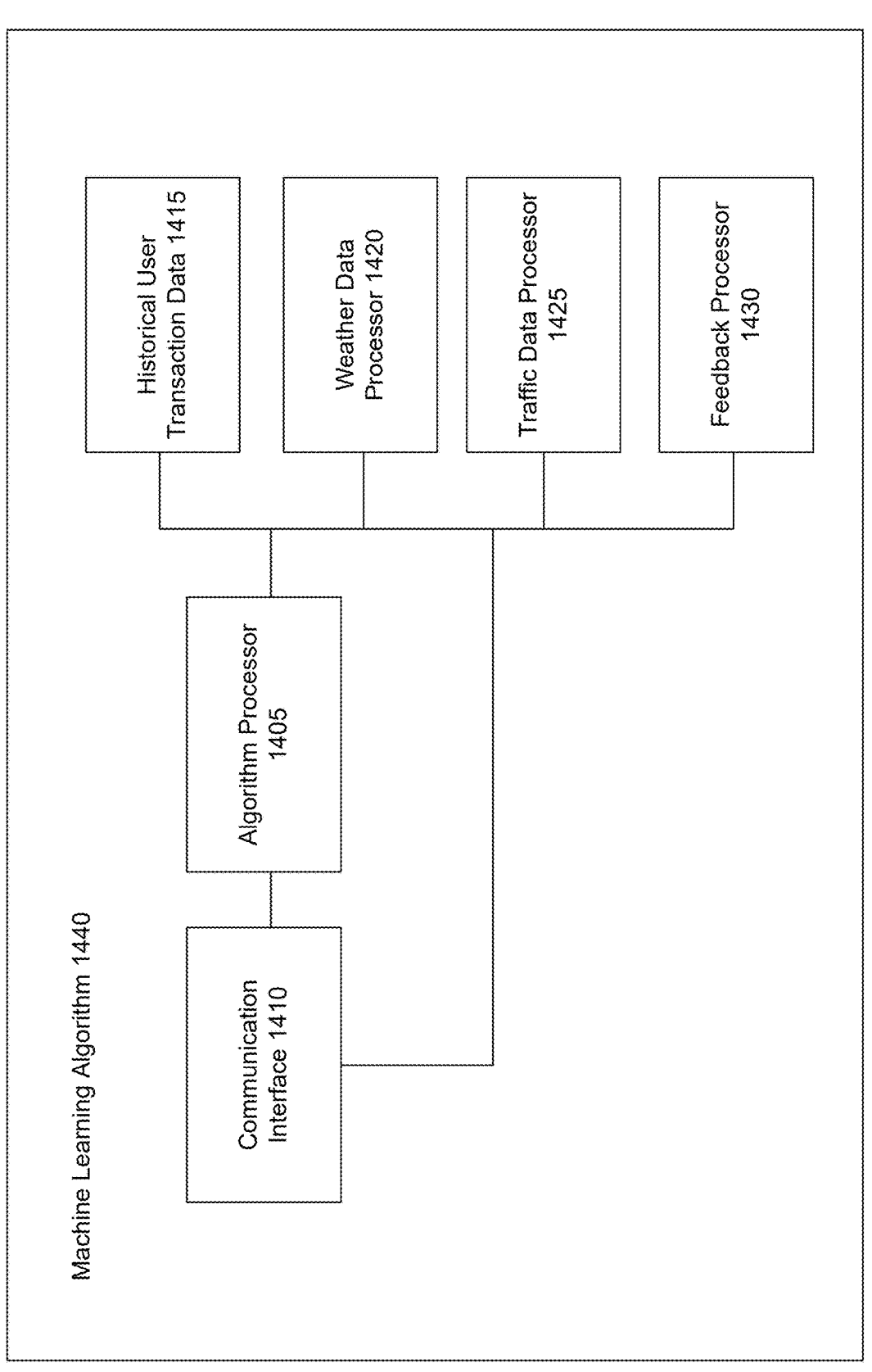
FIG. 14 is a schematic representation of a machine learning algorithm module within the backend, usable in embodiments of the invention.

With reference to FIG. 14, machine learning algorithm 1440 may be part of backend 1320, and may predict sales/delivery routes. Machine learning algorithm 1440 may include a communication interface 1410 as well as an algorithm processor 1405 coupled to a plurality of additional processors including user historical user transaction data 1415, weather data processor 1420, traffic data processor 1425, and feedback processor 1430. The processors of FIG. 14 may include microprocessors and associated processing circuitry, and can contain additional components, including processors, memories, error and parity/CRC checkers, data encoders, anticollision algorithms, controllers, command decoders, security primitives and tamper-proofing hardware, as necessary to perform the functions described herein.

Machine learning algorithm 1440 may receive a number of inputs from the backend through communication interface 1410. These inputs may include transaction details, weather information, traffic information, road maps, construction data, events data, social media data, autonomous vehicle feedback information, etc. The historical user transaction data 1415 may include both historical transactions for a user (e.g., user 205) as well as historical transactions for a pool or group of users. Social media data may include data scrapped from a user's potentially numerous social media webpages. The scrapped data may include user data relating to product likes/dislikes, prior purchases, intended purchases, user locations (e.g., at a sporting event at a known date and time), etc. The social media data may also include a user's reported likes, clicks, dislikes as well as posts made by the user as well as replies by the user to other posts. Social media data may also track a user's interaction with advertisements on social media sites. Weather data may include current weather conditions for areas within a defined scope of potential travel for an autonomous vehicle as well as surrounding areas that may ultimately impact the defined scope of potential travel. Additionally, weather data may include historical weather information as well as forecasted weather information. Traffic data may include current traffic for areas within a defined scope of potential travel for an autonomous vehicle as well as road closures, road construction, accidents, event information, and other data that impacts potential travel of a car. Feedback data may include real-time updates provided from an autonomous vehicle that may render a prediction from machine learning algorithm 1440 obsolete. Such real-time feedback may include changes in anticipated or reported traffic conditions, weather conditions, etc. Feedback data may also include information and metrics pertaining to the completion of a delivery/sales route that may be compared against one or more predicted delivery/sales routes.

Historical user transaction data 1415 may consider prior user purchases, including what was purchased, how many were purchased, price paid for those purchases, the timing of those purchases, and how those purchases relate to other potential factors such as events, weather, etc. For example, if historical transaction data reveals that a user routinely buys ice cream on Friday's during the summer if it is not raining, then historical user machine learning algorithm 1440 may consider that when making a prediction. Large amounts of user data may be considered across users. User social media information may also be considered. For example, a user may post or reply to a post about a product, or mention a product in response to another post. The user may give a like to a product or about something that could be related to a product. For example, if the user likes a post about going to a community pool, Lachine learning algorithm may infer that the user is likely to like sunscreen, swimsuits, sunglasses, etc.

Weather data processor 1420 may consider and process weather related data to predict an "optimal" delivery/sales route. For example, if potential route A travels through an area under a flash flood warning, while potential route B avoids this flash flood warning, then the machine learning algorithm 1440 may consider this when making a sales/delivery route prediction. In some embodiments, machine learning algorithm 1440 may predict route B even if it is longer, less fuel efficient, etc., because machine learning algorithm 1440 may predict that such a route is safer. Machine learning algorithm 1440 may also predict route B based on a determination that route B is likely to be quicker in light of the adverse weather along route A (even if route A would be quicker under ideal conditions). Not only is weather data relevant to predicted sales/delivery routes, it can be relevant to determination of what may be offered for sale. For example, if it is a rainy or cold day, machine learning algorithm 1440 may predict it is better to sell umbrellas at a route near an event (such as an outdoor concert or sporting event) as opposed to ice cream. Weather data may be used/considered by weather data processor 1420 in additional ways.

Traffic data processor 1425 may consider and process traffic, road, construction, event, etc. data to help predict an "optimal" delivery/sales route. For example, if potential route 1 travels through an area with current road construction where cars are forced to merge from multiple lanes down to a single lane, while potential route 2 avoids this road construction, then the machine learning algorithm 1440 may consider this when making a sales/delivery route prediction. In some embodiments, machine learning algorithm 1440 may predict route 2 even if it is longer, less fuel efficient, etc. because machine learning algorithm 1440 may predict that such a route is quicker in light of the road construction (even if route 1 would be quicker under ideal conditions). Other data may also be relevant. For example, if there is a large event such as a sports event or concert, then machine learning algorithm 1440 may predict a route that avoids likely traffic backup caused the event. On the other hand, if machine learning algorithm 1440 determines that there is a likelihood of sales to users who are attending the event, then machine learning algorithm 1440 may predict a route that passes near the event, even if there is an efficiency tradeoff due to congestion caused by traffic and pedestrians associated with the event. Other data may also be considered and input into predictions made by machine learning algorithm 1440.

The "optimal" sales route may be defined as a route which seeks to maximize gross sales, unit sales, profit, or any other sales-based metric. "Optimal" may also seek to maximize or minimize any number of other factors/metrics. For example, an optimal sales route may seek to minimize fuel consumption, distance driven, time spent on the route, etc. An optimal sale route may be one that maximizes multiple metrics with one being favored or each being equally valued. "Optimal" may also be defined as maximizing or minimizing one or more metric in light of other metrics that may be kept within certain ranges. For example, an "optimal" sales route may seek to maximize profits, while also putting importance on unit sales, while also maintaining sales route time under a ceiling time (e.g., two hours). Other scenarios may be possible.

In some embodiments, where more than one metric or factor may be considered, machine learning algorithm 1440 may apply relative weightings to each metric and data from each of the processors 1415-1430. For example, in a scenario where an autonomous vehicle is selling ice cream, machine learning algorithm 1440 may seek to find a delivery route that maximizes gross sales while also avoiding tolls, roadwork, adverse weather, etc. There could be a prediction that seeks to minimize fuel consumption as a primary goal, but also use sales or some other metric or metrics as secondary considerations, and machine learning algorithm 1440 may predict a route that is not the absolute lowest fuel consumption, but is the best predicted tradeoff between fuel consumption vs those other secondary metrics. Other more complex interactions may be considered and predicted by machine learning algorithm 1440. machine learning algorithm 1440 may leverage historical sales data to better understand locations that are likely to result in sales base on timing of sales, volume of sales at each such location, etc. This sales data may be cross-referenced with other historical data such as weather and event data. For example, if a large number of jersey sales previously occurred at or near a stadium on a certain day, then it may be relevant to understand that a sporting event was taking place during those sales. Or in the case of ice cream sales, it may be relevant to understand if there was a reason why a large group of people were near the sales area (e.g., sporting event, concert, etc.). It may also be relevant to understand if it was a hot day, thereby helping to drive ice cream sales. Machine learning algorithm 1440 integrate and utilize all such data and metrics to predict a sales route that has the highest chance to maximize a given metric and may also predict the outcome of one or more metrics based on the prediction.

In exemplary embodiments, "optimal" may be defined in relation to a multitude of factors and how those factors interact with each other for a predicted sales route. For instance, it might not make much sense to plan a sales route that doubles back repeatedly for subsequent planned sales stops, but there may be other considerations such as one-way streets, traffic, road closures, sporting event, avoidance of tolls, etc.

Machine learning algorithm 1440 may make one or more predictions based on varying criteria, as discussed above, and may utilize a system of weights and ranks for the predictions based on a confidence in the prediction. The confidence in a prediction may be based on confidences in one or more data points relied on by machine learning algorithm 1440, such as current weather conditions and how those conditions might change by the time an autonomous vehicle reaches the area(s) corresponding to the weather conditions. The same is true for current traffic, road closures due to accidents or other transient events, etc. Confidence in prediction(s) may also be based on affirming feedback based on one or more prior predictions. Machine learning algorithm 1440 may be trained by the feedback processor 1430 to better predict sales routes by analyzing results across a plurality of autonomous vehicles.

Each of the component processors 1415-1430 provide data to algorithm processor 1405. In turn, algorithm processor 1405 may make predictions regarding sales/delivery routes. The predictions by the algorithm processor 1405 may be developed by one or more machine learning algorithms and generated by one or more predictive models. In an embodiment, the machine learning algorithms employed can include at least one selected from the group of gradient boosting machine, logistic regression, neural networks, and a combination thereof, however, it is understood that other machine learning algorithms can be utilized.

The predictive models described herein can utilize a Bidirectional Encoder Representations from Transformers (BERT) models. BERT models utilize use multiple layers of so called "attention mechanisms" to process textual data and make predictions. These attention mechanisms effectively allow the BERT model to learn and assign more importance to words from the text input that are more important in making whatever inference is trying to be made.

The predictive models described herein may utilize various neural networks, such as convolutional neural networks ("CNNs") or recurrent neural networks ("RNNs"), to generate the exemplary models. A CNN may include one or more convolutional layers (e.g., often with a subsampling step) and then followed by one or more fully connected layers as in a standard multilayer neural network. CNNs may utilize local connections, and may have tied weights followed by some form of pooling which may result in translation invariant features.

A RNN is a class of artificial neural network where connections between nodes form a directed graph along a sequence. This facilitates the determination of temporal dynamic behavior for a time sequence. Unlike feedforward neural networks, RNNs may use their internal state (e.g., memory) to process sequences of inputs. A RNN may generally refer to two broad classes of networks with a similar general structure, where one is finite impulse and the other is infinite impulse. Both classes of networks exhibit temporal dynamic behavior. A finite impulse recurrent network may be, or may include, a directed acyclic graph that may be unrolled and replaced with a strictly feedforward neural network, while an infinite impulse recurrent network may be, or may include, a directed cyclic graph that may not be unrolled. Both finite impulse and infinite impulse recurrent networks may have additional stored state, and the storage may be under the direct control of the neural network. The storage may also be replaced by another network or graph, which may incorporate time delays or may have feedback loops. Such controlled states may be referred to as gated state or gated memory, and may be part of long short-term memory networks ("LSTMs") and gated recurrent units.

RNNs may be similar to a network of neuron-like nodes organized into successive "layers," each node in a given layer being connected with a directed e.g., (one-way) connection to every other node in the next successive layer. Each node (e.g., neuron) may have a time-varying real-valued activation. Each connection (e.g., synapse) may have a modifiable real-valued weight. Nodes may either be (i) input nodes (e.g., receiving data from outside the network), (ii) output nodes (e.g., yielding results), or (iii) hidden nodes (e.g., that may modify the data en route from input to output). RNNs may accept an input vector x and give an output vector y. However, the output vectors are based not only by the input just provided in, but also on the entire history of inputs that have been provided in in the past.

For supervised learning in discrete time settings, sequences of real-valued input vectors may arrive at the input nodes, one vector at a time. At any given time step, each non-input unit may compute its current activation (e.g., result) as a nonlinear function of the weighted sum of the activations of all units that connect to it. Supervisor-given target activations may be supplied for some output units at certain time steps. For example, if the input sequence is a speech signal corresponding to a spoken digit, the final target output at the end of the sequence may be a label classifying the digit. In reinforcement learning settings, no teacher provides target signals. Instead, a fitness function, or reward function, may be used to evaluate the RNNs performance, which may influence its input stream through output units connected to actuators that may affect the environment. Each sequence may produce an error as the sum of the deviations of all target signals from the corresponding activations computed by the network. For a training set of numerous sequences, the total error may be the sum of the errors of all individual sequences.

The models described herein may be trained on one or more training datasets, each of which may comprise one or more types of data. In some examples, the training datasets may comprise previously-collected data, such as data collected from previous uses of the same type of systems described herein and data collected from different types of systems. In other examples, the training datasets may comprise continuously-collected data based on the current operation of the instant system and continuously-collected data from the operation of other systems. In some examples, the training dataset may include anticipated data, such as the anticipated future workloads, currently scheduled workloads, and planned future workloads, for the instant system and/or other systems. In other examples, the training datasets can include previous predictions for the instant system and other types of system, and may further include results data indicative of the accuracy of the previous predictions. In accordance with these examples, the predictive models described herein may be training prior to use and the training may continue with updated data sets that reflect additional information.

Figure 15:
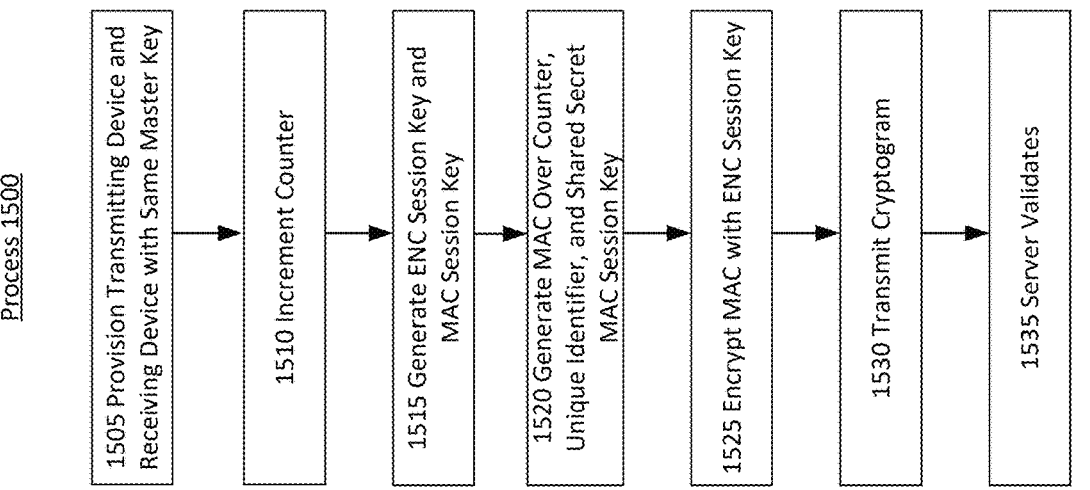
FIG. 15 is a flow chart illustrating a method of user authentication according to an exemplary embodiment.

FIG. 15 is a flow chart of method 1500 of user authentication through key diversification according to an example of the present disclosure.

In some examples, a sender and recipient may desire to exchange data via a transmitting device and a receiving device. In some embodiments, the transmitting device is the contactless card, and the receiving device is the server. In other embodiments, the transmitting device and the receiving device are network-enabled computers, including mobile devices as defined herein. As explained above, it is understood that one or more transmitting devices and one or more receiving devices may be involved so long as each party shares the same shared secret symmetric key. In some examples, the transmitting device and receiving device may be provisioned with the same master symmetric key. In other examples, the transmitting device may be provisioned with a diversified key created using the master key. In some examples, the symmetric key may comprise the shared secret symmetric key which is kept secret from all parties other than the transmitting device and the receiving device involved in exchanging the secure data. It is further understood that part of the data exchanged between the transmitting device and receiving device comprises at least a portion of data which may be referred to as the counter value. The counter value may comprise a number that changes each time data is exchanged between the transmitting device and the receiving device.

The transmitting device and the receiving device may be configured to communicate via NFC, Bluetooth, RFID, Wi-Fi, and/or the like. The transmitting device and the receiving device may be network-enabled computer devices. In some examples, the transmitting device may comprise a contactless card and the receiving device may comprise a server. In other examples, the receiving device may comprise a user device or a user device application.

The method 1500 can begin with step 1505. In step 1505, a transmitting device and receiving device may be provisioned with the same master key, such as the same master symmetric key. The transmitting device may be the user device. The receiving device may be the contactless card. When the transmitting device is preparing to process the sensitive data with symmetric cryptographic operation, the transmitting device may update a counter. In addition, the transmitting device may select an appropriate symmetric cryptographic algorithm, which may include at least one of a symmetric encryption algorithm, HMAC algorithm, and a CMAC algorithm. In some examples, the symmetric algorithm used to process the diversification value may comprise any symmetric cryptographic algorithm used as needed to generate the desired length diversified symmetric key. Non-limiting examples of the symmetric algorithm may include a symmetric encryption algorithm such as 3DES or AES128, a symmetric HMAC algorithm, such as HMAC-SHA-256, and a symmetric CMAC algorithm, such as AES-CMAC.

In step 1510, the transmitting device may take the selected cryptographic algorithm, and using the master symmetric key, process the counter value. For example, the transmitting device may select a symmetric encryption algorithm, and use a counter which updates with every conversation between the transmitting device and the receiving device The one or more counters may comprise a numeric counter sufficient to store an integer. The transmitting device may increment the counter one or more times. In step 1515, the transmitting device generates two session keys: one ENC (encryption) session key and one MAC (message authentication code) session key. The transmitting device may encrypt the counter value with the selected symmetric encryption algorithm using the master symmetric key to create a session key.

In step 1520, the transmitting device generates the MAC over the counter, the unique customer identifier, and the shared secret MAC session key. The customer identifier may comprise a unique alphanumeric identifier assigned to a user of the contactless card, and the identifier may distinguish the user of the contactless card from other contactless card users. In some examples, the customer identifier may identify both a customer and an account assigned to that customer and may further identify the contactless card associated with the customer's account.

In step 1525, the transmitting device encrypts the MAC with the ENC session key. As encrypted, the MAC can become a cryptogram. In some examples, a cryptographic operation other than encryption may be performed, and a plurality of cryptographic operations may be performed using the diversified symmetric keys prior to transmittal of the protected data.

In some examples, the MAC cryptogram can be a digital signature used to verify user information. Other digital signature algorithms, such as public key asymmetric algorithms, e.g., the Digital Signature Algorithm and the RSA algorithm, or zero knowledge protocols, may be used to perform this verification.

In step 1530, the transmitting device transmits a cryptogram to the receiving device. The cryptogram can include the applet information, the unique customer identifier, the counter value, and the encrypted MAC.

In step 1535, the receiving device validates the cryptogram. For example, the receiving device generates its own UDKs (unique diversified keys) using the unique customer identifier and the master key. The unique customer identifier is derived from the validated cryptogram. Recall that the receiving device has already been provisioned with the master key. The receiving device generates two session keys: one ENC (encryption) session key and one MAC (message authentication code) session key. The receiving device may generate these session keys from the UDKs and the counter value. The counter value can be derived from the cryptogram. The receiving device uses the session keys to decrypt the MAC from the cryptogram sent by the transmitting device. The output of the encryptions may be the same diversified symmetric key values that were created by the sender. For example, the receiving device may independently create its own copies of the first and second diversified session keys using the counter. Then, the receiving device may decrypt the protected data using the second diversified session key to reveal the output of the MAC created by the transmitting device. The receiving device may then process the resultant data through the MAC operation using the first diversified session key. The receiving device validates the MAC with the MAC session key generated in step 1515. The receiving device may validate the MAC over the unique customer identifier and the counter value.

It is noted that the systems and methods described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, and any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

Computer readable program instructions described herein can be downloaded to respective computing and/or processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing and/or processing device receives computer readable program instructions from the network and forwards the computer readable program instructions for storage in a computer readable storage medium within the respective computing and/or processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions specified herein. These computer-readable program instructions may also be stored in a computer-readable storage medium that can direct a computer, a programmable data processing apparatus, and/or other devices to function in a manner, such that the computer readable storage medium having instructions stored therein comprises an article of manufacture including instructions which implement aspects of the functions specified herein.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions specified herein.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

We claim:

1. A secure autonomous transaction system, comprising:
an autonomous vehicle comprising:
a user interface configured to receive a user authentication request;
a processor in communication with a server and the user interface, configured to:
receive one or more delivery instructions from the server,
cause the autonomous vehicle to move to a delivery location along a route based on the one or more delivery instructions, wherein:
the route is determined by a prediction by a learning algorithm using one or more factors, and
the prediction further comprises alternate directions based on at least one selected from the group of a potential occurrence and a potential change in conditions,
authenticate the user authentication request,
grant user access, based on successful authentication of the user authentication request, to one or more partitioned areas of the autonomous vehicle, and
provide feedback to the learning algorithm wherein:
the feedback comprises a comparison of one or more delivery metrics with the one or more factors, and
the one or more delivery metrics comprises one or more timing details, and
wherein:
the user authentication request includes a cryptogram,
the processor is configured to authenticate the user authentication request by:
generating an encryption session key using a first diversified key and a counter value,
decrypting the cryptogram to obtain transmission data, and
validating the transmission data by comparing the transmission data with reference data, and
granting user access to one or more partitioned areas of the autonomous vehicle includes unlocking and opening the one or more partitioned areas.

2. The system of claim 1, wherein the server is configured to:
receive a transaction request from a user,
approve the transaction request,
transmit one or more transaction details to the processor, and
transmit a confirmation of transaction approval to the processor.

3. The system of claim 2, wherein the transaction details include an address for delivery to the user.

4. The system of claim 2, wherein:
the route comprises travel from a starting point to the user, and
the server further comprises artificial intelligence configured to apply the learning algorithm to determine and direct the route.

5. The system of claim 4, wherein the prediction from the artificial intelligence is based on a plurality selected from a group of traffic, weather, street closings, one or more events, tolls, distance, predicted fuel economy, and a delivery timing requested by the user.

6. The system of claim 1, wherein one or more goods are stored in the one or more partitioned areas of the autonomous vehicle that are accessible by a user after access is granted.

7. The system of claim 6, wherein the one or more goods correspond to a purchase transaction made by the user.

8. The system of claim 1, wherein the autonomous vehicle contains one or more goods corresponding to a plurality of transactions, including a user's transaction, within the autonomous vehicle.

9. The system of claim 8, wherein the one or more goods corresponding to each of the plurality of transactions are stored in different partitions of the one or more partitioned areas of the autonomous vehicle.

10. The system of claim 1, wherein the one or more partitioned areas of the autonomous vehicle comprise at least one selected from the group of a trunk, a rear seat, and a front seat.

11. The system of claim 10, wherein the rear seat is further partitioned into a left side and a right side, the left side accessible only through a driver-side rear door and the right side only accessible through a passenger-side rear door.

12. The system of claim 10, wherein the front seat is partitioned such that a user has no access to any vehicle controls and may access the front seat only through a passenger-side front door.

13. The system of claim 1, wherein:
the one or more partitioned areas of the autonomous vehicle are further sub-divided into a plurality of sub-partitions where each sub-partition holds the contents of one of a plurality of transactions, and
upon authentication by a user, the processor is further configured to grant access to the sub-partition containing goods relating to the user's transaction.

14. The system of claim 1, wherein:
at least one of the one or more of the partitioned areas of the autonomous vehicle comprises a vending machine in communication with the processor and the system, and the vending machine is configured to:
receive transaction details for the user transaction from the server,
receive authentication confirmation from the processor, and
release, based on the transaction details and authentication confirmation, one or more goods from a secured location to a location accessible by the user.

15. A method for secure autonomous transactions, comprising:
receiving, by a processor of an autonomous vehicle, one or more digital delivery instructions;
moving the autonomous vehicle to a delivery location along a route based on the one or more digital delivery instructions, wherein;
the route is determined by a prediction by a learning algorithm using one or more factors, and
the prediction further comprises alternate directions based on at least one selected from the group of a potential occurrence and a potential change in conditions;
receiving, via a user interface on the autonomous vehicle, a user authentication request;
authenticating, by the processor of the autonomous vehicle, the user authentication request;

granting user access, via the processor of the autonomous vehicle, to one or more partitioned areas of the autonomous vehicle based on successful authentication of the user authentication request; and
providing feedback to the learning algorithm wherein:
the feedback comprises a comparison of one or more delivery metrics with the one or more factors, and
the one or more delivery metrics comprises one or more timing details, and
wherein:
the user authentication request includes a cryptogram,
authenticating the user authentication request comprises:
generating, by the processor, an encryption session key using a first diversified key and a counter value,
decrypting, by the processor, the cryptogram to obtain transmission data,
validating, by the processor, the transmission data by comparing the transmission data with reference data, and
granting user access to one or more partitioned areas of the autonomous vehicle comprises unlocking and opening the one or more partitioned areas.

16. The method of claim 15, further comprising:
receiving, via a server, a transaction request from a user;
approving, via the server, the transaction request;
transmitting, via the server, one or more transaction details to the processor of the autonomous vehicle; and
transmitting, via the server, a confirmation of transaction approval to the processor of the autonomous vehicle.

17. The method of claim 16, wherein:
at least one of the one or more of the partitioned areas of the autonomous vehicle comprises a vending machine in communication with the processor, and
the vending machine is configured to:
receive transaction details from the server,
receive authentication confirmation from the processor and
release, based on the transaction details and authentication confirmation, one or more goods from a secured location to a location accessible by the user.

18. The method of claim 15, wherein:
the one or more partitioned areas of the autonomous vehicle are further sub-divided into a plurality of sub-partitions where each sub-partition holds contents of one of a plurality of transactions, and
upon authentication by a user, the processor is further configured to grant access to the sub-partition containing goods relating to the user's transaction.

19. A computer-readable non-transitory medium comprising computer-executable instructions that, when executed by at least one processor, cause the at least one processor to perform procedures comprising:
receiving one or more digital delivery instructions;
causing an autonomous vehicle to move to a delivery location along a route based on the one or more digital delivery instructions, wherein:
the route is determined by a prediction by a learning algorithm, and
the prediction further comprises alternate directions based on at least one selected from the group of a potential occurrence and a potential change in conditions;
receiving, via a user interface on the autonomous vehicle, a user authentication request;
authenticating the user authentication request;

granting user access to one or more partitioned areas of
the autonomous vehicle based on successful authenti-
cation of the user authentication request,
wherein:
the user authentication request includes a cryptogram,
authenticating the user authentication request com-
prises:
generating an encryption session key using a first
diversified key and a counter value,
decrypting the cryptogram to obtain transmission
data, and
validating the transmission data by comparing the
transmission data with reference data;
granting user access to one or more partitioned areas of
the autonomous vehicle comprises unlocking and opening the one or more partitioned areas; and
providing feedback to the learning algorithm, wherein:
the feedback comprises a comparison of one or more
delivery metrics with the one or more factors, and
the one or more delivery metrics comprises one or more
timing details.

20. The computer-readable non-transitory medium of
claim 19, wherein the one or more delivery metrics comprise
at least one selected from the group of whether a delivery
was successful, whether the user authentication request was
successful, timing details related to the delivery, driving
conditions, road conditions, and weather.

\* \* \* \* \*